United States Patent
Deng et al.

[11] Patent Number: 5,980,977
[45] Date of Patent: Nov. 9, 1999

[54] METHOD OF PRODUCING HIGH SURFACE AREA METAL OXYNITRIDES AS SUBSTRATES IN ELECTRICAL ENERGY STORAGE

[75] Inventors: Charles Z. Deng, Campbell; Keh Chi Tsai, Saratoga; Dania Ghantous, San Jose, all of Calif.

[73] Assignee: Pinnacle Research Institute, Inc., Los Gatos, Calif.

[21] Appl. No.: 08/761,837

[22] Filed: Dec. 9, 1996

Related U.S. Application Data

[63] Continuation-in-part of application No. PCT/US95/03985, Mar. 30, 1995, and application No. 08/727,821, Sep. 30, 1996, abandoned, which is a continuation-in-part of application No. 08/219,965, Mar. 30, 1994, Pat. No. 5,867,363, which is a continuation-in-part of application No. 07/947,414, Sep. 18, 1992, Pat. No. 5,384,685, application No. 07/947,294, Sep. 18, 1992, Pat. No. 5,464,453, and application No. 07/958,506, Oct. 7, 1992, abandoned.

[51] Int. Cl.$^6$ .................................................. B05D 5/12
[52] U.S. Cl. .................. 427/79; 427/376.2; 427/377; 427/419.3
[58] Field of Search .................. 427/79, 376.2, 427/377, 419.3

[56] References Cited

U.S. PATENT DOCUMENTS

| | | |
|---|---|---|
| 1,200,345 | 10/1916 | Hardy et al. |
| 2,428,470 | 10/1947 | Powers ........................... 136/59 |

(List continued on next page.)

FOREIGN PATENT DOCUMENTS

| | | | |
|---|---|---|---|
| 1196683 | 11/1985 | Canada .............................. | H01G 9/04 |
| A-44427 | 1/1982 | European Pat. Off. ......... | H01G 9/02 |

(List continued on next page.)

OTHER PUBLICATIONS

B.E. Conway, *J. Electrochem. Soc.*, vol. 138 (#6), p. 1539, (Jun. 1991).

(List continued on next page.)

*Primary Examiner*—Benjamin Utech
*Attorney, Agent, or Firm*—Peters, Verny, Jones & Biksa, LLP

[57] ABSTRACT

The present invention concerns a process to produce a high surface area niobium oxynitride, tantalum oxynitride, vanadium oxynitride, zirconium oxynitride, titanium oxynitride or molybdenum oxynitride coated substrate for use as an electrical energy storage component in a capacitor or a battery configuration. The process relates to:

(a) coating one or both flat etched surfaces of a solid substrate, in the form of a thin sheet, with a solution or a slurry of a metal halide in a liquid volatile carrier to produce a thin surface film;

(b) contacting the metal halide surface film-carrier coated substrate of step (a) with oxygen, air, or combinations thereof at a temperature to convert the metal halide to metal oxide, respectively, as a thin film and to remove the liquid volatile carrier;

(c) repeating steps (a) and (b) to obtain a desired thickness;

(d) heating the metal oxide film coated substrate of step (c) in oxygen, air or combinations thereof to convert at least about 95% of the metal chloride to metal oxide;

(e) increasing the temperature of the metal oxide coated substrate to elevated temperatures;

(f) contacting the oxide coated substrate produced in step (e) with a nitrogen source selected from excess flowing gaseous ammonia, a mixture of ammonia gas and hydrogen gas, or a mixture of hydrogen gas and nitrogen gas at elevated temperatures to convert about 95% or greater of the oxide coating to the corresponding metal oxynitride on the substrate, which metal oxynitride layer has a high surface area and is electrically conductive; and (g) cooling to ambient temperature and recovering the high surface area metal oxynitride coated substrate produced in step (f).

18 Claims, 30 Drawing Sheets

U.S. PATENT DOCUMENTS

| | | |
|---|---|---|
| 3,288,641 | 11/1966 | Rightmire . |
| 3,536,963 | 10/1970 | Boos ........................ 317/230 |
| 3,562,008 | 2/1971 | Martinsons et al. . |
| 3,718,551 | 2/1973 | Martinsons ................ 204/98 |
| 3,909,930 | 10/1975 | Gurtler ...................... 29/592 |
| 4,052,271 | 10/1977 | Beer .......................... 204/38 |
| 4,158,085 | 6/1979 | Bilhorn ...................... 429/130 |
| 4,198,476 | 4/1980 | DiSalvo, Jr. et al. ........ 429/194 |
| 4,315,976 | 2/1982 | Conte ........................ 429/194 |
| 4,327,400 | 4/1982 | Muranaka et al. ........... 361/433 |
| 4,515,763 | 5/1985 | Boudart et al. ............. 423/409 |
| 4,535,000 | 8/1985 | Gordon ...................... 427/160 |
| 4,548,880 | 10/1985 | Suzuki et al. ............... 429/162 |
| 4,555,745 | 11/1985 | Westermeier et al. ....... 427/98 |
| 4,557,983 | 12/1985 | Sauer ........................ 429/27 |
| 4,572,843 | 2/1986 | Saito et al. ................. 427/53.1 |
| 4,585,674 | 4/1986 | Gordon ...................... 427/255 |
| 4,618,503 | 10/1986 | Gordon et al. .............. 427/129 |
| 4,663,824 | 5/1987 | Kenmochi .................. 29/570 |
| 4,699,810 | 10/1987 | Blakeman et al. ........... 427/244 |
| 4,705,360 | 11/1987 | Funada et al. .............. 350/344 |
| 4,764,181 | 8/1988 | Nakano et al. . |
| 4,774,193 | 9/1988 | Juergens .................... 437/4 |
| 4,800,142 | 1/1989 | Bish et al. .................. 429/130 |
| 4,816,356 | 3/1989 | Balkanski .................. 29/623.5 |
| 4,851,206 | 7/1989 | Boudart et al. ............. 423/409 |
| 4,861,669 | 8/1989 | Gillery ...................... 428/434 |
| 4,862,328 | 8/1989 | Morimoto et al. ........... 361/502 |
| 4,937,096 | 6/1990 | Arakawa et al. ............ 427/80 |
| 4,938,857 | 7/1990 | Gillery ...................... 204/192.27 |
| 4,964,016 | 10/1990 | Marchand et al. ........... 361/321 |
| 4,992,910 | 2/1991 | Evans ........................ 361/502 |
| 5,032,426 | 7/1991 | Sumner, Jr. ................ 427/96 |
| 5,055,169 | 10/1991 | Hock, Jr. et al. ............ 204/192.31 |
| 5,062,025 | 10/1991 | Verhoeven et al. .......... 29/25.03 |
| 5,063,340 | 11/1991 | Kalenowsky . |
| 5,072,335 | 12/1991 | Kurabayashi et al. ....... 362/502 |
| 5,079,674 | 1/1992 | Malaspina .................. 361/502 |
| 5,085,955 | 2/1992 | Cipriano .................... 29/623.5 |
| 5,116,695 | 5/1992 | Rao et al. ................... 429/12 |
| 5,116,701 | 5/1992 | Kalisz ........................ 429/130 |
| 5,121,288 | 6/1992 | Maeroka et al. ............ 361/329 |
| 5,141,828 | 8/1992 | Bennion et al. ............. 29/623.5 |
| 5,148,355 | 9/1992 | Lowe et al. ................. 361/410 |
| 5,185,679 | 2/1993 | Mishima et al. ............. 360/30 |
| 5,202,152 | 4/1993 | Giannelis et al. ........... 427/108 |
| 5,217,831 | 6/1993 | White ........................ 430/311 |
| 5,230,990 | 7/1993 | Iwasaki et al. ............. 430/321 |
| 5,268,006 | 12/1993 | Ueno et al. ................. 29/25.03 |
| 5,273,840 | 12/1993 | Dominey .................... 429/192 |
| 5,279,722 | 1/1994 | Szczyrbowski et al. ...... 204/192.27 |
| 5,344,748 | 9/1994 | Feely ......................... 430/311 |
| 5,384,685 | 1/1995 | Tong et al. .................. 361/503 |
| 5,437,941 | 8/1995 | Arledge et al. .............. 429/129 |
| 5,464,453 | 11/1995 | Tong et al. .................. 29/25.03 |
| 5,508,881 | 4/1996 | Stevens ...................... 361/305 |
| 5,618,579 | 4/1997 | Boire et al. ................. 427/166 |
| 5,680,292 | 10/1997 | Thompson, Jr. et al. ..... 361/528 |

FOREIGN PATENT DOCUMENTS

| | | | |
|---|---|---|---|
| 0 128 169 | 7/1990 | European Pat. Off. ........ | C03C 17/22 |
| 5335369 | 2/1975 | Germany ...................... | H01M 2/16 |
| 57-172660 | 10/1982 | Japan .......................... | H01M 6/04 |
| 2-242563 | 9/1990 | Japan .......................... | H01M 4/64 |
| 3-150820 | 6/1991 | Japan .......................... | H01M 4/64 |
| 4-061109 | 2/1992 | Japan .......................... | H01G 9/04 |
| 5-267219 | 10/1993 | Japan .......................... | H01L 21/285 |
| 6610265 | 1/1967 | Netherlands .................. | 21/62 |
| 670066 | 4/1952 | United Kingdom . | |
| 730160 | 5/1955 | United Kingdom . | |
| A-2044535 | 10/1980 | United Kingdom ........... | H01F 9/04 |
| WO9526833 | 10/1995 | WIPO .......................... | B05D 1/32 |
| WO 9619003 | 6/1996 | WIPO .......................... | H01G 9/00 |

OTHER PUBLICATIONS

H. Lee, et al., *IEEE Transactions on Magnetics,* vol. 25 (#1), p. 324, (Jan. 1989).

G. Bullard, et al., *IEEE Transactions on Magnetics,* vol. 25 (#1) p. 102, (Jan. 1989).

A. Yoshida et al., *IEEE Transactions on Components, Hybrids and Manufacturing Technology,* "An Electric Double–Layer Capacitor with Activated Carbon Fiber Electrodes", vol. CHMT–10, #1, p. 100–103, (Mar. 1987).

T. Suzuki, et al., *NEC Research and Development,* "Improved Self Discharge Characteristics of the Electric Double Layer Capacitor", No. 82, pp. 118–123, Jul. 1986.

S. Sekido, *Solid State Ionics,* vol. 9, 10, pp. 777–782, (1983).

R.S. Yeo et al., in *J. Electrochem. Soc. Electrochemical Science and Technology,* vol. 128, No. 9, pp. 1900–1904, Sep. 198 .

R.S. Yeo et al., in *Abstracts of meeting of The Electrochemical Society,* Oct. 14–19, 1979, Abstract No. 652, p. 1637, published 1979.

L.D. Burke et al., in *J. Electroanal. Chem. 112,* (1980), pp. 39–50.

D. Galizzioli et al., in *Journal of Applied Electrochemistry,* vol. 4, (1974), pp. 57–67.

D. Galizzioli et al., in *Journal of Applied Electrochemistry,* vol. 5, (1975), pp. 203–214.

S. Trasatti et al, in *J. Electroanal. Chem.,* vol. 29, (1971), App. 1–5.

S. Hadzi–Jordanov et al., in *J. Electrochem. Soc. Electrochemical Science and Technology,* Sep. 1978, pp. 1471–1480.

S. H. Glarum et al., in *J. Electrochem. Soc. Electrochemical Science and Technology,* Jul. 1980, pp. 1467–1474.

B.E. Conway et al., in *Trans. Faraday Soc.,* (1962), vol. 58, p. 2493ff.

M. Pham–Thi et al., the *Journal of Materials Science Letters,* vol. 5, p. 415, (1986).

Sanada, K. et al., "Improvement of Self Discharge Characteristic of an Electric Double Layer Capacitor," IEEE, ch. 1818–4 (1982) pp. 224–230. No month available.

D. Finello "New Developments in Ultracapacitor Technology" reported at the Fourth International Seminar on Double Layer Capacitors and Similar Energy Storage Devices (vol. 4) Dec. 12–14, 1994, Deerfield Beach, Florida.

D. Finello "Characterization of Molybdenum Nitride Electrodes" reported at the Fifth International Double Layer Capacitors and Similar Energy Storage Devices, Dec. 4–6, 1995, Boca Raton, Florida.

M. Wixom "Non–Oxide Ceramic Electrodes", disclosed at the Fifth International Seminar on Double Layer Capacitors and Similar Energy Storage Devices, Dec. 4–6, 1995, Boca Raton, Florida, vol. 5.

M. Goodwin "PRI Ultracapacitors and Evaluation of Molybdenum Nitride" reported at the Fifth International Symposium on Double Layer Capacitors and Similar Energy Storage Devices, Dec. 4–6, 1995, Boca Raton, Florida.

L. Volpe and Boudart M. "Compounds of molybdenum and tungsten with high specific surface area". *Journal of Solid State Chemistry.* vol. 59, 332–347 (1985).

L. Volpe and Boudart M. "Ammonia synthesis on molybdenum nitride". *J. Phys. Chem.* vol. 90, 4874–4877 (1986).

G. S. Ranhotra, Bell, A.T. and Reimer, J.A. "Catalysis over molybdenum carbides and nitrides II. Studies of CO hydrogenation and $C_2H_6$ hydrogenolysis". *Journal of Catalysis.* vol. 108, 40–49 (1987).

G.S. Ranhotra, Haddix, G.W., Bell, A.T. and Reimer, J.A. "Catalysis over molybdenum carbides and nitrides I. Catalyst characterization". *Journal of Catalysis.* vol. 108, 24–39 (1987).

E.J. Markel and Van Zee, J.W. "Catalytic hydrodesulfurization by molybdenum nitride".*Journal of Catalysis.* vol. 126, 643–657 (1990).

Jaggers, Michaels, J.N. and Stacey, A.M. Preparation of high–surface area transition–metal nitrides: $MO_2N$ and MoN. *Chemistry of Materials.* vol. 2, 150–157 (1990).

J–G. Choi, Choi, D. and Thompson, L.T. "Preparation of molybdenum nitride thin films by N ion implantation". *J. Mater. Res.* vol. 7, 374–378 (1992).

L.T. Thompson, Colling, C.W., Choi, D., Demczyk, B.G. and Choi, J.–G. "Surface and catalytic properties of molybdenum nitrides". *New Frontiers in Catalysis.* 19–24 (1992).

Jeong–Gil Choi. "Temperature–programmed desorption of $H_2$ from molybdenum nitride thin films". *Applied Surface Science.* vol. 78, 299–307 (1994).

R.S. Wise, and Markel, E.J. "Catalytic NH3–decomposition by topotactic molybdenum oxides and nitrides: Effect on temperature programmed $\gamma$–$MO_2N$ Synthesis". *Journal of Catalysis.* vol. 145, 335–343 (1994).

K.L. Roberts and Markel, E.J. "Generation of $Mo_2N$ nanoparticles from topotactic MO2N Crystallites". *J. Phys. Chem.* vol. 98, 4083–4086 (1994).

R.S. Wise and Markel, E.J. "Synthesis of high surface area molybdenum nitride in mixtures of nitrogen and hydrogen". *Journal of Catalysis.* vol. 145, 344–355 (1994).

J–G. Choi, Curl, R.L. and Thompson, L.T. "Molybdenum nitride catalysts". *Journal of Catalysis.* vol. 146, 218–227 (1994).

B.G. Demczyk, Choi, J–G and Thompson L.T. "Surface structure and composition of high–surface–area molybdenum nitrides". *Applied Surface Science.* vol. 78, 63–69 (1994).

E.P. Donovan and Hubler, G.K. "Ion–beam–assisted deposition of molybdenum nitride films." *Surface and Coatings Technology.* vol. 66, 499–504 (1994).

C.W. Colling and Thompson, L.T. "The structure and function of supported molybdenum nitride hydrodenitrogenation catalysts". *Journal of Catalysis.* vol. 146, 193–203 (1994).

C.H. Jaggers. "The preparation and characterization of high surface area transition metal nitrides". *U.M.I. Dissertation Services.* (1994).

M.S. Mudholkar and Thompson L.T. "Control of composition and structure for molybdenum nitride films synthesized using ion beam assisted deposition". *J. Appl. Phys.* vol. 77, 5138–5143 (1995).

H. Joon Lee, Choi, J–G, Colling, C.W., Mudholkar, M.S. and Thompson, L.T. "Temperature–programmed desorption and decomposition of $NH_3$ over molybdenum nitride films". *Applied Surface Science.* vol. 89, 121–130 (1995).

P. Mehta, Singh, A.K. and Kingon, A.I. "Nonthermal microwave plasma synthesis of crystalline titanium oxide & titanium nitride nanoparticles". *Mat. Res. Soc. Symp. Proc.* vol. 249, 153–158 (1992).

E.O. Travis and Fiordalice, R.W. "Manufacturing aspects of low pressure chemical–vapor–deposited TiN barrier layers". *Thin Solid Films.* vol. 236, 523–329 (1993).

Y.W. Bae, Lee, W.Y., Besmann, T.M., Blau, P.J. and Riester, L. "Synthesis and selected micro–mechanical properties in titanium nitride thin films by the pyrolysis of tetrakis titanium in ammonia". *Mat. Res. Soc. Symp. Proc.* vol. 363, 245–250 (1995).

H. Rode, and Hlavacek, V. "Detailed kinetics of titanium nitride synthesis". *AIchE Journal.* vol. 41, 377–388 (1995).

K–T. Rie, Gebauer, A., Wohle, J., Tonshoff, H.K. and Blawit, C. "Synthesis of TiN/TiCN/TiC layer systems on steel and cermet substrates by PACVD". *Surface and Coatings Technology.* vol. 74–75, 375–381 (1995).

J.N. Musher, and Gordon, R.G. "Atmospheric pressure chemical vapor deposition of titanium nitride from tetrakis (diethylamido) titanium and ammonia". *J. Electrochem. Soc.* 143, 736–744 (1996).

A. Tasaki, Tagawa, K., Kita, E., Harada, S. and Kusunose, T. "Recording tapes using iron nitride fine powder". *IEEE Transactions on Magnetics.* vol. MAG–17, 3026–3031 (1981).

K. Tagawa, Kita E. and Tasaki, A. "Synthesis of fine $Fe_4N$ powder and its magnetic characteristics". vol. 21, 1596–1598 (1982).

M. Kopcewicz, Jagielski, J., Gawlik, G. and Grabias, A. "Role of alloying elements in the stability of nitrides in nitrogen–implanted $\alpha$–Fe". *J. Appl. Phys.* vol. 78, 1312–1321 (1995).

D.C. Sun, Lin, C., Jiang, E.Y. and Wu, S.W. "Multiphase iron nitride gradient films". *Thin Solid Films,* vol. 260, 1–3 (1995).

K.H. Jack. "The synthesis and characterization of bulk $\alpha''$–$Fe_{16}N_2$". *Journal of Alloys and Compounds.* vol. 222, 160–166 (1995).

T. Chuijo, Hiroe, K., Matsumura, Y., Uchida, H. and Uchida, H.H. "Reactivity of $N_2$ with Fe in $FeN_x$ formation by activated reactive evaporation process". *Journal of Alloys and Compounds.* vol. 222, 193–196 (1995).

F. Malengreau, Hautier, V., Vermeersch, M., Sporken, R. and Caudano, R. "Chemical interactions at the interface between aluminum nitride and iron oxide determined by XPS". *Surface Science,* vol. 330, 75–85 (1995).

S. Kurtz et al. in *Thin Solid Films* vol. 140, p. 277 (1986).

J.N. Musher et al. *J. Electrochem Soc.,* vol. 143, p. 277 (1996).

N. Kumar. et al. *Thin Solid Films,* vol. 153, p. 287 (1987).

C.H. Shin, et al., *Journal Solid State Chemistry,* vol. 95, p. 145 (1991).

C.H. Shin, et al., *Journal of Solid State Chemistry,* vol. 95, 145–155 (1991).

K. Kamiya, et al. in the *Journal of Materials Sciences,* vol. 22, p. 937–941 (1987).

V.Q. Ho, *Journal of Electronic Materials,* vol. 18, No. 4, pp. 493–499 (1989) Characterization of a Rapid Thermal Anneal TiNxOy/TiSi2 Contact Barrier.

H. Yang et al., *Journal Of Materials Science,* vol. 28, pp. 5663–5667 (1993) Synthesis of titanium oxynitride by mechanical milling.

M. Lazarov et al., *J. Appl. Phys.* 77(5), pp. 2133–2137 Mar. 1, 1995, Optical constants and film density of TiNxOy solar selective absorbers.

A.S. Oates, *J. Appl. Phys.,* vol. 70, No. 10, pp. 5369–5373 Nov. 15, 1991, Electromigration in multilayer metallization: Drift–controlled degradation and the electromigration threshold of Al—Si—Cu/TinxOy/TiSi2.

Y. Saito et al., *Appl. Phys. Lett.* vol. 63(10), pp. 1319–1320, Sep. 6, 1993, Electrically switchable window using a suspension of TiOxNy particles.

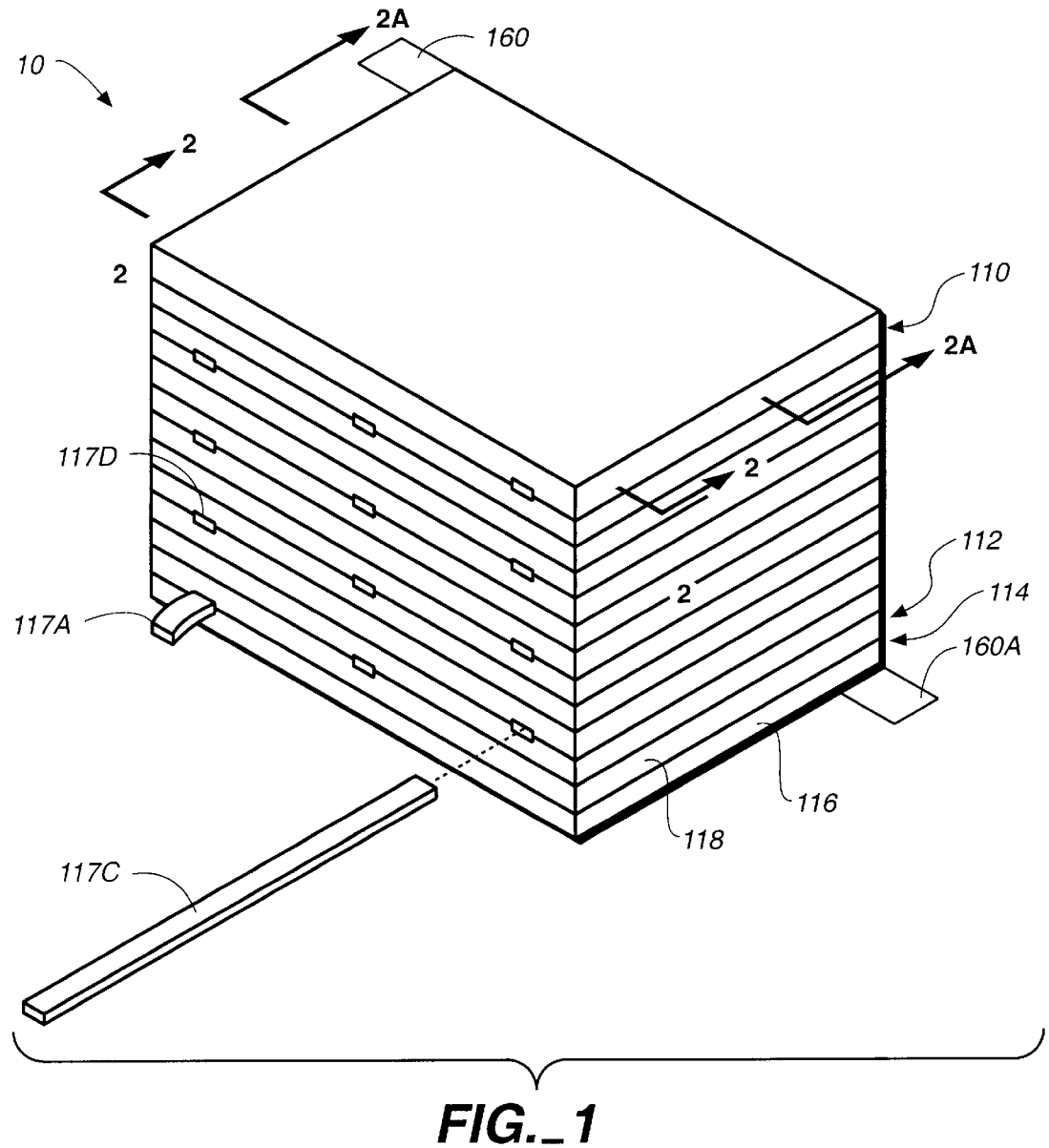
FIG._1

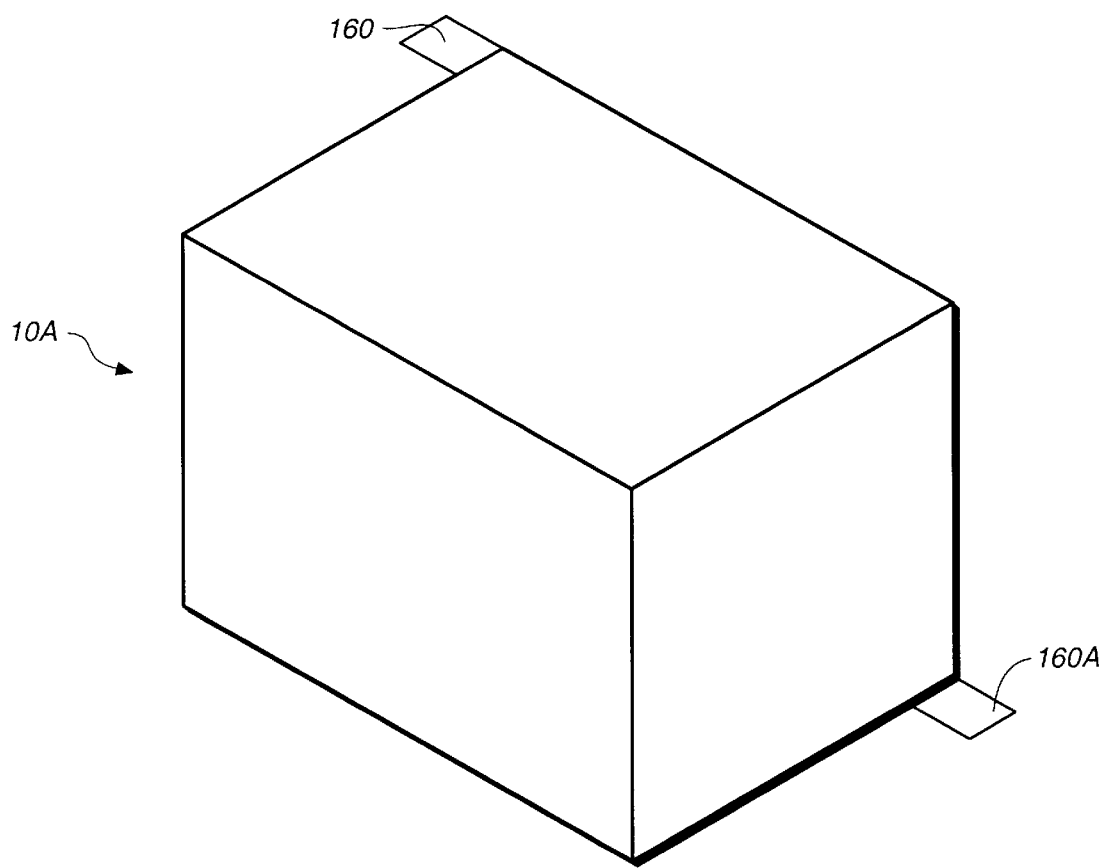
FIG._1A

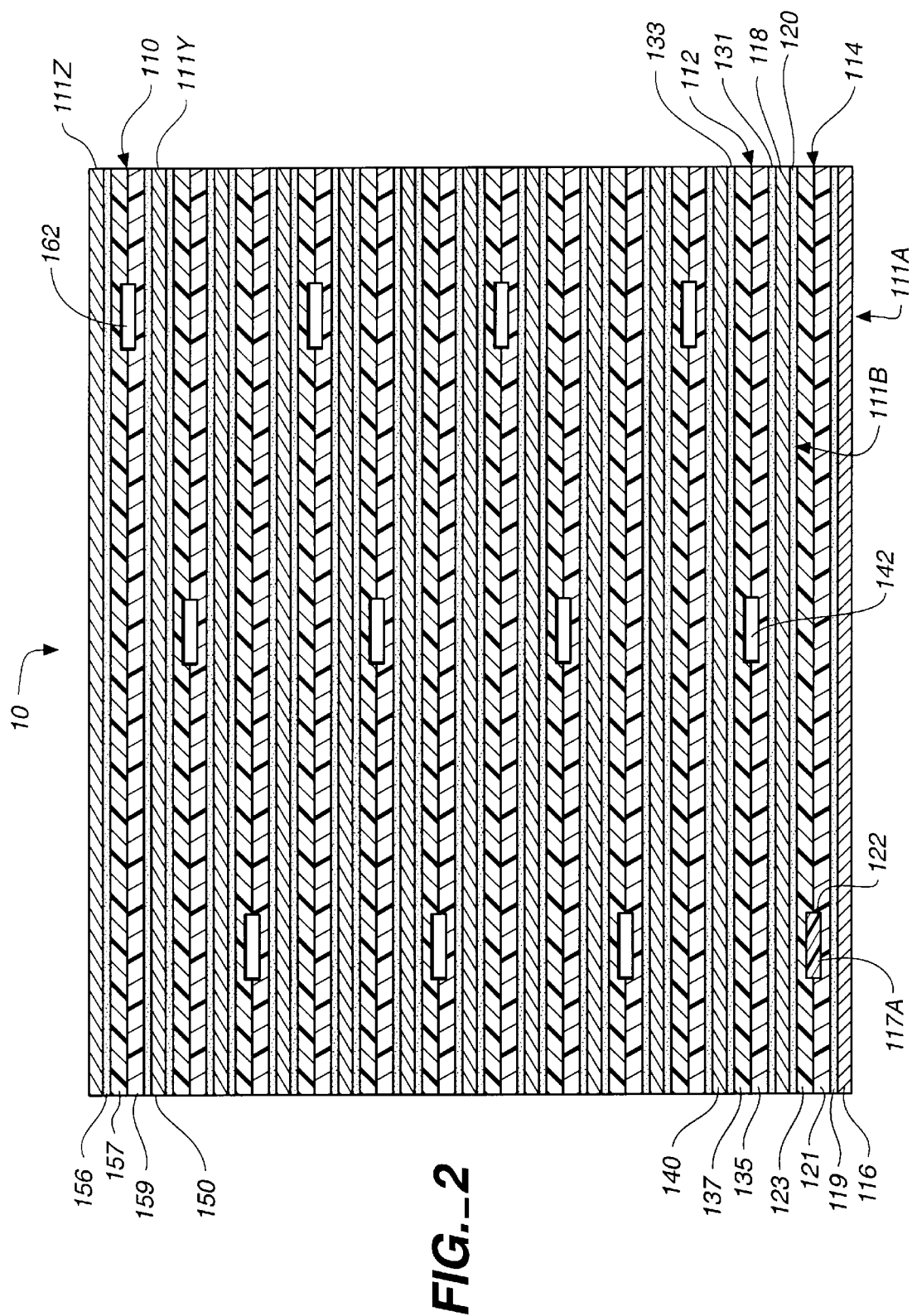

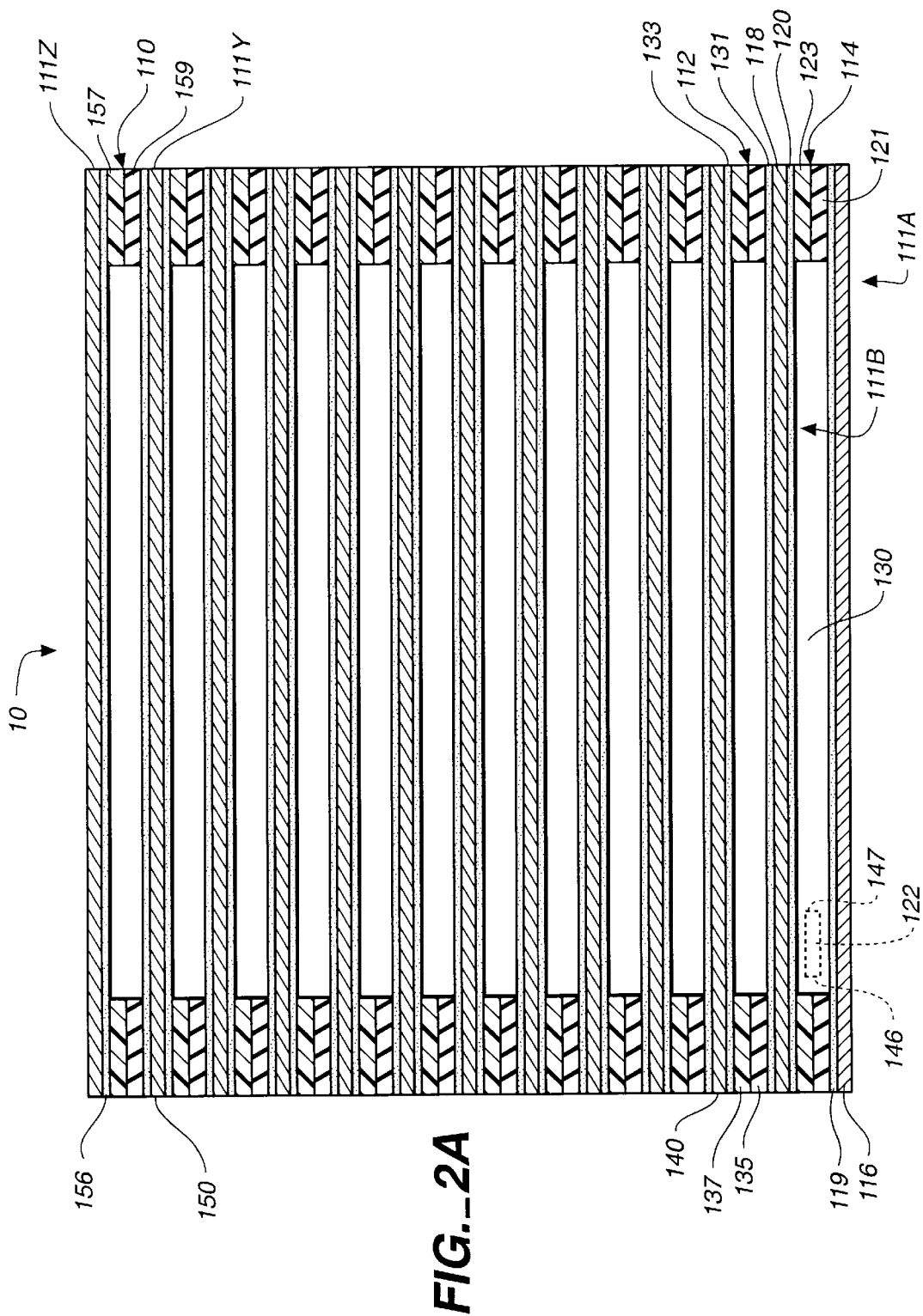
FIG._2A

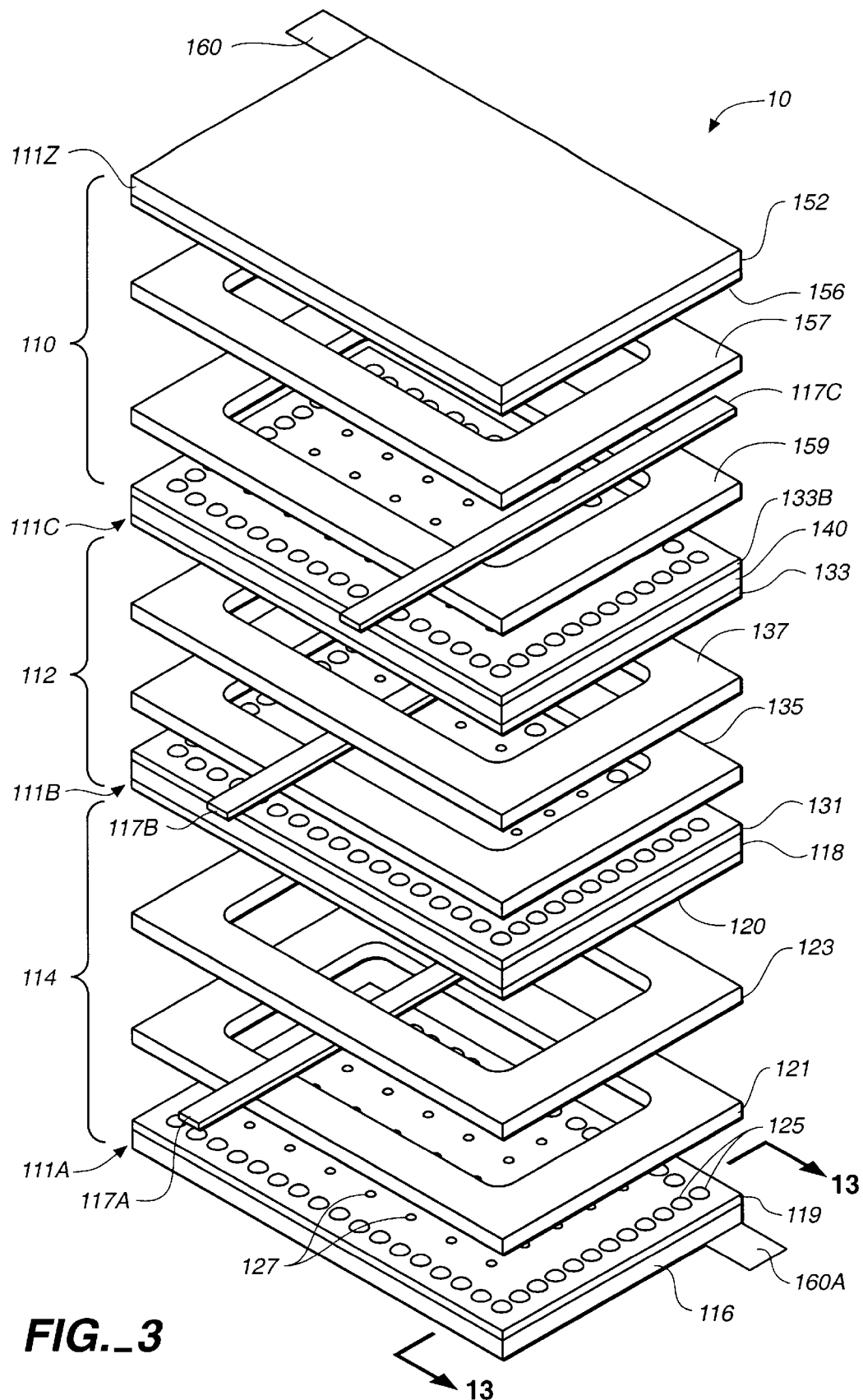
FIG._3

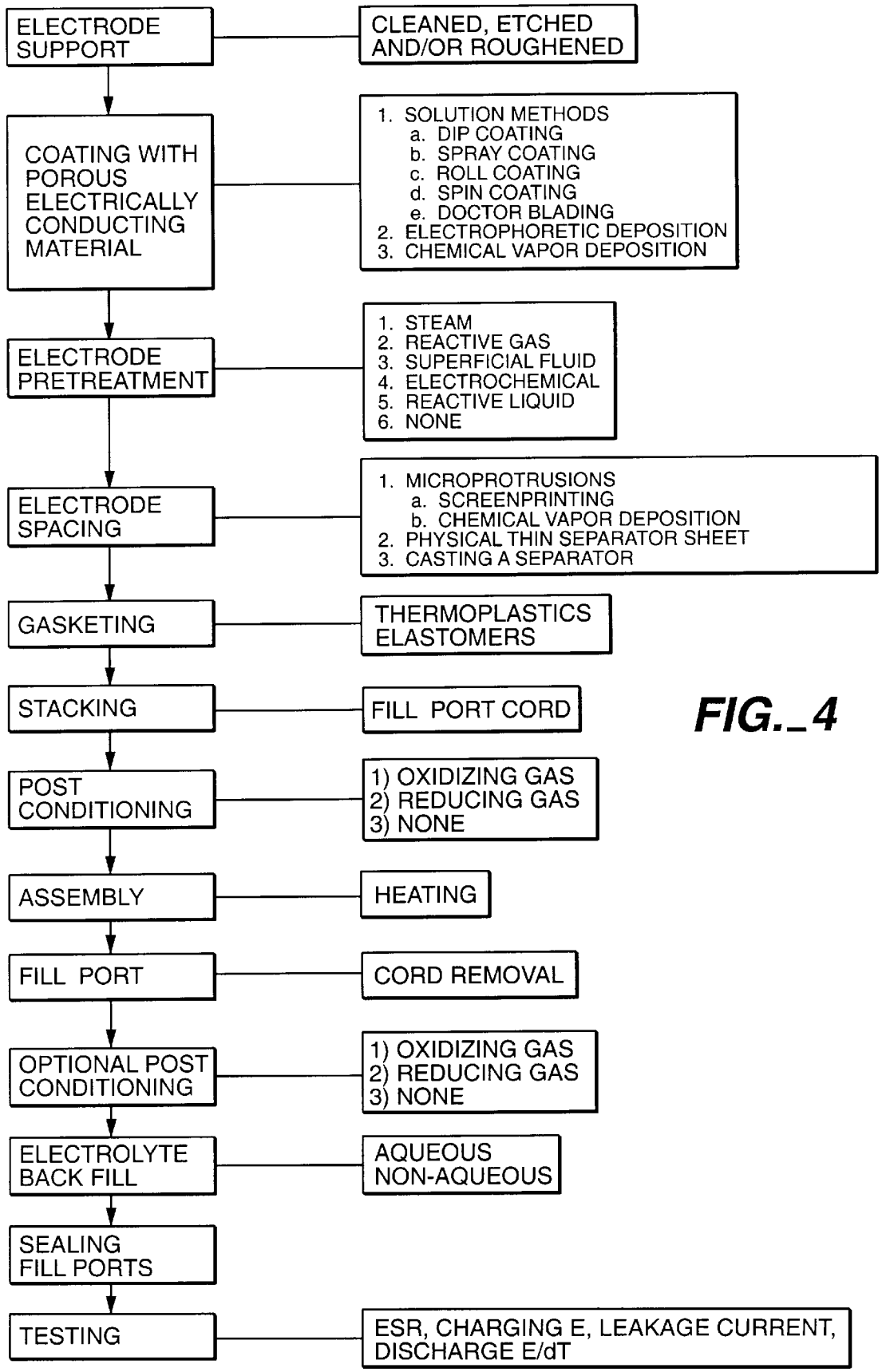
FIG._4

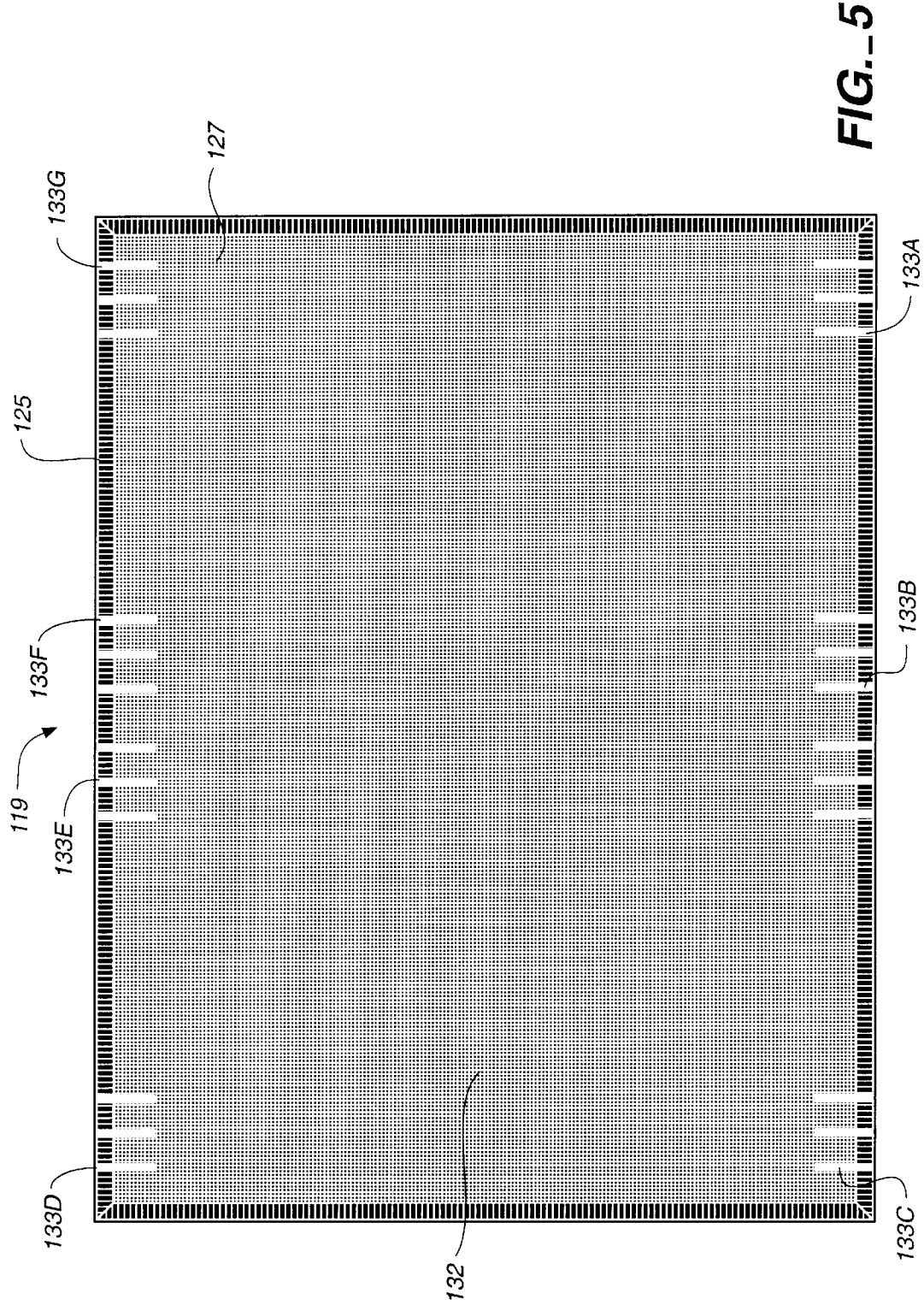
FIG._5

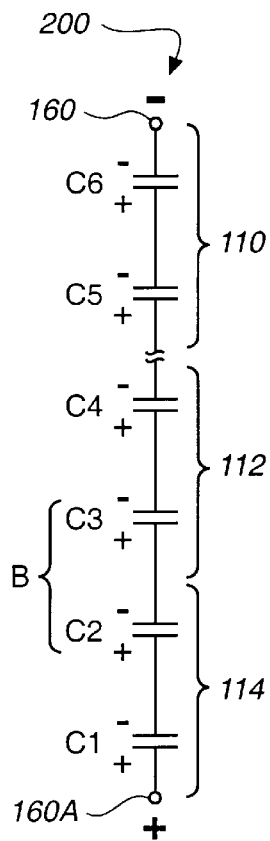
FIG._6
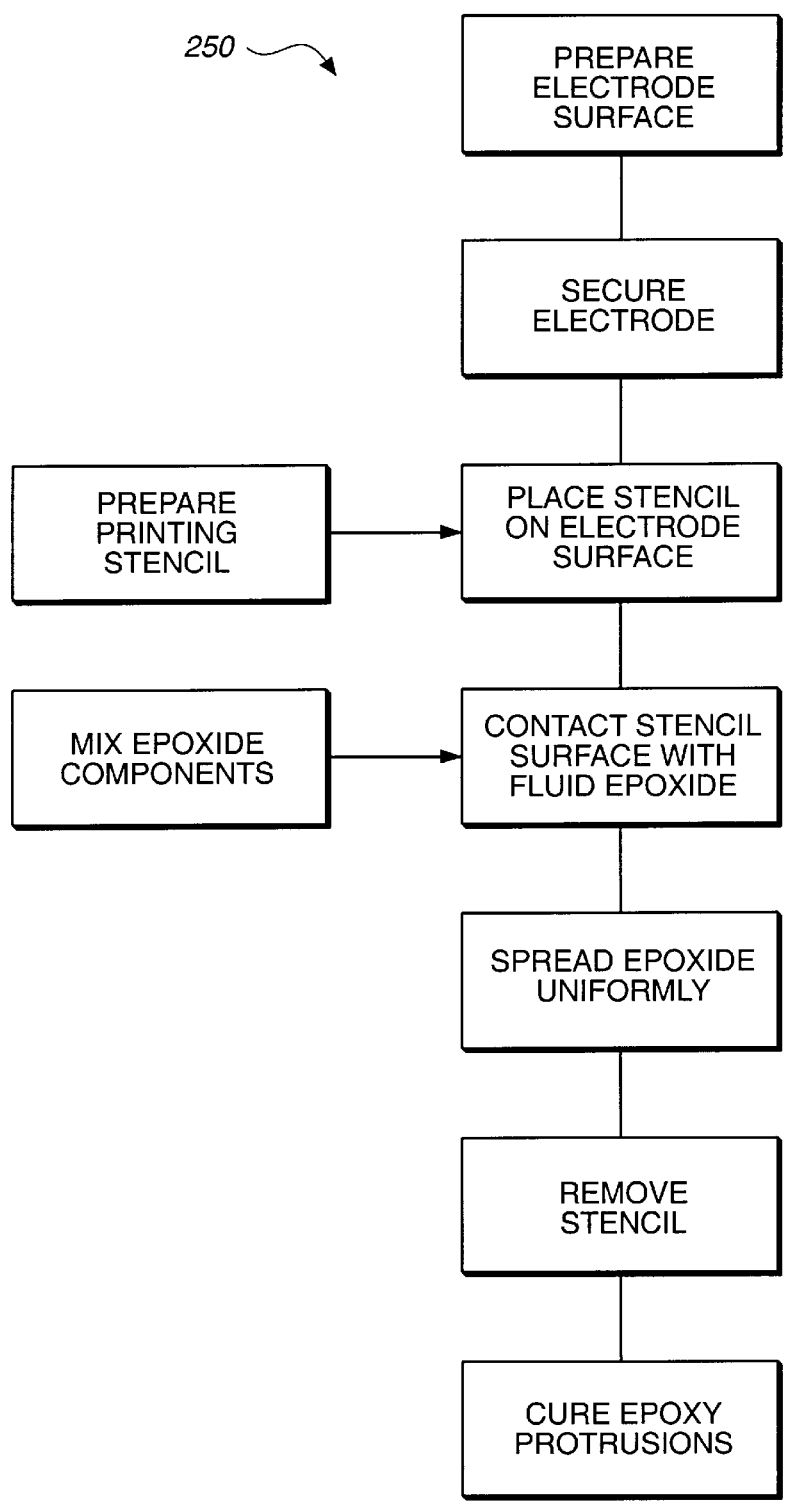
FIG._7

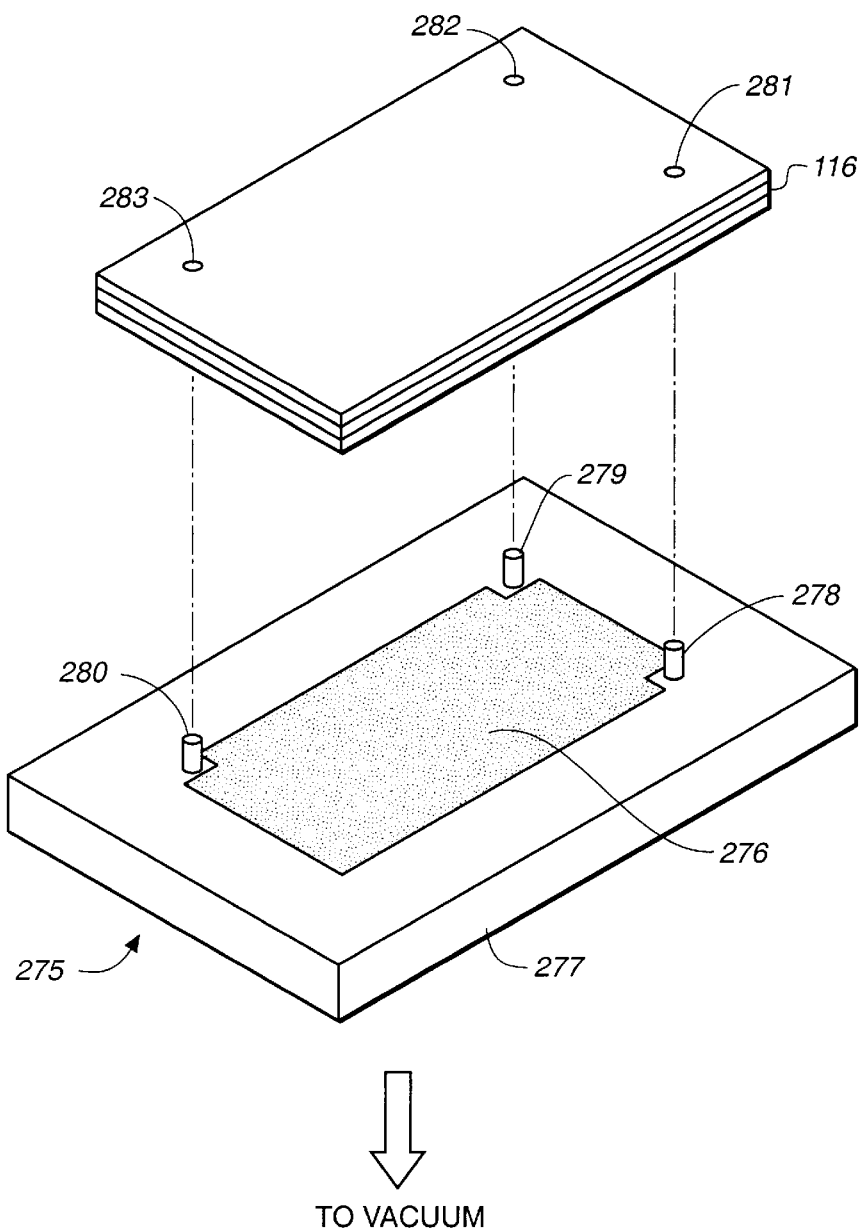
FIG._8

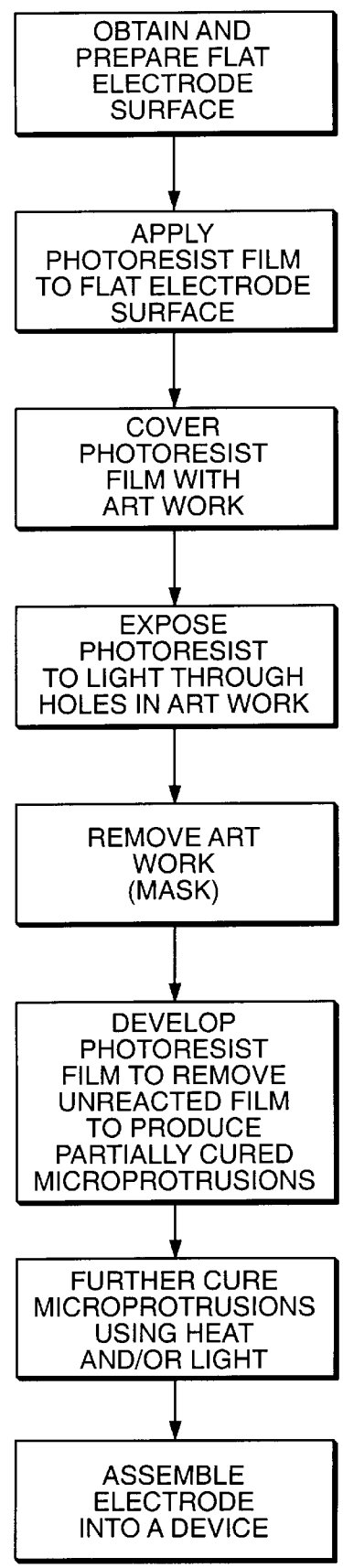
FIG._9

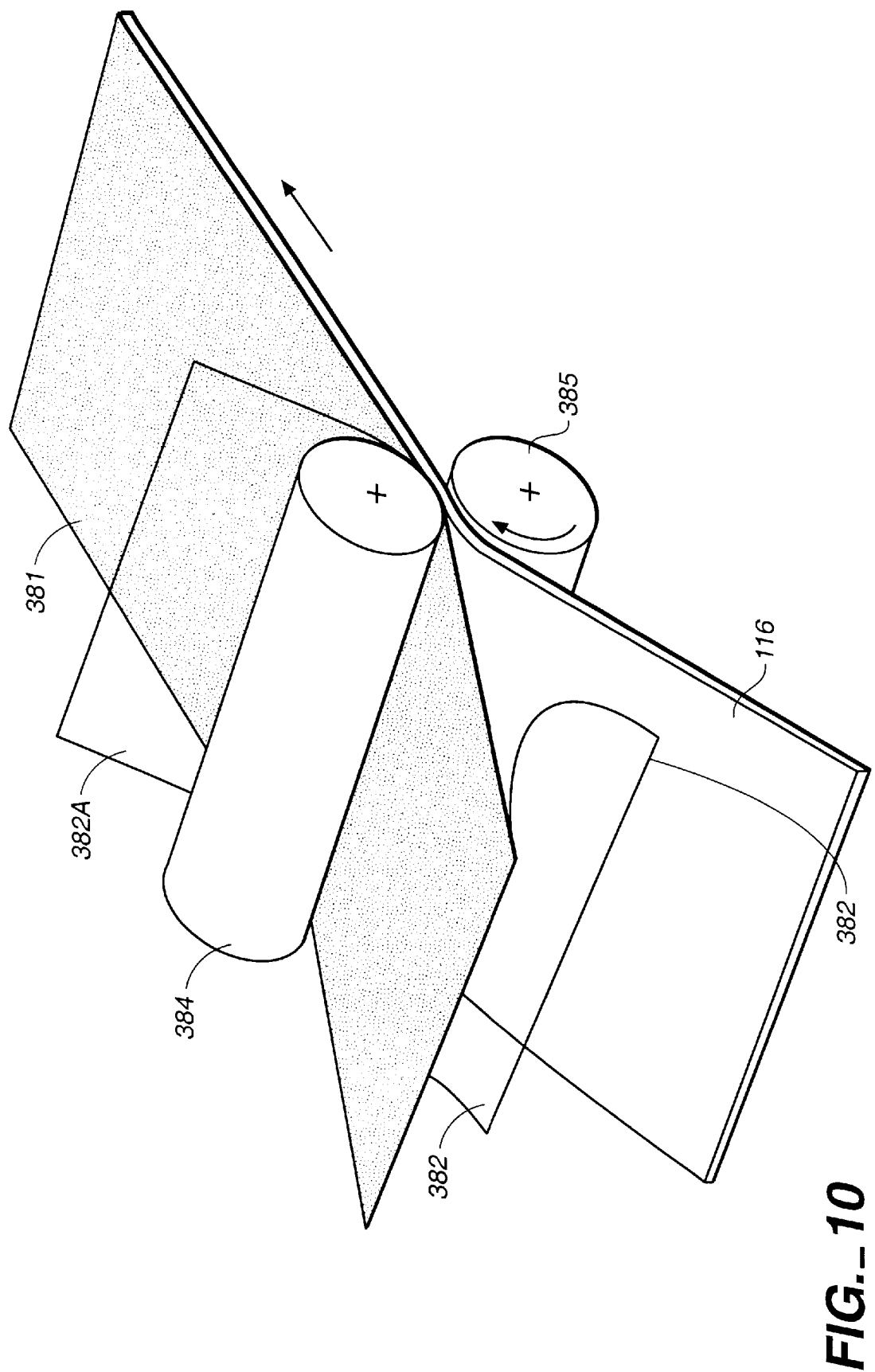
FIG._10

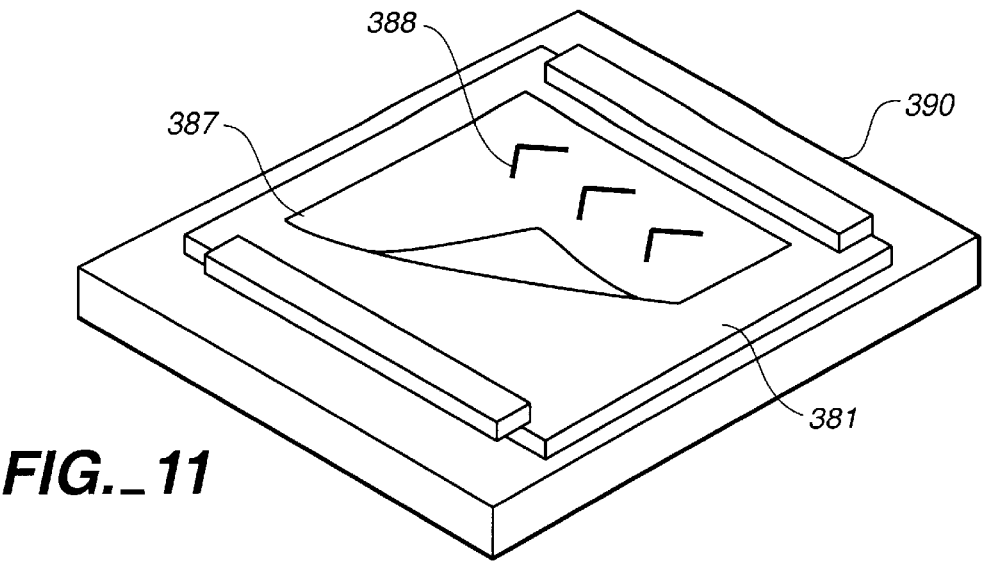
FIG._11
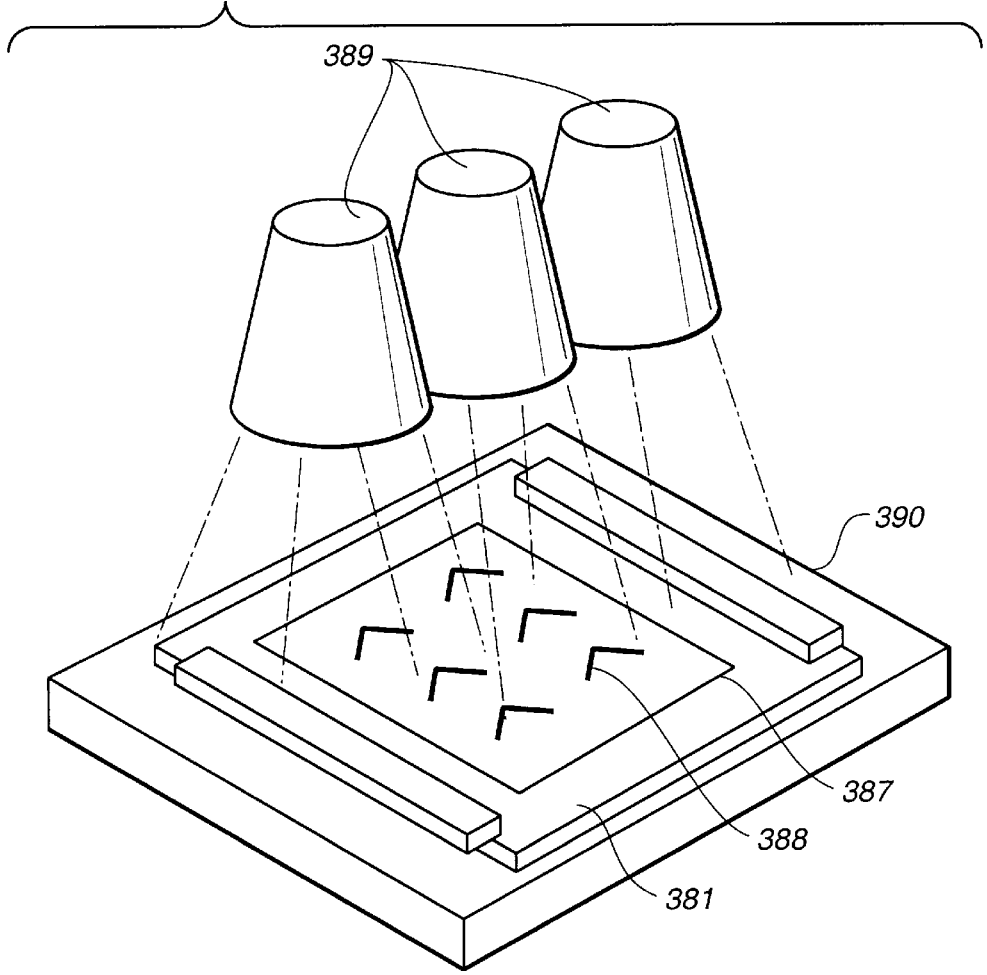
FIG._12

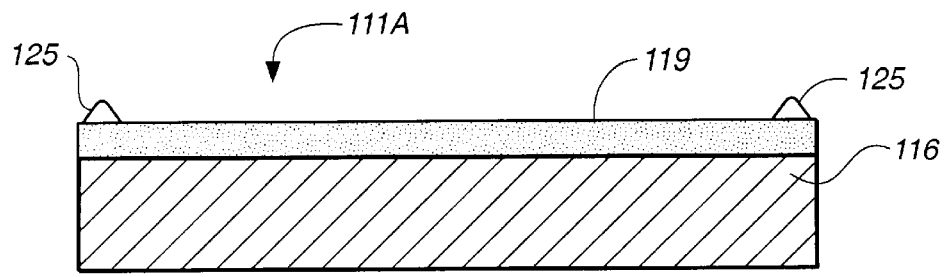
FIG._13
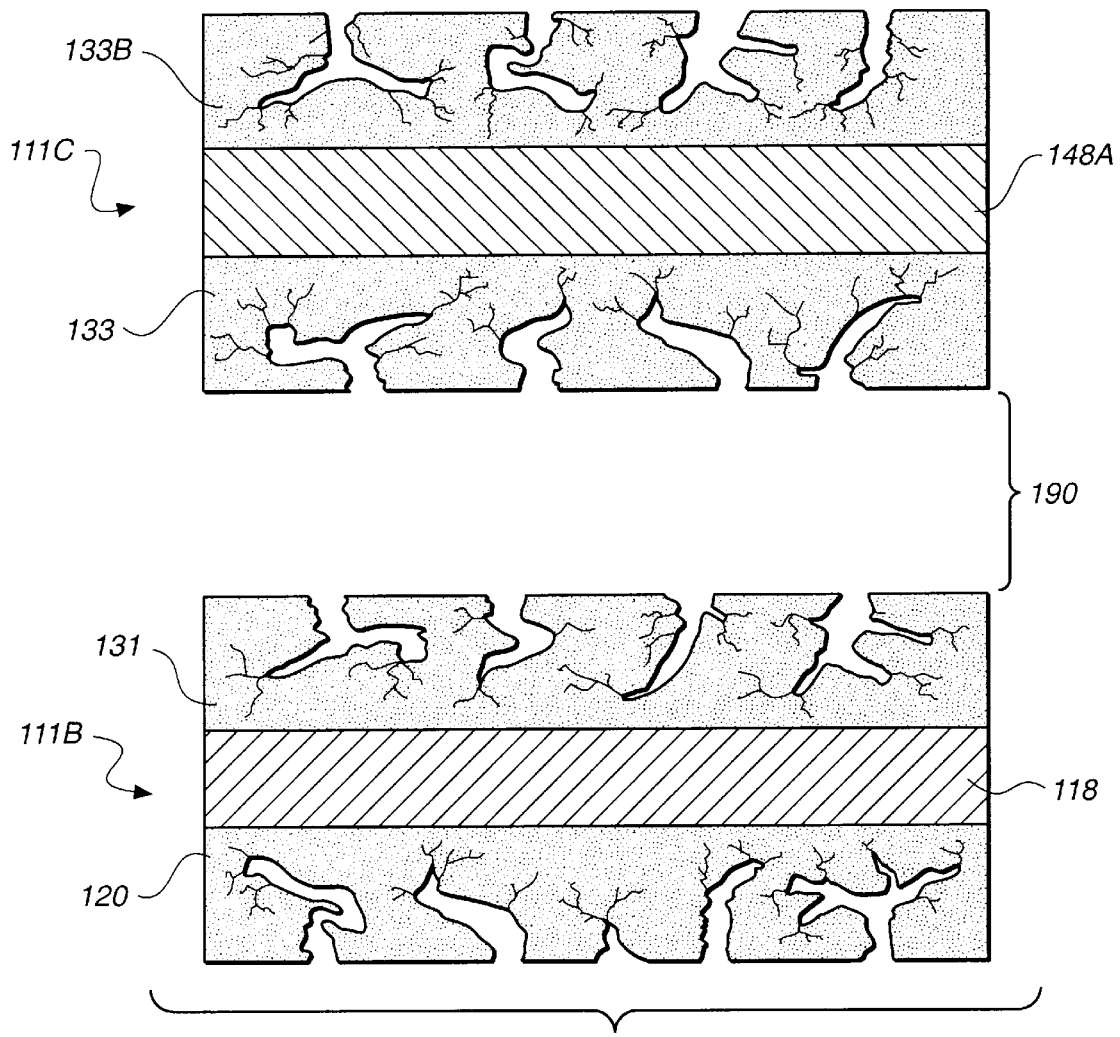
FIG._14

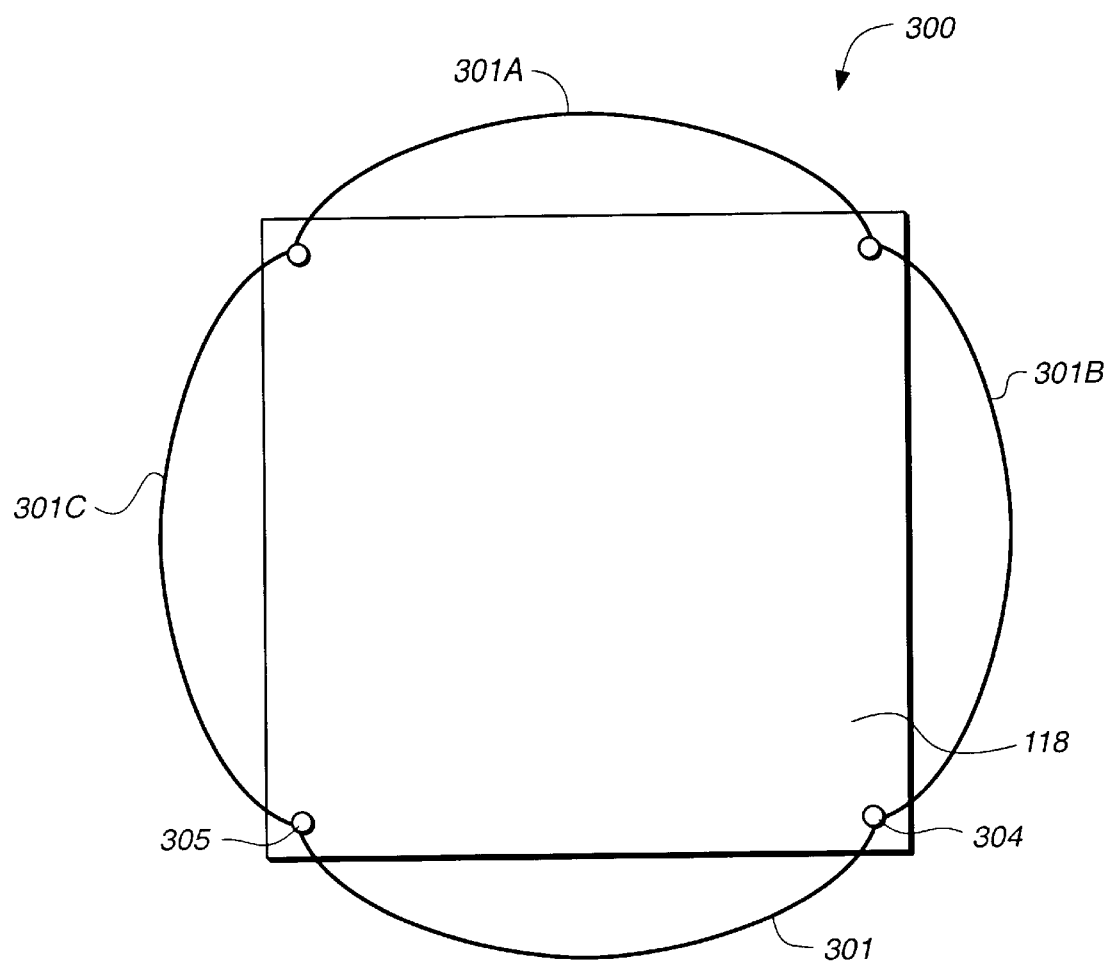
FIG._15
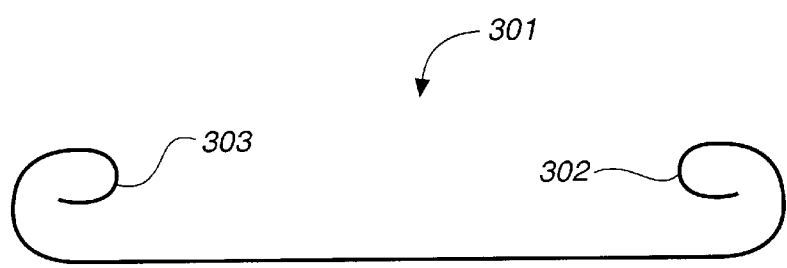
FIG._15A

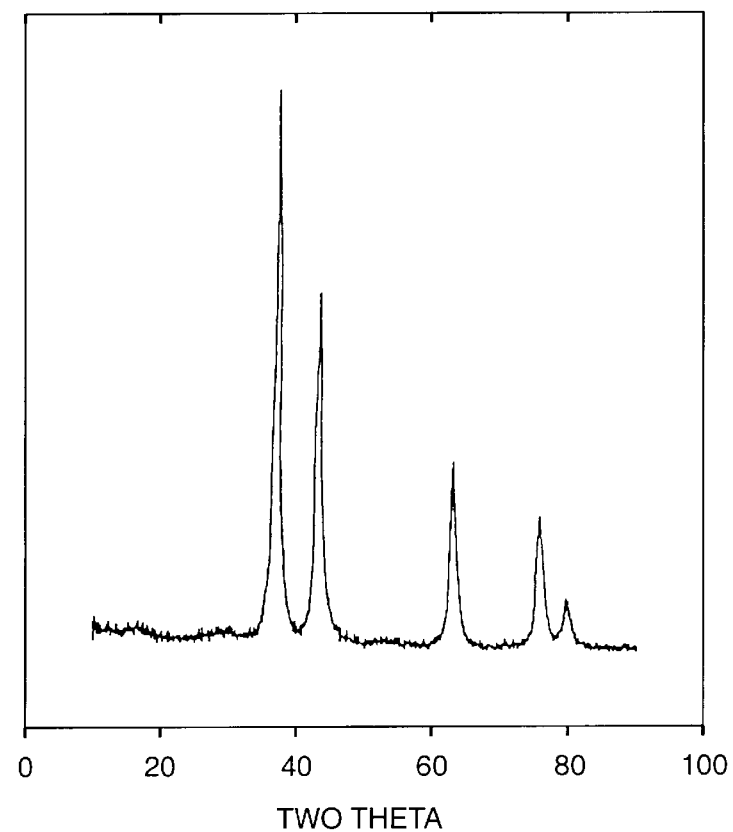
FIG._16
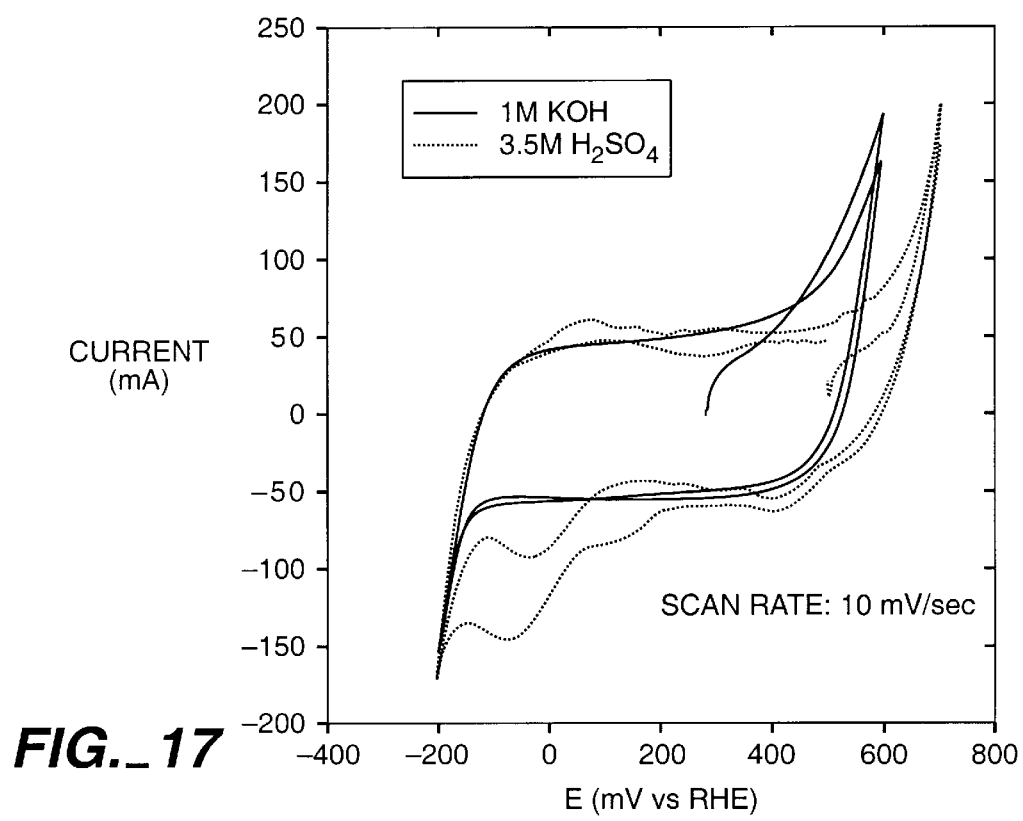
FIG._17

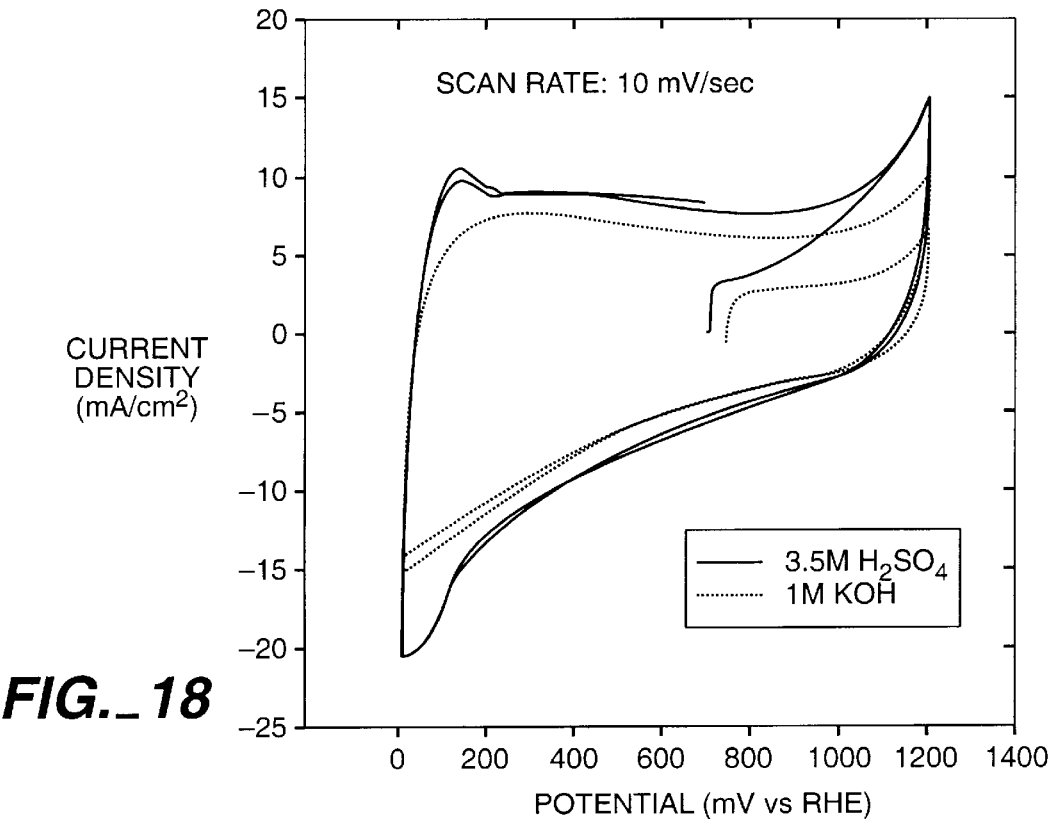
FIG._18
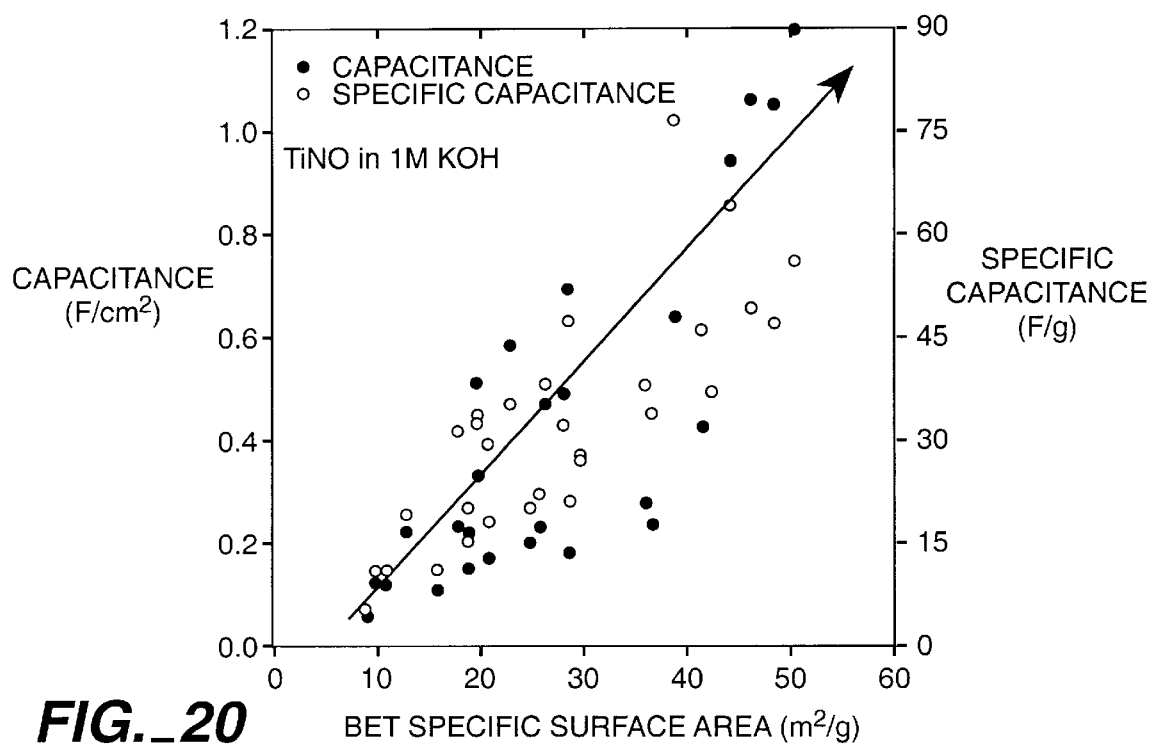
FIG._20

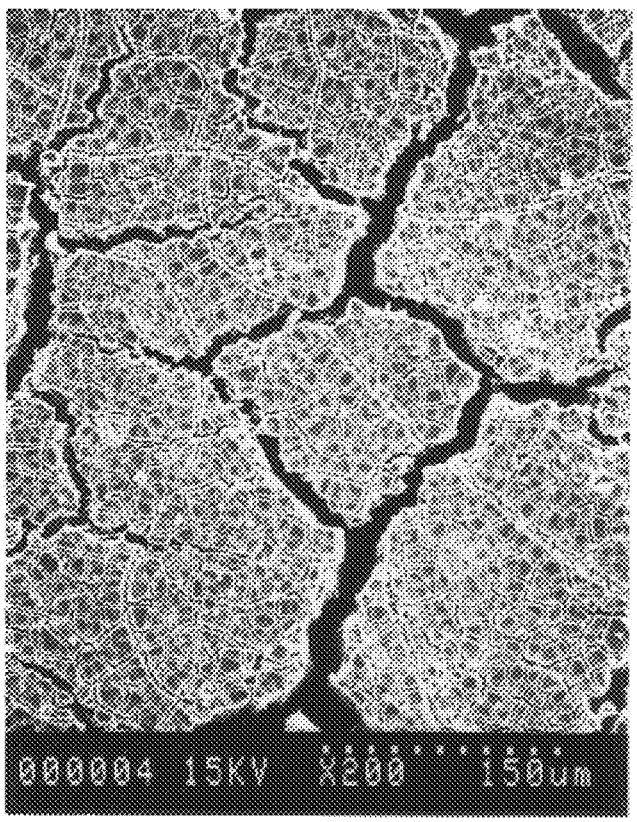
| (a) | |
|---|---|
| (F/cm²) | 0.3 |
| (m²/g) | 30.0 |
| COATS (#) | 30.0 |
FIG._19A
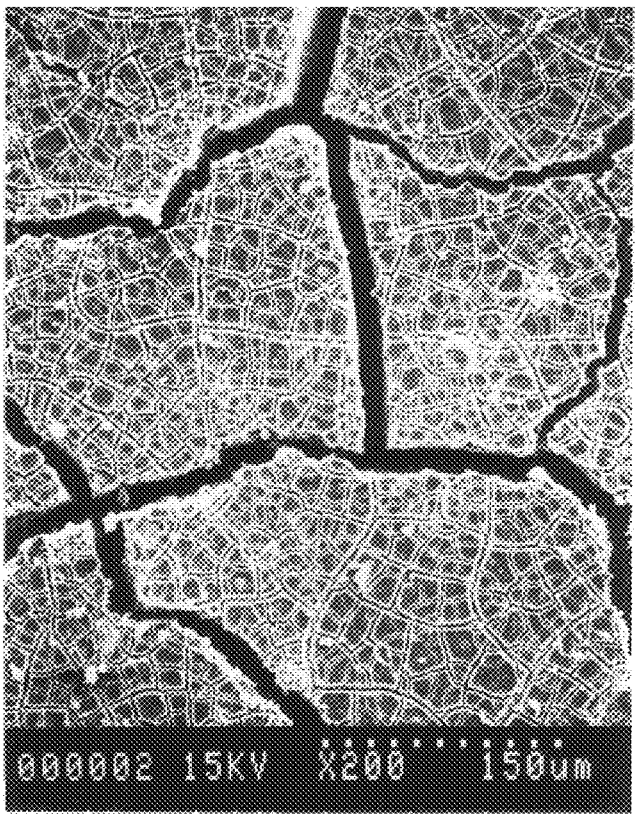
| (b) | |
|---|---|
| (F/cm²) | 0.9 |
| (m²/g) | 41.0 |
| COATS (#) | 30.0 |
FIG._19B

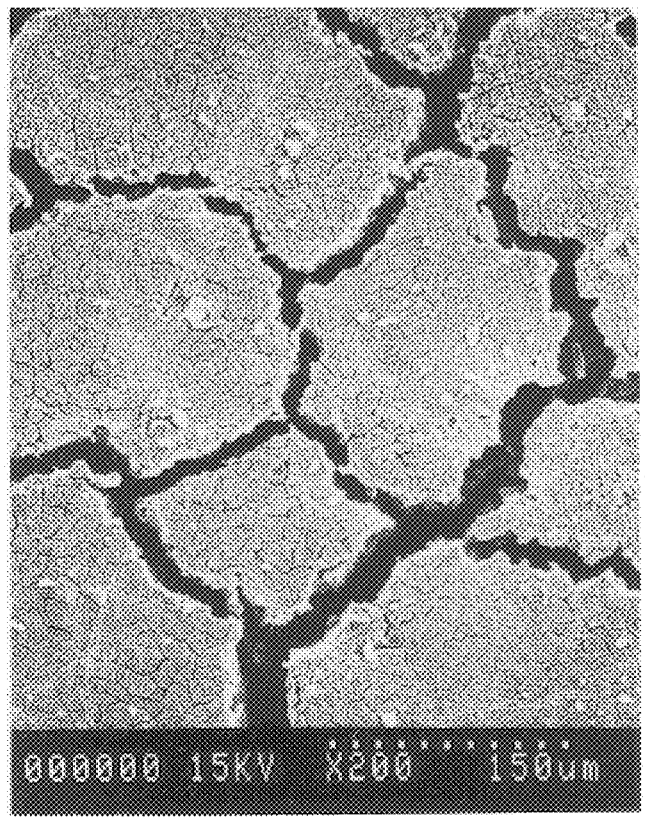
(F/cm²) (c) 1.4
(m²/g) 56.0
COATS (#) 40.0
FIG._19C
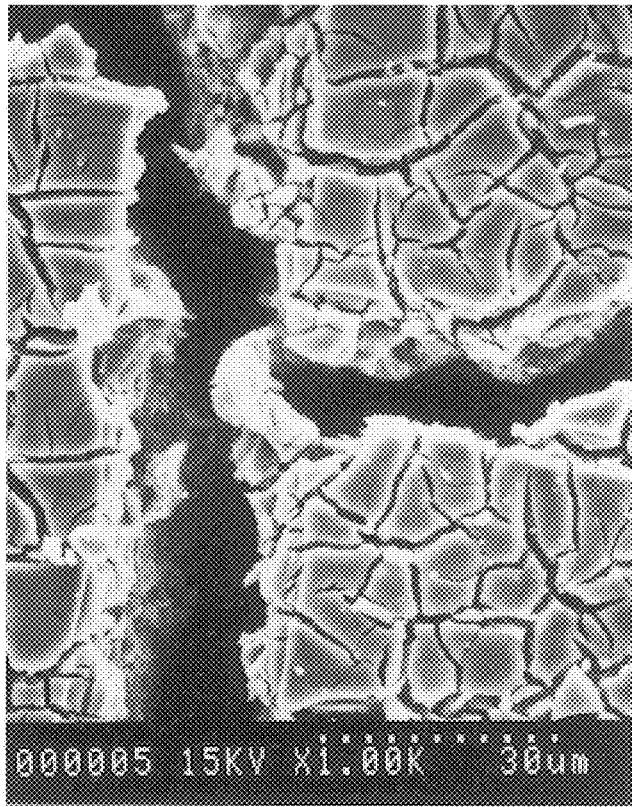
(F/cm²) (a) 0.3
(m²/g) 30.0
COATS (#) 30.0
FIG._19D

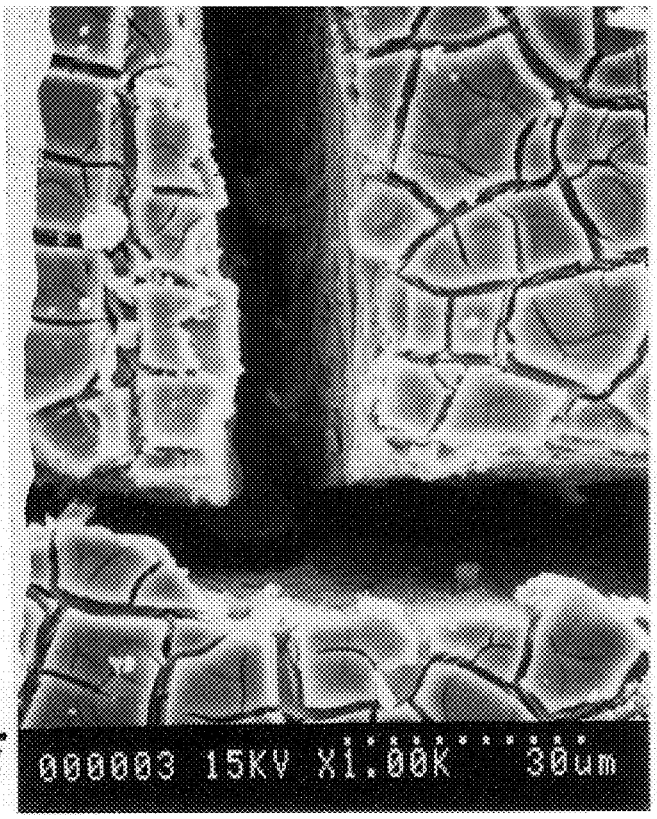
FIG._19E
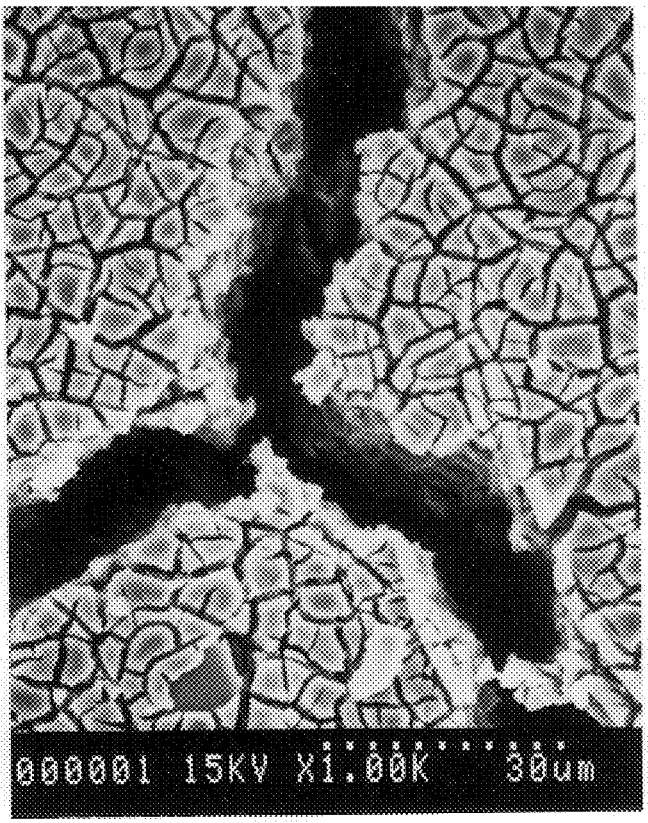
FIG._19F

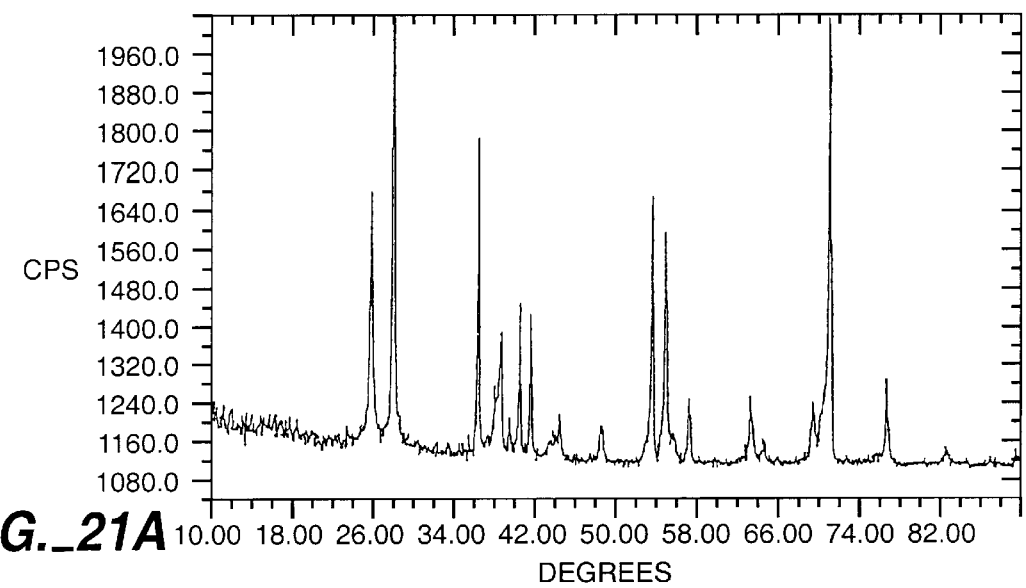
FIG._21A
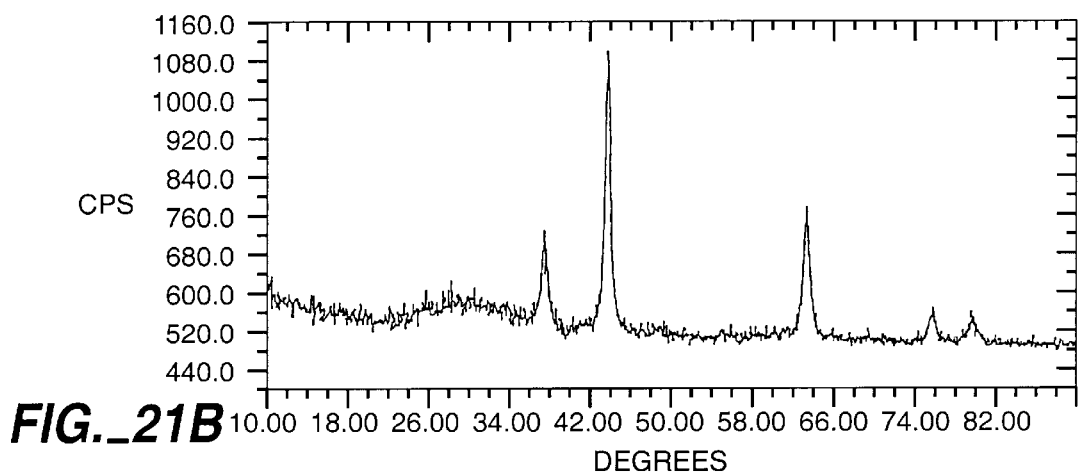
FIG._21B
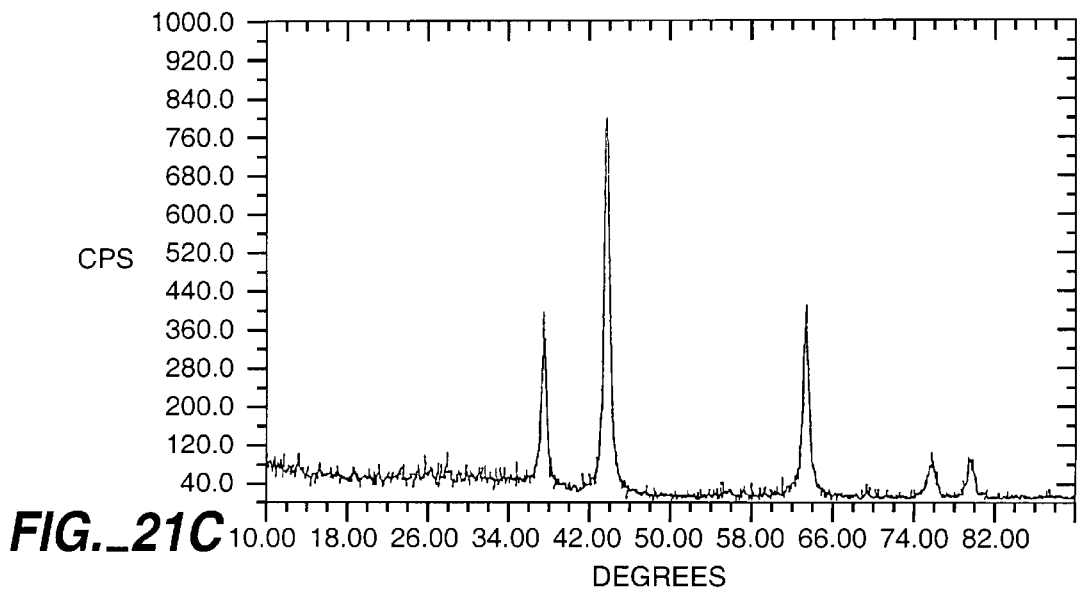
FIG._21C

(a) FRESH SAMPLE
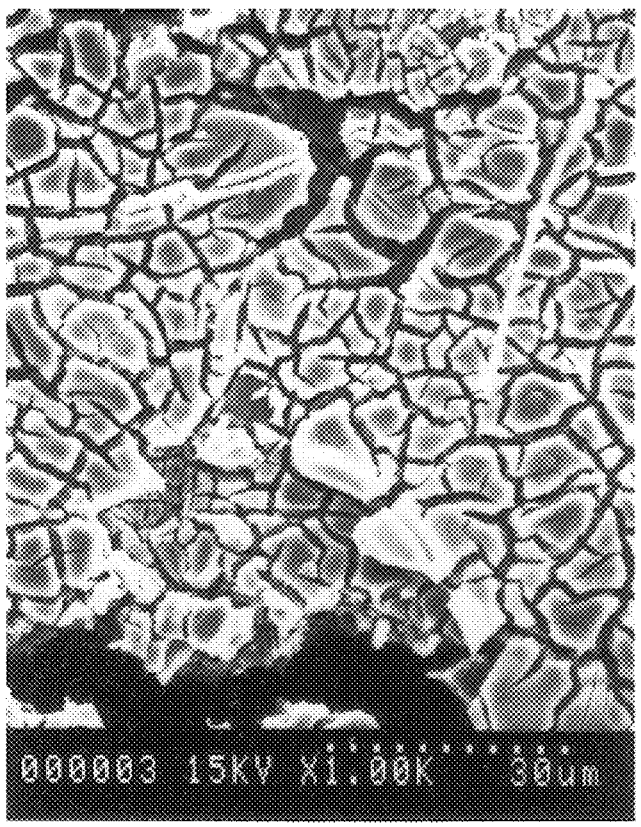
FIG._22A
(b) AFTER CV IN KOH
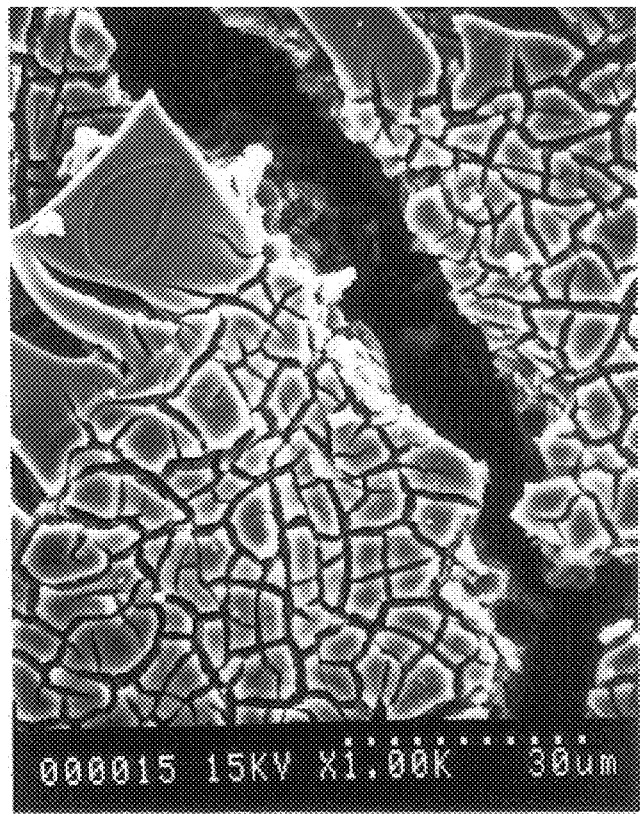
FIG._22B

(c) AFTER CV IN $H_2SO_4$
FIG._22C
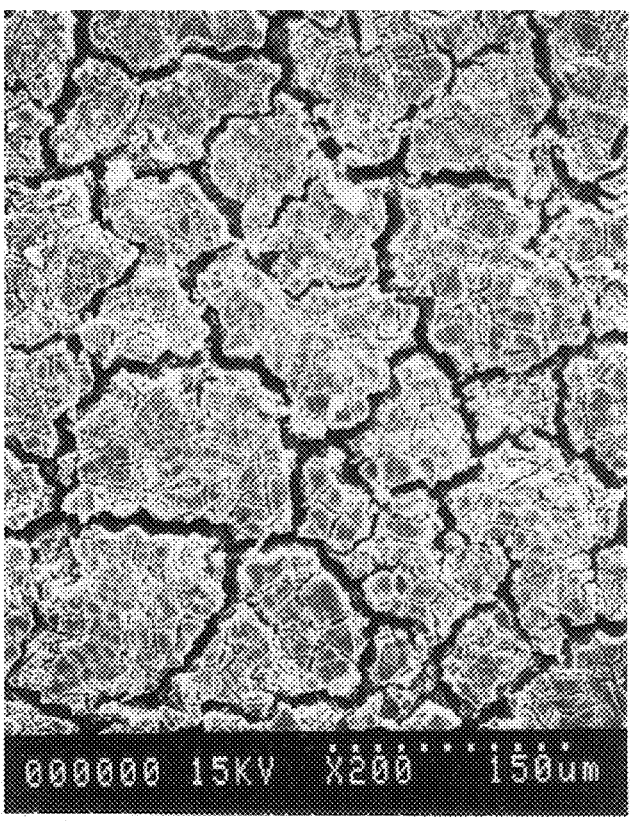
(a) 0% Mn MIXED
FIG._24A (a) TiNO (b) RuTaO$_x$

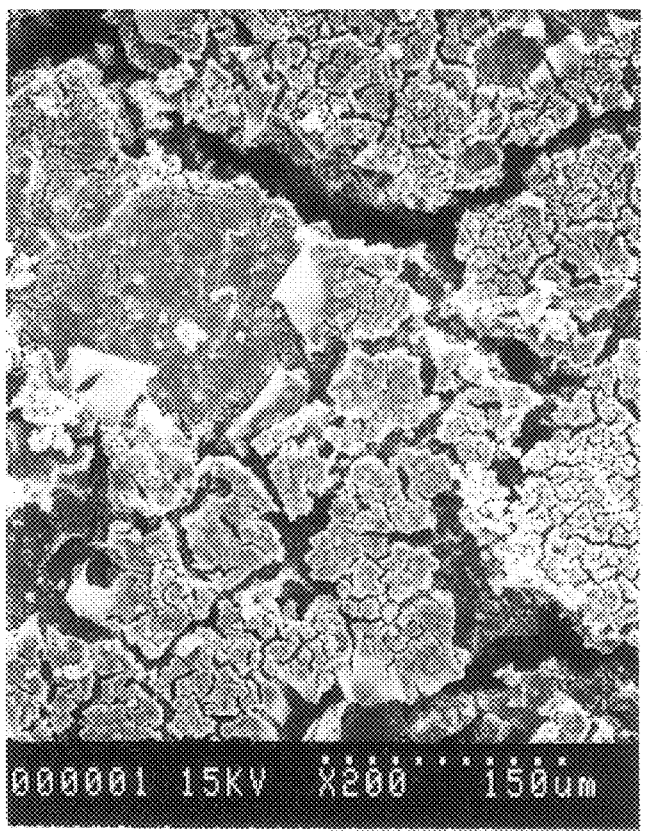
(b) 5% Mn MIXED
FIG._24B
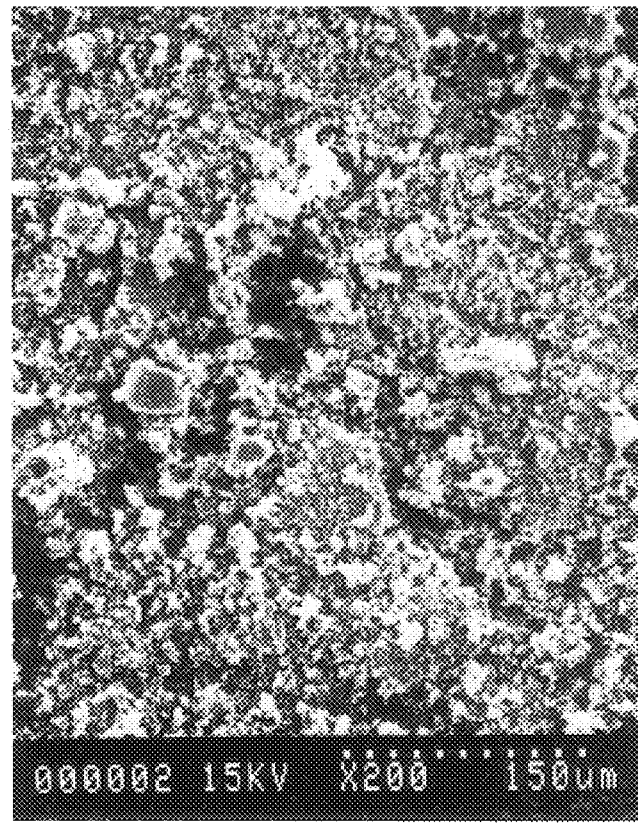
(c) 10% Mn MIXED
FIG._24C

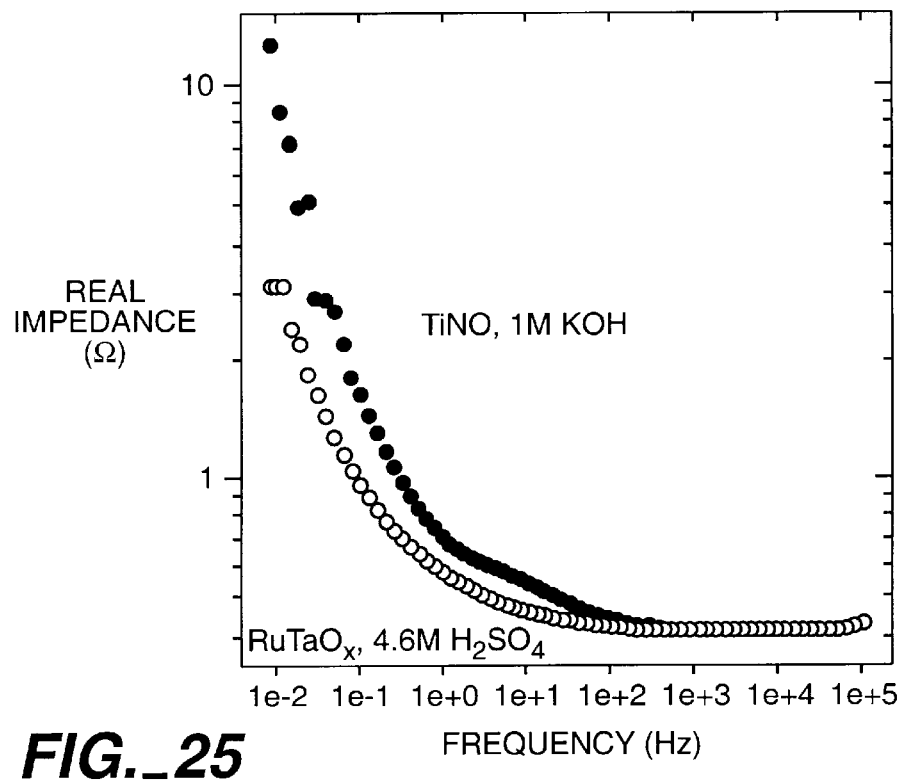
FIG._25
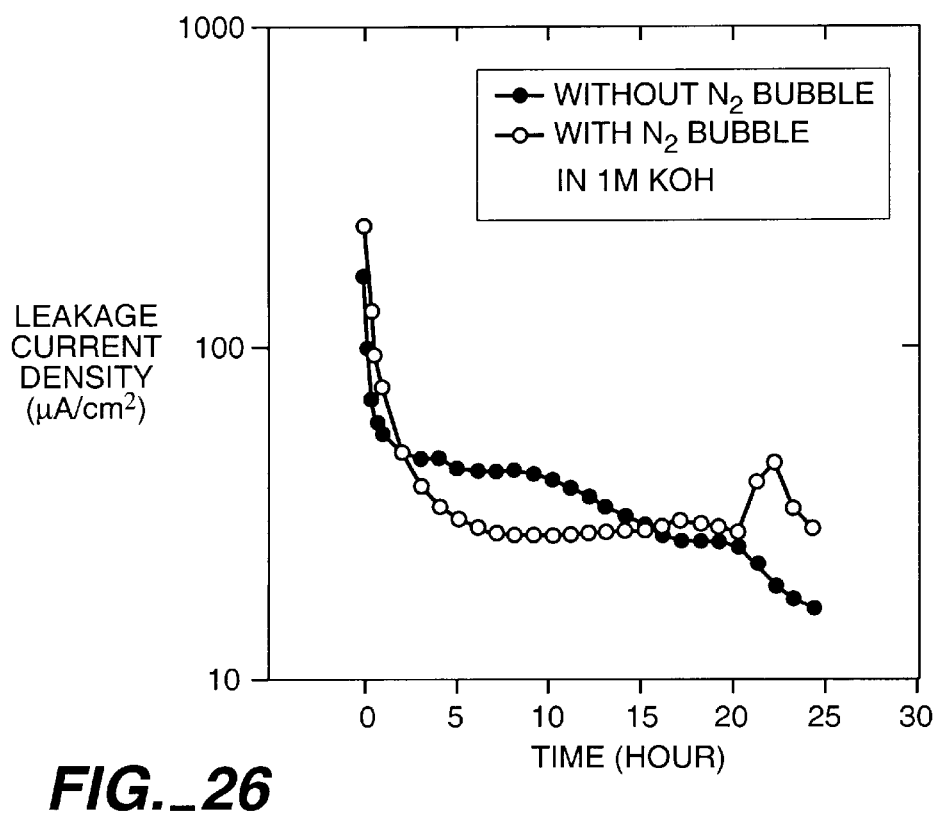
FIG._26

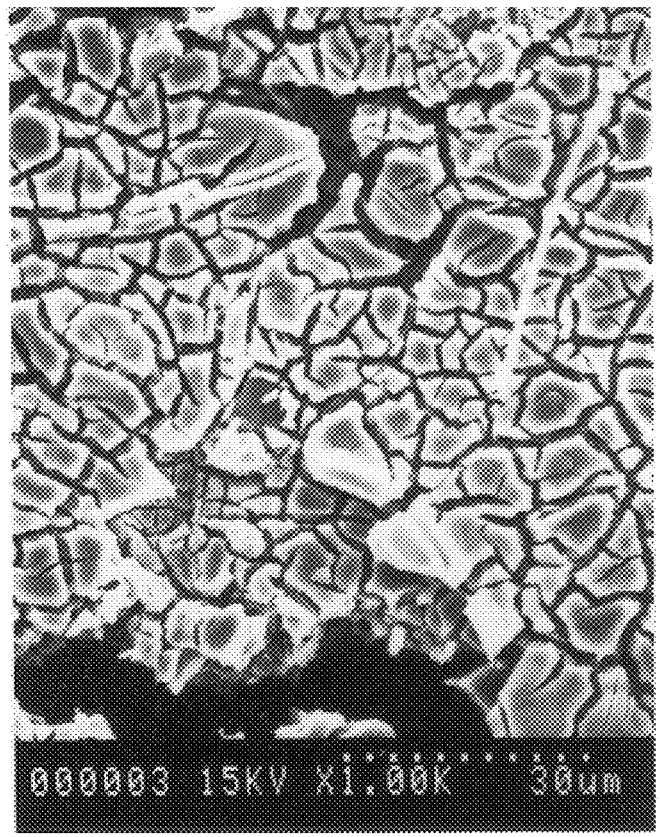
FIG._27A
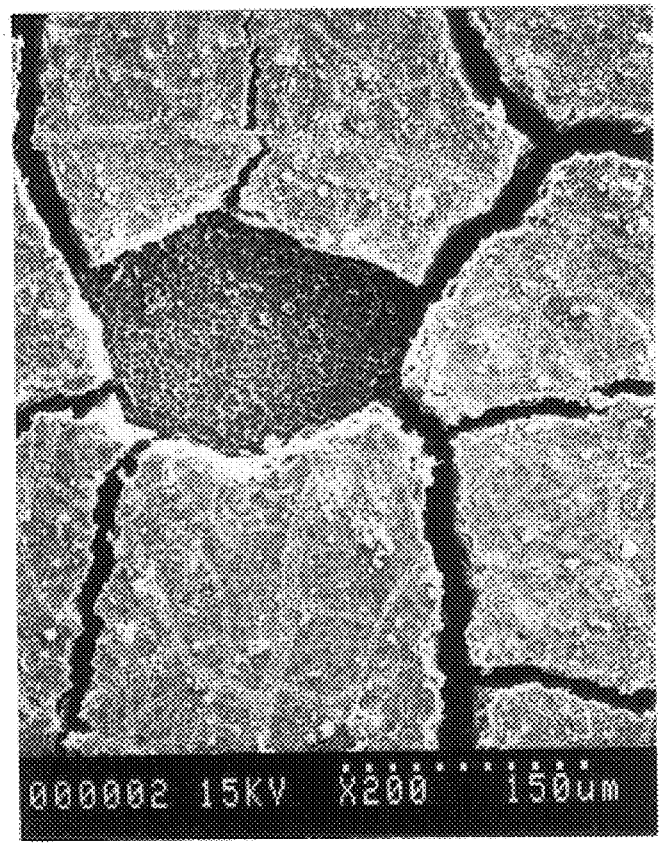
FIG._27B

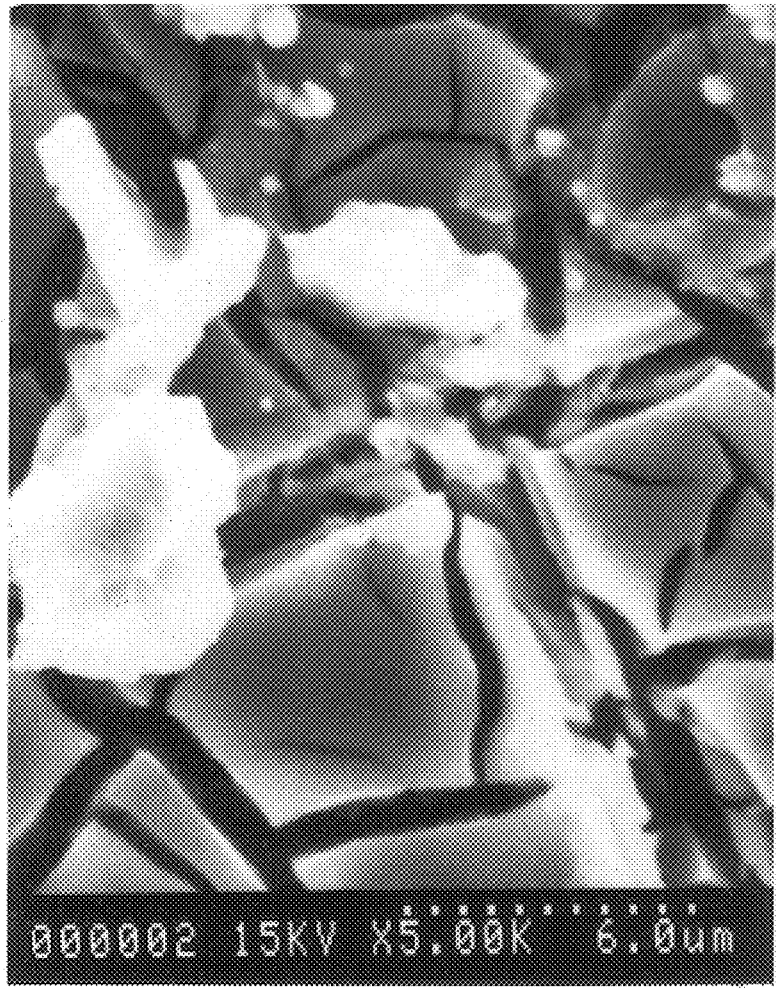
FIG._27C (a) TiNO
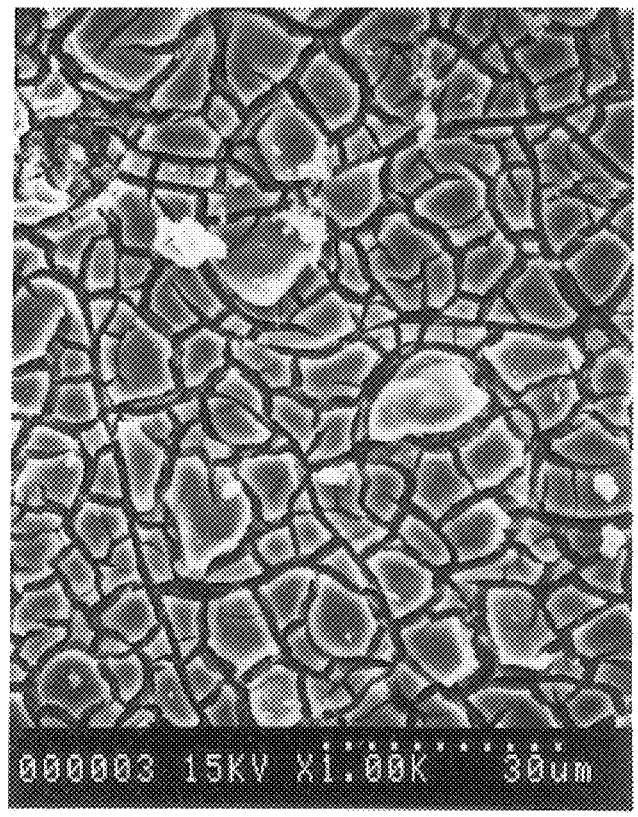
FIG._28A
(b) TiNO + TiO$_2$
FIG._28B

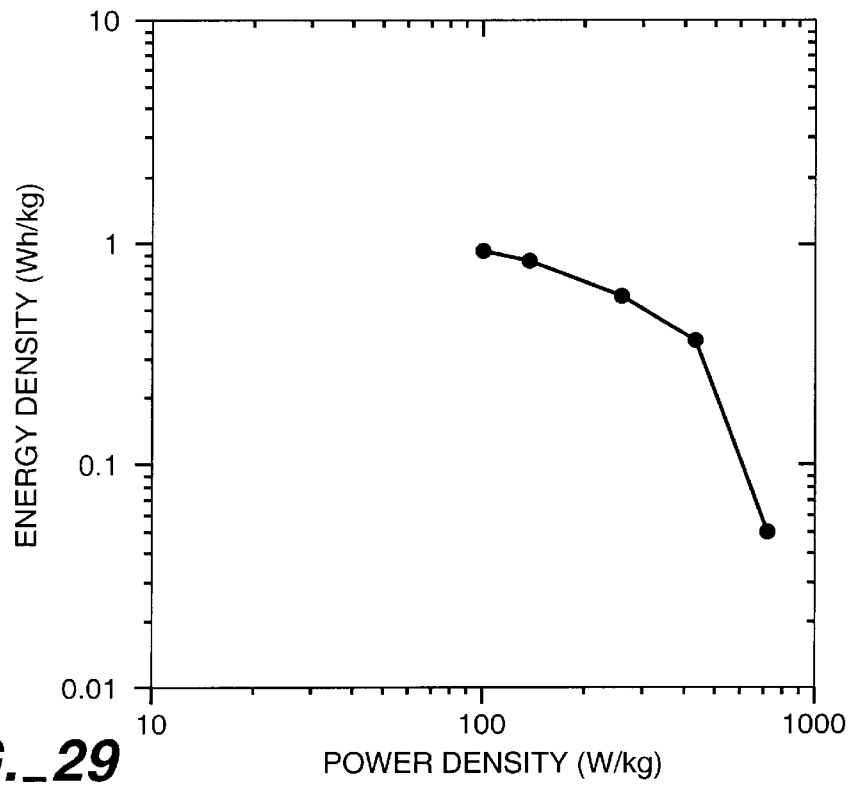
FIG._29
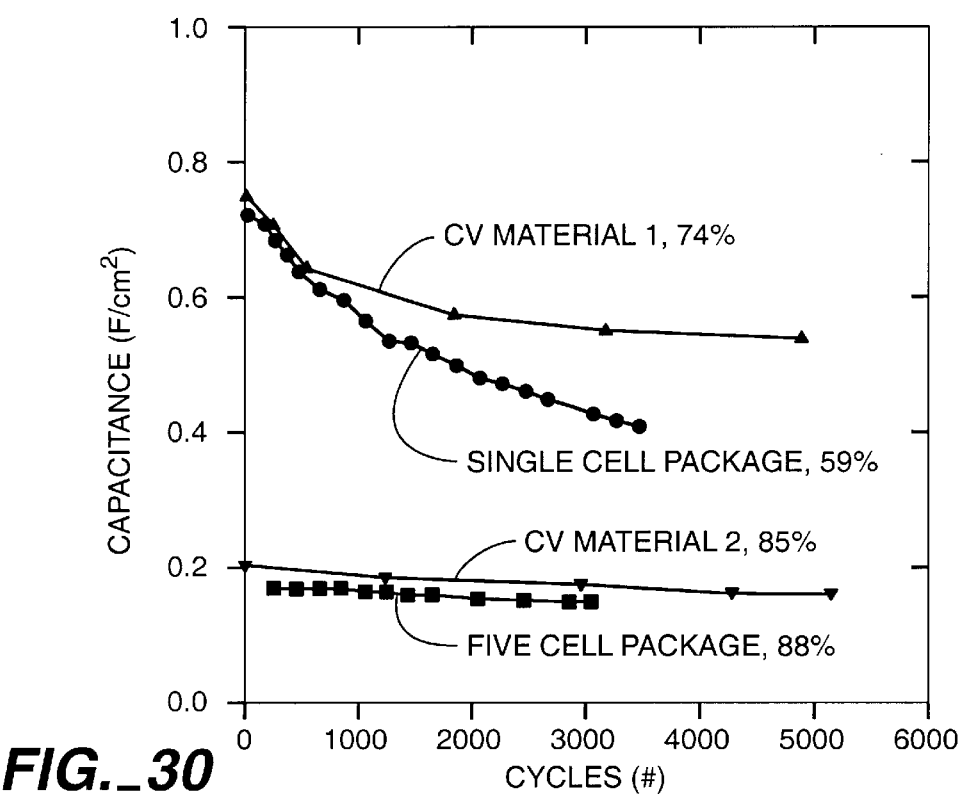
FIG._30

(a) TiNO
*FIG._31A*
(b) RuTaO$_x$
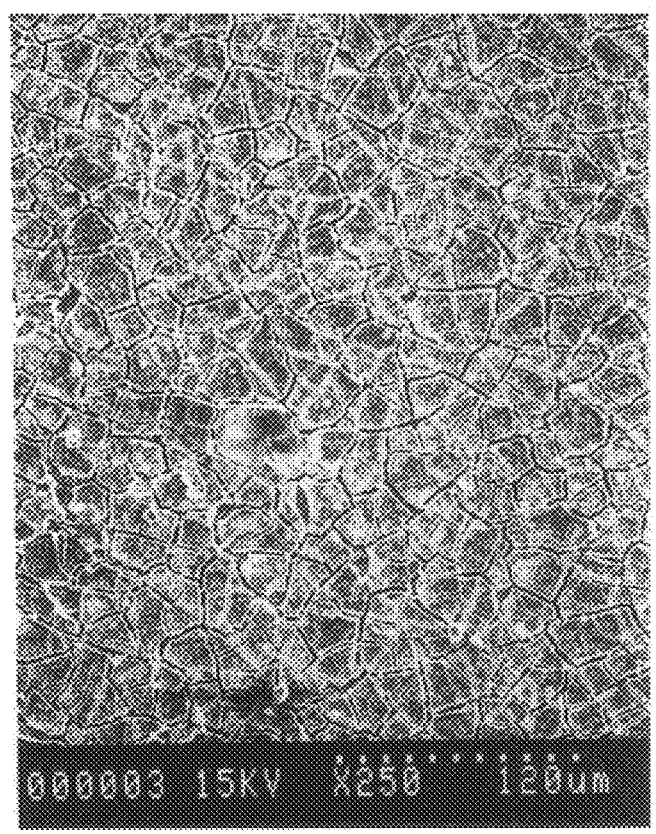
*FIG._31B*

METHOD OF PRODUCING HIGH SURFACE AREA METAL OXYNITRIDES AS SUBSTRATES IN ELECTRICAL ENERGY STORAGE

CROSS REFERENCE TO RELATED APPLICATIONS

This application is a continuation-in-part of U.S. Ser. No. 08/727,821, filed Sep. 30, 1996 now abandoned, which is a continuation-in-part of U.S. Ser. No. 08/219,965, filed Mar. 30, 1994 now U.S. Pat. No. 5,867,363, which claims priority on U.S. Philippine Serial No. 93/5773, filed Sep. 20, 1993 and which is also a continuation-in-part of U.S. Ser. No. 07/947,414, filed Sep. 18, 1992, now U.S. Pat. No. 5,384,685, U.S. Ser. No. 07/947,294, filed Sep. 18, 1992, now U.S. Pat. No. 5,464,453, and U.S. Ser. No. 07/958,506, filed Oct. 7, 1992, now abandoned. It is also a continuation-in-part of and claims priority on PCT/US95/03985, filed Mar. 30, 1995, which claims priority on U.S. Ser. No. 08/219,965, filed Mar. 30, 1994 now U.S. Pat. No. 5,867,363 and U.S. Ser. No. 08/377,121, filed Jan. 23, 1995 now U.S. Pat. No. 5,711,988.

BACKGROUND OF THE INVENTION

1. Field of the Invention

The present invention concerns a process for the formation of a thin film of a porous metal oxynitride having a high surface area on the surface of an electrically conducting substrate. The metal chloride is dissolved in a volatile organic liquid, a substrate is coated with a film, the film is converted to the porous metal oxide which is then converted to the porous metal oxynitride. The thin layer metal oxynitride covered-substrate is useful for electrical energy storage as an electrode in a capacitor or battery configuration.

The present invention generally relates to an energy storage device, and more particularly to a bipolar double layer capacitor-type energy storage device, and to improved methods for manufacturing the same.

2. Description of the Related Art

Energy Storage Devices—There has been significant research over the years, relating to useful reliable electrical storage devices, such as a capacitor or a battery. Large energy storage capabilities are common for batteries; however, batteries also display low power densities. In contrast, electrolytic capacitors possess very high power densities and a limited energy density. Further, carbon based electrode double-layer capacitors have a large energy density; but, due to their high equivalent series resistance (ESR), have low power capabilities. It would therefore be highly desirable to have an electrical storage device that has both a high energy density and a high power density.

A review by B. E. Conway in *J. Electrochem. Soc.*, vol. 138 (#6), p. 1539 (June 1991) discusses the transition from "supercapacitor" to "battery" in electrochemical energy storage, and identifies performance characteristics of various capacitor devices.

D. Craig, Canadian Patent No.1,196,683, in November 1985, discusses the usefulness of electric storage devices based on ceramic-oxide coated electrodes and pseudo-capacitance. However, attempts to utilize this disclosure have resulted in capacitors which have inconsistent electrical properties and which are often unreliable. These devices cannot be charged to 1.0 V per cell, and have large, unsatisfactory leakage currents. Furthermore, these devices have a very low cycle life. In addition, the disclosed packaging is inefficient.

M. Matroka and R. Hackbart, U.S. Pat. No. 5,121,288, discusses a capacitive power supply based on the Craig patent which is not enabling for the present invention. A capacitor configuration as a power supply for a radiotelephone is taught; however, no enabling disclosure for the capacitor is taught.

J. Kalenowsky, U.S. Pat. No. 5,063,340, discusses a capacitive power supply having a charge equalization circuit. This circuit allows a multicell capacitor to be charged without overcharging the individual cells. The present invention does not require a charge equalization circuit to fully charge a multicell stack configuration without overcharging an intermediate cell.

H. Lee, et al. in *IEEE Transactions on Magnetics*, Vol. 25 (#1), p.324 (January 1989), and G. Bullard, et al., in *IEEE Transactions on Magnetics*, Vol. 25 (#1) p. 102 (January 1989) discuss the pulse power characteristics of high-energy ceramic-oxide based double-layer capacitors. In this reference various performance characteristics are discussed, with no enabling discussion of the construction methodology. The present invention provides a more reliable device with more efficient packaging.

Carbon electrode based double-layer capacitors have been extensively developed based on the original work of Rightmire, U.S. Pat. No. 3,288,641. A. Yoshida et al., in *IEEE Transactions on Components, Hybrids and Manufacturing Technology*, Vol. CHMT-10, #1, P-100–103 (March 1987) discusses an electric double-layer capacitor composed of activated carbon fiber electrodes and a nonaqueous electrolyte. In addition, the packaging of this double-layer capacitor is revealed. This device is on the order of 0.4–1 cc in volume with an energy storage capability of around 1–10 J/cc.

T. Suzuki, et al., in *NEC Research and Development*, No. 82, pp. 118–123, July 1986, discloses improved self-discharge characteristics of the carbon electric double-layer capacitor with the use of porous separator materials on the order of 0.004 inches thick. An inherent problem of carbon based electrodes is the low conductivity of the material resulting in a low current density being delivered from these devices. A second difficulty is that the construction of multicell stacks is not done in a true bipolar electrode configuration. These difficulties result in inefficient packaging and lower energy and power density values.

Ultracapacitors provide one approach to meet the high power requirements for the advanced energy storage system for many uses, from cardiac pacemakers to cellular phones to the electric automobile. Until recently, the only packaged high power ultracapacitor material available for significant charge storage has been a mixed ruthenium and tantalum oxide (Z. W. Sun and K. C. Tsai, *J. Electrochem. Soc. Ext. Abs.*, vol. 95-2, pp. 73–76 (1995) and R. Tong et al., U.S. Pat. No. 5,464,453 (1995)). Unfortunately, ruthenium and tantalum oxide are expensive.

Additional references of interest include, for example:

The state of solid state micro power sources is reviewed by S. Sekido in *Solid State Ionics*, vol. 9, 10, pp. 777–782 (1983).

M. Pham-Thi et al. in the *Journal of Materials Science Letters*, vol. 5, p. 415 (1986) discusses the percolation threshold and interface optimization in carbon based solid electrolyte double-layer capacitors.

Various disclosures discuss the fabrication of oxide coated electrodes and the application of these electrodes in the chlor-alkali industry for the electrochemical generation of chlorine. See for example: V. Hock, et al. U.S. Pat. No.

5,055,169 issued Oct. 8, 1991; H. Beer U.S. Pat. No. 4,052,271 issued Oct. 4, 1977; and A. Martinsons, et al. U.S. Pat. No. 3,562,008 issued Feb. 9, 1971. These electrodes, however, in general do not have the high surface areas required for an efficient double-layer capacitor electrode.

It would be useful to have a reliable long-term electrical storage device, and improved methods to produce the same. It would also be desirable to have an improved energy storage device with energy densities of at least 20–90 J/cc.

Packaging of Energy Storage Devices—As mentioned above, there has been significant research over the years regarding electrical storage devices of high energy and power density. The efficient packaging of the active materials, with minimum wasted volume, is important in reaching these goals. The space separating two electrodes in a capacitor or a battery is necessary to electrically insulate the two electrodes. However, for efficient packaging, this space or gap should be a minimum. It would therefore be highly desirable to have a method to create a space separator or gap that is substantially uniform and of small dimension (less than 5 mil (0.0127 cm).

A common way to maintain separation between electrodes in an electrical storage device with an electrolyte present (such as a battery or capacitor) is by use of an ion permeable electrically insulating porous membrane. This membrane is commonly placed between the electrodes and maintains the required space separation between the two electrodes. Porous separator material, such as paper or glass, is useful for this application and is used in aluminum electrolytic and double layer capacitors. However, for dimensions below 1 or 2 mil (0.00254 to 0.00508 cm) in separation, material handling is difficult and material strength of the capacitor is usually very low. In addition, the open cross-sectional areas typical of these porous membrane separators are on the order of 50–70%.

Polymeric ion permeable porous separators have been used in carbon double layer capacitors as discussed by Sanada et al. in IEEE, pp.224–230, 1982, and by Suzuki et al. in *NEC Research and Development*, No. 82, pp. 118–123, July 1986. These type of separators suffer from the problem of a small open area which leads to increased electrical resistance.

A method of using photoresist to fill voids of an electrically insulating layer to prevent electrical contact between two electrode layers for use as a solar cell is disclosed by J. Wilfried in U.S. Pat. No. 4,774,193, issued Sep. 27, 1988.

A process of creating an electrolytic capacitor with a thin spacer using a photosensitive polymer resin solution is disclosed by Maruyama et al in U.S. Pat. No. 4,764,181 issued Aug. 16, 1988. The use of solution application methods described with a porous double-layer capacitor electrode would result in the undesirable filling of the porous electrode.

A number of reports are found in the art to produce various metal nitrides having high surface area. Metal nitrides of particular interest include molybdenum nitride, titanium nitride or iron nitride.

Some additional specific references in this art include the following:

PCT/US93/08803, filed Sep. 17, 1993, Inventors: Tsai, K. C. et al., Int. Pub. No.: WO 94/07272, Int. Pub. Date: Mar 31, 1994.

PCT/US95/03985, filed Mar. 30, 1995, Inventors: Tsai, K. C. et al., Int. Pub. No.: WO 95/26833, Int. Pub. Date: Oct 12, 1995.

PCT/US95/15994, filed Dec. 11, 1995; Inventors: L. T. Thompson et al., Int. Pub. No. WO 96/19003, Int. Pub. Date: Jun. 20, 1996.

Robert R. Tong, et al., U.S. Pat. No. : 5,464,453, Issued: Nov. 7, 1995, U.S. Ser. No.: 947,294, Filed: Sep. 18, 1992, U.S. Cl. 29/25.03.

Robert Tong et al., U.S. Pat. No. : 5,384,685, Issued: Jan. 24, 1995, U.S. Ser. No.: 947,414, Filed: Sep. 18, 1992, U.S. Cl. 361/503.

Additional U.S. Patents of general interest include U.S. Pat. Nos. 4,515,763; 4,851,206; 5,062,025; 5,079,674; 4,327,400; and 5,185,679.

Molybdenum Nitride ($Mo_2N$, $MoN$)—Low cost, high surface area, and conductive molybdenum nitride is a potential candidate as an alternative material for a high charge storage capacitor. Many reports appear in the literature which describe the formation of molybdenum nitride as a powder having high surface area. A number are listed below. However, none of these references disclose the formation of an adherent film of high surface area molybdenum nitride having improved adhesion on a substrate on a surface. The reaction of powdered molybdenum oxide ($MoO_3$) with ammonia ($NH_3$) is described to produce γ-molybdenum nitride ($Mo_2N$), which has a fcc structure with a surface area in excess 200 $m^2$/g (L. Volpe and M. Boudart, *J. Solid State Chem.*, 59, 332 (1985)).

For molybdenum nitride production and testing, the following art is of interest:

D. Finello in "New Developments in Ultracapacitor Technology" reported at the Fourth International Seminar on Double Layer Capacitors and Similar Energy Storage Devices (Volume 4) Dec. 12–14, 1994, Deerfield Beach, Fla. reported a study of a molybdenum nitride sample. The molybdenum nitride was described as being prepared by treatment of the oxide film on the surface of a solid foil with ammonia at elevated temperatures. The results show that the nitride is marginally useful as a porous energy storage.

D. Finello in "Characterization of Molybdenum Nitride Electrodes" reported at the Fifth International Seminar on Double Layer Capacitors and Similar Energy Storage Devices, Dec. 4–6, 1995, Boca Raton, Fla. describes the comparison of molybdenum nitrides formed by heating the molybdenum oxide film on the surface of a substrate with ammonia. $MoCl_5$ may be used as a starting material. The product $Mo_2N$ is not pure and is contaminated with $MoO_2$ and $MoN$.

M. Wixom in "Non-Oxide Ceramic Electrodes", disclosed at the Fifth International Seminar on Double Layer Capacitors and Similar Energy Storage Devices, Dec. 4–6, 1995, Boca Raton, Fla., Vol. 5 that certain metal nitride and metal carbide electrodes can be used for volumetric energy density and power density. Additional detail is not provided.

M. Goodwin in "PRI Ultracapacitors and Evaluation of Molybdenum Nitride" reported at the Fifth International Symposium on Double Layer Capacitors and Similar Energy Storage Devices, Dec. 4–6, 1995, Boca Raton, Fla., in general that molybdenum nitride may make a useful electrode. The production of such an electrode was not disclosed.

L. Volpe and Boudart M. "Compounds of molybdenum and tungsten with high specific surface area". *Journal of Solid State Chemistry*. vol.59, 332–347 (1985).

L. Volpe and Boudart M. "Ammonia synthesis on molybdenum nitride". *J. Phys. Chem.* vol.90, 4874–4877 (1986).

G. S. Ranhotra, Bell, A. T. and Reimer, J. A. "Catalysis over molybdenum carbides and nitrides II. Studies of CO hydrogenation and $C_2H_6$ hydrogenolysis". *Journal of Catalysis.* vol. 108, 40–49 (1987).

G. S. Ranhotra, Haddix, G. W., Bell, A. T. and Reimer, J. A. "Catalysis over molybdenum carbides and nitrides I. Catalyst characterization". *Journal of Catalysis.* vol. 108, 24–39 (1987).

E. J. Markel and Van Zee, J. W. "Catalytic hydrodesulfuriza-tion by molybdenum nitride". *Journal of Catalysis.* vol. 126, 643–657 (1990).

C. H. Jaggers, Michaels, J. N. and Stacey, A. M. "Preparation of high-surface area transition-metal nitrides: $MO_2N$ and MoN. *Chemistry of Materials.* vol. 2, 150–157 (1990).

J-G. Choi, Choi, D. and Thompson, L. T. "Preparation of molybdenum nitride thin films by $N^+$ ion implantation". *J. Mater. Res.* vol. 7, 374–378 (1992).

L. T. Thompson, CoIling, C. W., Choi, D., Demczyk, B. G. and Choi, J-G. "Surface and catalytic properties of molybdenum nitrides". *New Frontiers in Catalysis.* 19–24 (1992).

Jeong-Gil Choi. "Temperature-programmed desorption of $H_2$ from molybdenum nitride thin films". *Applied Surface Science.* vol. 78, 299–307 (1994).

R. S. Wise, and Markel, E. J. "Catalytic NH3-decomposition by topotactic molybdenum oxides and nitrides: Effect on temperature programmed $\gamma$-$MO_2N$ Synthesis". *Journal of Catalysis.* vol. 145, 335–343 (1994).

K. L. Roberts and Markel, E. J. "Generation of $MO_2N$ nanoparticles from topotactic MO2N Crystallites". *J. Phys. Chem.* vol. 98, 4083–4086 (1994).

R. S. Wise and Markel, E. J. "Synthesis of high surface area molybdenum nitride in mixtures of nitrogen and hydrogen". *Journal of Catalysis.* vol. 145, 344–355 (1994).

J-G. Choi, Curl, R. L. and Thompson, L. T. "Molybdenum nitride catalysts". *Journal of Catalysis.* vol. 146, 218–227 (1994).

B. G. Demczyk, Choi, J-G and Thompson, L. T. "Surface structure and composition of high-surface-area molybdenum nitrides". *Applied Surface Science.* vol. 78, 63–69 (1994).

E. P. Donovan and Hubler, G. K. "Ion-beam-assisted deposition of molybdenum nitride films." *Surface and Coatings Technology.* vol. 66, 499–504 (1994).

C. W. Coiling and Thompson, L. T. "The structure and function of supported molybdenum nitride hydrodenitrogenation catalysts". *Journal of Catalysis.* vol. 146, 193–203 (1994).

C. H. Jaggers. "The preparation and characterization of high surface area transition metal nitrides". *U.M.I. Dissertation Services.* (1994).

M. S. Mudholkar and Thompson L. T. "Control of composition and structure for molybdenum nitride films synthesized using ion beam assisted deposition". *J. Appl Phys.* vol. 77, 5138–5143 (1995).

H. Joon Lee, Choi, J-G, Coiling, C. W., Mudholkar, M. S. and Thompson, L. T. "Temperature-programmed desorption and decomposition of $NH_3$ over molybdenum nitride films". *Applied Surface Science.* vol. 89, 121–130 (1995).

Titanium Nitride (TiN)—Titanium nitride has a number of uses in the art. It is used to strengthen surfaces as a coating, as semiconductor layer and as electrode materials in electrical applications.

Some references of interest concerning titanium nitride include:

S. R. Kurts and Gordon, R. G. "Chemical vapor deposition of titanium nitride at low temperatures". *Thin Solid Films*, vol. 140, 277–290 (1986).

P. Mehta, Singh, A. K. and Kingon, A. I. "Nonthermal microwave plasma synthesis of crystalline titanium oxide & titanium nitride nanoparticles". *Mat. Res. Soc. Symp. Proc.* vol. 249, 153–158 (1992).

E. O. Travis and Fiordalice, R. W. "Manufacturing aspects of low pressure chemical-vapor-deposited TiN barrier layers". *Thin Solid Films.* vol. 236, 325–329 (1993).

Y. W. Bae, Lee, W. Y., Besmann, T. M., Blau, P. J. and Riester, L. "Synthesis and selected micro-mechanical properties of titanium nitride thin films by the pyrolysis of tetrakis titanium in ammonia". *Mat. Res. Soc. Symp. Proc.* vol. 363, 245–250 (1995).

H. Rode, and Hlavacek, V. "Detailed kinetics of titanium nitride synthesis". *AlchE Journal.* vol. 41, 377–388 (1995).

K-T. Rie, Gebauer, A., Wohle, J., Tonshoff, H. K. and Blawit, C. "Synthesis of TiN/TiCN/TiC layer systems on steel and cermet substrates by PACVD". *Surface and Coating Technology.* vol. 74-75, 375–381 (1995).

J. N. Musher, and Gordon, R. G. "Atmospheric pressure chemical vapor deposition of titanium nitride from tetrakis (diethylamido) titanium and ammonia". *J. Electrochem. Soc.* 143, 736–744 (1996).

In these applications, titanium oxide is used to produce the titanium nitride. The surface area is usually low and the electrical storage capacities are marginal.

Iron Nitride (FeN)—Iron nitride is described in few references.

For iron nitride production, the following art is of general interest:

A. Tasaki, Tagawa, K., Kita, E., Harada, S. and Kusunose, T. "Recording tapes using iron nitride fine powder". *IEEE Transactions on Magnetics.* vol. MAG-17, 3026–3031 (1981).

K. Tagawa, Kita E. and Tasaki, A. "Synthesis of fine $Fe_4N$ powder and its magnetic characteristics". vol. 21, 1596–1598 (1982).

M. Kopcewicz, Jagielski, J., Gawlik, G. and Grabias, A. "Role of alloying elements in the stability of nitrides in nitrogen-implanted $\alpha$-Fe". *J. Appl. Phys.* vol. 78, 1312–1321 (1995).

D. C. Sun, Lin, C., Jiang, E. Y. and Wu, S. W. "Multiphase iron nitride gradient films". *Thin Solid Films.* vol. 260, 1–3 (1995).

K. H. Jack. "The synthesis and characterization of bulk $\alpha''$-$Fe_{16}N_2$". *Journal of Alloys and Compounds.* vol. 222, 160–166 (1995).

T. Chuijo, Hiroe, K., Matsumura, Y., Uchida, H. and Uchida, H. H. "Reactivity of $N_2$ with Fe in $FeN_x$ formation by activated reactive evaporation process". *Journal of Alloys and Compounds.* vol. 222, 193–196 (1995).

F. Malengreau, Hautier, V., Vermeersch, M., Sporken, R. and Caudano, R. "Chemical interactions at the interface between aluminum nitride and iron oxide determined by XPS". *Surface Science*, vol. 330, 75–85 (1995).

None of these is art or in any configuration teaches or suggests the present invention.

Additional references of general interest include U.S. Pat. Nos. 3,718,551; 4,816,356; 4,052,271; 5,055,169; 5,062,025; 5,085,955; 5,141,828; and 5,268,006.

The metal oxynitrides have been studied, usually for use as a dense coating to provide chemical and physical resistance to surfaces.

Titanium nitride (TiN) has been studied extensively because of its many useful applications. It is already used as a wear-resistant coating on tools, as a gold substitute for decorative coatings and for thin film resistors. Its metallic conductivity and refractory stability make it the material of choice for diffusion barrier in microelectronics applications. S. Kurtz et al. in *Thin Solid Films* vol. 140, p. 277 (1986) measured 3 μm TiN film that had 8.5 Moh's hardness scale, on which diamond is 10. It has the resistivity of 55 μΩ cm. Most of TiN thin films are produced by chemical vapor deposition (see, for example J. N. Musher et al. *J. Electrochem Soc.*, vol. 143, p. 277 (1996), E. O. Travis, et al., *Thin Solid Films*, vol. 236, p. 325 (1993) and K.-T. Rie, et al., *Surface and Coating Tech.*, vol. 74-75, p. 375 (1995)):

| | |
|---|---|
| 2TiCl$_4$ + N$_2$ + H$_2$→2TiN + 8HCl | 900–1200° C. |
| 6TiCl$_4$ + 8NH$_3$→6TiN + 24HCl + N$_2$ | 500° C. |

Titanium oxynitride (TiNO) is a stable intermediate chemical product between titanium oxide and titanium nitride. These thin films of TiNO formed by sputtering are used as an anti-reflection coating (T. R. Pampalone, et al., *J. Electrochem Soc.*, vol. 136, p. 1181 (1989)) and/or a diffusion barrier (N. Kumar. et al. *Thin Solid Films*, vol. 153, p. 287 (1987)). Only gas nitriding of titanium dioxide (TiO$_2$) produces high surface area titanium oxynitride ((C. H. Shin, et al., *Journal Solid State Chemistry*, vol. 95, p. 145 (1991)). H. Teraoka, et al., in Japanese Patent 89-60729 describe that the titanium oxynitride is obtained by the reduction of TiO$_2$ in nitrogen atmosphere.

Additional references for TiNO include:

C. H. Shin, et al., *Journal of Solid State Chemistry*, vol. 95, 145–155 (1991) disclose the preparation and characterization of titanium oxynitride having high specific surface area.

R. Marchand, et al., U.S. Pat. No. 4,964,016 disclose multi-layer ceramic capacitors having as the conductive elements therein, layers of perovskites containing oxygen and oxygen. However, these perovskite metal (1) metal (2) oxygen nitrogen structure compounds still have low conductivity. No capacitance data has been disclosed.

K. Kamiya, et al. in the *Journal of Materials Sciences*, vol. 22, p. 937–941 (1987) disclose the nitridation of TiO$_2$ fibers prepared by the sol-gel method.

In view of the above, it would be very useful to have one or more methods to produce a reliable small space separation between electrodes in electrical storage devices with a large open cross-sectional area. The present provides these methods.

The present invention provides a process to produce a lower cost, adhering layer of porous high surface area metal oxynitride on a metal sheet (foil) substrate.

SUMMARY OF THE INVENTION

The present invention concerns a high specific surface area electrode comprising a substrate of an electrically conducting metal or an alloy, and a film layer thereon one or both flat surfaces wherein the film comprises an oxynitride of the metals of Groups III IV, VI, VI or VII of the Periodic Table.

The present invention concerns a process to produce a high surface area niobium oxynitride, tantalum oxynitride, vanadium oxynitride, zirconium oxynitride, titanium oxynitride or molybdenum oxynitride coated substrate for use as an electrical energy storage component in a capacitor or a battery configuration, which process comprises:

(a) coating one or both flat etched surfaces of a solid substrate, which substrate is in the form of a thin sheet, with a solution or a slurry of a metal halide selected from niobium halide, tantalum halide, vanadium halide, zirconium halide, titanium halide or molybdenum halide and a liquid volatile carrier to produce a thin surface film;

(b) contacting the metal halide surface film-carrier coated substrate of step (a) with oxygen, air, or combinations thereof at a temperature of between about 150 and 250° C. for between about 5 and 60 min to convert the metal halide to metal oxide, respectively, as a thin film and to remove the liquid volatile carrier;

(c) repeating steps (a) and (b) as needed to obtain an accumulated thickness of metal oxide coating on the substrate, which accumulated metal oxide coating has a high surface area and the liquid volatile carrier is removed;

(d) heating the metal oxide film coated substrate of step (c) in oxygen, air or combination thereof at between about 150 and 400° C. for between about 1 and 3 hr to convert at least about 95% of the metal chloride to metal oxide;

(e) slowly increasing the temperature of the metal oxide coated substrate at a rate of less than about 40° C. per minute in a nitrogen atmosphere to between about 500 to 800° C.;

(f) contacting the oxide coated substrate produced in step (e) with a nitrogen source selected from excess flowing gaseous ammonia, a mixture of ammonia gas and hydrogen gas, or a mixture of hydrogen gas and nitrogen gas at between about 500 and 800° C. for between about 1 and 6 hr which treatment converts about 95% or greater of the oxide coating to an niobium oxynitride, tantalum oxynitride, vanadium oxynitride, zirconium oxynitride, titanium oxynitride or molybdenum oxynitride layer, respectively, on the substrate, which oxynitride layer has a high surface area and is electrically conductive; and (g) cooling to ambient temperature and recovering the high surface area metal oxynitride coated substrate produced in step (f).

In a preferred embodiment, the metal of the metal oxynitride is selected from molybdenum, niobium, tantalum, titanium, vanadium or zirconium, more preferably titanium or molybdenum.

The present invention also concerns a process to produce a high surface area iron nitride, titanium nitride or gamma-molybdenum nitride coated substrate for use as an electrical energy storage component in a capacitor or a battery configuration, which process comprises:

(a) coating one or both flat etched surfaces of a solid substrate, which substrate is in the form of a thin sheet, with a slurry or solution of a metal halide selected from iron halide, titanium halide or molybdenum halide and a liquid volatile carrier to produce a thin surface film;

(b) contacting the metal halide surface film-carrier coated substrate of step (a) with oxygen, air, or combinations thereof at a temperature of between about 150 and 400° C. for between about 5 and 60 min to convert the iron halide, titanium halide or molybdenum halide to oxide, respectively, as a thin film and to remove the liquid volatile carrier;

(c) repeating steps (a) and (b) as needed to obtain an accumulated thickness of metal oxide coating on the substrate, which accumulated metal oxide coating has a high surface area and the volatile carrier is removed;

(d) heating the metal oxide film coated substrate of step (c) in oxygen, air or combination thereof at between about 150 and 400° C. for between about 1 and 3 hr to convert at least about 95% of the metal chloride to metal oxide;

(e) slowly increasing the temperature of the metal oxide coated substrate at a rate of less than about 40° C. per minute in a nitrogen atmosphere to between about 500 to 800° C.;

(f) contacting the oxide coated substrate produced in step (d) with a nitrogen source selected from excess flowing gaseous ammonia or a mixture of hydrogen gas and nitrogen gas at between about 500 and 800° C. for between 1 and 6 hr which treatment converts about 95% or greater of the oxide coating to an iron nitride, titanium nitride or gamma-molybdenum nitride layer, respectively, on the substrate, which nitride layer has a high surface area and is electrically conductive; and (g) cooling to ambient temperature and recovering the high surface area nitride coated substrate produced in step (e).

In one embodiment, in step (a) the metal chloride is molybdenum chloride, and the gamma-molybdenum nitride film of step (f) has a surface area in excess of 16 $m^2/g$.

In another embodiment, in step (g) the metal nitride formed on the substrate has a surface area of between about 10 and 60 $m^2/g$, and a specific capacitance up to about 130 F/g.

The present invention also relates to a novel electrical storage device that has a high energy density, high power density, and long useful life time.

The present invention also relates to improved electrical storage devices and to the methods of manufacture, which include coating the edges of the porous electrodes with an organic polymer in an organic solvent and removal of the solvent. This method reduces or eliminates the leakage (or shunt) current and is used with any type of construction method e.g. wet, dry, fill port, etc.

It is an object of the present invention to provide new methods for manufacturing the storage device.

It is also another object of the present invention to provide a reliable long-term electrical storage device, and improved methods to produce the same.

It is a further object of the present invention to provide efficient packaging of an electrical storage device by reducing the gap between the anode and cathode, which reduces the electrical resistance of the ionically conducting electrolyte.

Briefly, the foregoing and other objects are attained by an energy storage device such as a capacitor, which includes a plurality of cells in a bipolar configuration. The cells are stacked and bonded together, to impart to the device an integral and unitary construction.

Each cell includes two electrically conductive electrodes that are spaced apart by a predetermined distance. The cell also includes at least one dielectric gasket that is interposed, on the perimeter in relation to each other, between the electrodes, for separating and electrically insulating these electrodes.

When the electrodes, and the gaskets are bonded together, at least one fill gap is formed for each cell. Each cell also includes a high surface area (porous) electrically conductive coating layer that is formed on one (or, more) surface of each electrode. This coating layer optionally includes a set of closely spaced-apart peripheral microprotrusions, and a set of distally spaced-apart central microprotrusions. These microprotrusions are formed by novel screen printing or photolithographic printing methods. These microprotrusions impart structural support to the cells, and provide additional insulation between the electrodes.

An tonically conductive medium fills the cell gap and pores of the high surface area coating.

The present invention also discloses materials and the processes to edge seal the electrodes which are used in the manufacture of high electrical energy and power density devices, such as capacitors.

BRIEF DESCRIPTION OF THE FIGURES

The above and other features of the present invention and the manner of attaining them, will become apparent, and the invention itself will be best understood, by reference to the following description and the accompanying drawings, wherein:

FIG. 1 is a perspective view of the preunit 10 a dry energy storage device which is constructed according to the present invention;

FIG. 1A is a perspective view of the electrolyte-filled energy storage device 10A of the present invention;

FIG. 2 is a cross-sectional view of the storage device of FIG. 1 showing a removable cord 117A within the storage device, taken along line 2—2 thereof;

FIG. 2A is another cross-sectional view of the storage device of FIG. 1, taken along line 2A—2A thereof;

FIG. 3 is a schematic representation of an exploded view of the preunit of FIG. 1, illustrating three cells;

FIG. 4 is a block diagram of the manufacture steps of the storage device 10A;

FIG. 5 is a top plan view of a porous coating layer with microprotrusions which forms a part of the storage device of FIGS. 1 through 4;

FIG. 6 is a diagrammatic illustration of a capacitive circuit, which is equivalent to the device 10A;

FIG. 7 is a schematic representation of a screen printing method to produce microprotrusions on a coating layer used with the energy storage device according to the present invention;

FIG. 8 is a schematic representation of an electrode holder used in the manufacture method of FIG. 7;

FIG. 9 is a schematic representation of a method to photolithographically produce the microprotrusions according to the present invention;

FIG. 10 is a schematic isometric view of a pair of hot rollers used for laminating a photoresist to an electrode prior to photolithography;

FIG. 11 is a schematic isometric view of a mask placed over the photo resist of FIG. 10;

FIG. 12 is a schematic isometric view illustrating the exposure of unprotected portions of the photo resist of FIGS. 10 and 11;

FIG. 13 is a cross-sectional view of an electrode which forms a part of the energy storage device, taken along line 13—13 of FIG. 3;

FIG. 14 is a schematic cross-sectional view of two bipolar electrodes with the high surface area porous coating layer on the electrically conducting substrate forming one cell;

FIG. 15 is a schematic view of a frame used to hold thin support materials during the dip coating process; and FIG. 15A is a schematic view of wire used in the frame of FIG. 15.

FIG. 16 is a spectral representation of an x-ray diffraction pattern of $Mo_2N$ film.

FIG. 17 is a graphic representation of cyclic voltammetry of $Mo_2N$ film in 1 molar potassium hydroxide and 3.5 molar sulfuric acid.

FIG. 18 is a graphic representation of the cyclic voltammetry of TiNO in 3.5M sulfuric acid and in 1M potassium hydroxide.

FIGS. 19A to 19F show scanning electron micrographs of three different TiNO samples. FIGS. 19A, 19B and 19C are each at 200 magnification. FIGS. 19D, 19E and 19F are each at 1000 magnification.

FIG. 20 is a graphic representation of the capacitance in $F/cm^2$ and specific capacitance in versus BET specific surface area in $m^2/g$ for TiNO in 1M potassium hydroxide.

FIG. 21A is a spectrographic representation of the XRD data for TiNO for a fresh sample; FIG. 21B is after 120 CV cycles (16 hrs) in 1 molar KOH, and FIG. 21C is after 120 hrs CV cycles (16 hrs) in 3.5M sulfuric acid.

FIGS. 22A, 22B and 22C are scanning electron micrographs at 1000 magnification of the titanium oxynitride as a fresh sample, after 120 CV cycle in 1M KOH and after 120 CV cycles in 3.5M sulfuric acid, respectively.

FIGS. 24A, 24B and 24C show scanning electron micrographs at 200 magnification of TiNO with 0% Mn, 5% Mn and 10% Mn, respectively.

FIG. 25 is a graphic representation of ESR for real impedance versus frequency in herz for TiNO in 1M potassium hydroxide and for RuTaOx in 4.6 M sulfuric acid.

FIG. 26 is a graphic representation for the leakage current test in 1M potassium hydroxide for TiNO for leakage current density in $\mu A/cm^2$ versus time in hours.

FIGS. 27A, 27B and 27C are scanning electron micrographs of TiNO for a fresh sample (27A) and after EDM cut, wash and dry (27B and 27C), respectively.

FIGS. 28A and 28B are scanning electron micrographs at 1000 magnification of TiNO and TiNO plus $TiO_2$, respectively.

FIG. 29 is a graphic representation of a Ragone plot of TiNO single cell device of energy density of Wh/kg versus power density in watts/kg.

FIG. 30 is a graphic representation of the TiNO stability test of capacitance in $F/cm^2$ versus cycles for CV materials, single cell device and for a five cell device.

FIGS. 31A and 31B are scanning electronic micrographs at 250 magnification showing crack structure of TiNO and RuTaOx, respectively.

DETAILED DESCRIPTION OF THE PREFERRED EMBODIMENTS

Definitions

Figure 23A:
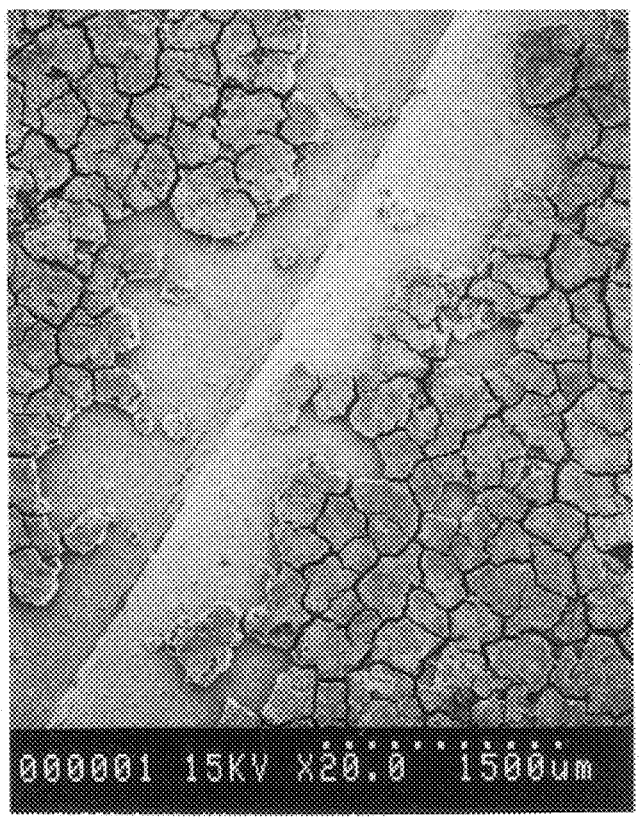
FIGS. 23A and 23B show scanning electron micrographs at 20 magnification for TiNO and 100 magnification for $RuTaO_x$, respectively.

As used herein:

The definitions of U.S. Pat. No. 5,464,453 are incorporated herein in their entirety.

The definitions of the following terms are not intended to be exclusive:

"Cord" refers to the thin strips of material included in the method of manufacture of the dry preunit. After initial heating, the removal of the cord produces the open fill ports. The cord is usually thin, between about 0.05 and 10 mils, preferably between about 0.1 and 8 mils with a width between about 1 and 50 mil, preferably between about 10 and 25 mils.

"Electrically conducting support material" refers to any electrically conducting metal or metal alloy, electrically conducting polymer, electrically conducting ceramic, electrically conducting glass, or combinations thereof. Metals and metal alloys are preferred for producing stock units. Preferred metals include, for example, the metals of the following preferred metal oxides listed for the following second electrically conducting materials. The support material should have a conductivity of greater than about $10^{-4}$ S/cm.

"Etched" or "Pretreated" substrate refers to a metal foil or sheet which has been cleaned as described in U.S. Pat. No. 5,464,453, or by contact with a 6N HCl solution for 10–15 minutes.

"Halide" refers to the starting material metal chloride bromide or combinations thereof. Chloride is preferred.

"Liquid volatile carrier" refers to any organic liquid which has a boiling point at ambient pressure of about 200° C. or below. Usually, only combinations of carbon, hydrogen, oxygen and nitrogen are present. Suitable carriers include, but are not limited to ethanol, propanol, butanol, pentanol, hexanol, cycohexanol, diethyl ether, dioxane, tetrahydrofuran, dimethylacetamide, diethylacetamide, acetone, methylethyl ketone, butanone, ethyl acetate, propyl acetate, methylene chloride, chloroform, carbon tetrachloride, benzene, toluene, xylene, and mixtures thereof. Preferably, the alcohols are used, more preferably, ethanol and propanol.

"Second electrically conducting material" (having a high surface area) refers to a porous electrode coating which may be of the same or different composition on each side of the support material. Preferred metal oxides of the present invention include those independently selected from tin, lead, vanadium, titanium, ruthenium, tantalum, rhodium, osmium, iridium, iron, cobalt, nickel, copper, molybdenum, niobium, chromium, manganese, lanthanum, or lanthanum series metals or alloys or combinations thereof, and possibly containing additives like calcium to increase electrical conductivity.

"Electrolyte" refers to an ionically conductive aqueous or non-aqueous solution or material, which enables the dry preunit to be electrically charged.

"Cab-O-Sil®" refers to silica filler available from Cabot Corporation of Tuscola, Ill. A variety of sizes are available.

"Epoxy" refers to the conventional definition of the product which is an epoxy resin mixed with a specific curing agent, usually a polyamine. or polyepoxide mixed with a polyamine curing agent.

MYLAR® refers to a polyester of polyethylene terephthalate of DuPont, Inc. of Wilmington, Del. It is usually commercially available in sheet form of varying thicknesses.

"Metal oxynitride" refers to any electrically conducting metal oxynitride of metals of Groups III, IV, V, VI or VII of the Periodic Table. Preferably the metal is a transition metal. More preferably, the metal is independently selected from molybdenum, niobium, tantalum, titanium, vanadium, zirconium, or combinations thereof, and is especially titanium or molybdenum.

For the metal oxynitride, this structure does not describe a combination of $MO_2$, $MO_3$, $MO_4$, etc. with MN, $M_2N$, $M_3N$, $MN_2$ etc. MNO describes a general formula $M_xN_yO_z$ wherein M is metal, preferably a transition metal wherein:

x is between 0.7 and 1.3, preferably between 0.9 and 1.1, more preferably about 1;

y is between about 0.7 and 1.3, preferably between about 0.9 and 1.1 and more preferably about 1; and z is between about 0.7 and 1.3, preferably between about 0.9 and 1.1 and more preferably about 1.

For titanium oxynitride, this formula does not describe combinations of $TiO_2$, and TiN, or variations thereof. TiNO is a general formula $Ti_x N_y O_z$ wherein:

x is between 0.8 and 1.2, preferably about 1;
y is between about 0.8 and 1.2, preferably about 1; and
z is between about 0.8 and 1.2, preferably about 1.

"Metal oxide" refers to any electrically conducting metal oxide.

"Mixed metal oxide" refers to an electrically conducting oxide compound comprised of two or more metal oxides, optionally mixed with a non-conducting compound.

"Photoresist" is any photo curable material. Usually, it is an epoxide or acrylate or combinations thereof.

"ConforMASK" is a negative working photopolymer available commercially from Dynachem of Tustin, Calif. This polymer should be used at 50% or less relative humidity.

Dry Preunit Energy Storage Device

Referring now to the drawings, and more particularly to FIGS. 1, 2 and 3 thereof, there is illustrated a dry preunit of energy storage device 10 which is constructed according to the present invention. The energy storage device is first an assembled dry preunit 10. After filling the present cells with an aqueous or non-aqueous electrolyte, the exterior surface is sealed (fused) (e.g. Heat, uv), to form device 10A which is then electrically charged.

The device preunit 10 generally includes a plurality of cells, such as the cells 110, 112 and 114, which are formed, prepared, and stacked according to the teaching of the present invention. FIG. 1A illustrates an assembled view of the electrical storage device preunit 10A, formed of twelve superposed cells. It should however be understood to those skilled in the art, after reviewing the present specification that any different number of cells can be used.

For simplicity of illustration, FIG. 3 is an exploded view of the preunit 10, showing only three exemplary cells 110, 112 and 114. The cells have generally similar design and construction, and therefore, only the cells 114 and 112 will be described in detail, in relation to FIGS. 2, 2A, 3 and 13.

The cell 114 includes a first electrically conductive external electrode or end plate 111A, and a second internal, electrically conductive bipolar electrode 111B. Both electrodes 111A and 111B are spaced apart at the edges by means of two dielectric or electrically insulating gaskets 121 and 123.

When the first and second electrodes 111A and 111B, and the insulating gaskets 121 and 123 and the electrically conducting porous material (oxide) layers 119 and 120 are bonded together to form the cell 114, a central air filled gap 130 (FIG. 2A) is formed by these elements. When the preunit 10 is ready to be used, the gap 130 is filled with an electrolyte (not shown) to produce device 10A.

For this purpose, an exemplary access or fill port 122, is shown in FIG. 2A for illustration purpose only, and is formed between the gaskets 121 and 123, in order to allow the electrolyte to fill the gap 130. The fill port 122 is formed by means of a tab or cord 117A, which is inserted between the gaskets 121 and 123, prior to fusing or bonding the gaskets 121 and 123. When the gaskets 121 and 123 are heated, the cord 117A becomes surrounded by the reflow gasket material, which causes the outline of fill port 122 to be formed. The two gaskets become a fused polymer mass covering a minimum of the active electrically conducting coating layers 119 and 120.

Metal nitrides—The metal nitrides or mixed metal nitrides which are known in the art are also used to store energy in the present device by replacing part of all of the metal oxides or mixed metal oxides as described herein. Metal nitrides include, for example, any of the metals found in the Periodic Table.

$Mo_2N$—The molybdenum nitride ($Mo_2N$) and molybdenum carbide ($Mo_2C$) ceramic electrodes are both excellent embodiments for an ultracapacitor. Both ceramics are electronically conductive, have very high specific surface area (e.g. >100 m²/g), e.g. between 50 and 250 m²/g, have mechanical, stability and chemical stability as well as electrochemical stable in aqueous and nonaqueous electrolytes. $Mo_2N$ electrodes are prepared by first spray pyrolysis or dip coating pyrolytic hydrolysis of ($MoCl_5$×isopropyl alcohol) precursors onto metal foils or sheets at, e.g. titanium, tantalum or zirconium followed by heating at elevated temperatures, e.g. preferably, about 250 to 550° C. preferably about 300° C., for about 1 to 20 hr, preferably 5 hr, to form oxide ceramics, i.e. $MoO_3$ and $MoO_2$. The high surface area ceramic oxides are then converted to $Mo_2N$ by reacting $MoO_3$ or $MoO_2$ with ammonia, $NH_3$, at elevated temperatures, e.g. >300° C. preferably about 300 to 500° C. (or 800° C.), for between about 1 to 20 hr, preferably 5 hr in a constant temperature furnace. In addition to $NH_3$, a mixture of $N_2+H_2$ gases can also be used as a reactant for the conversion of oxides to nitrides.

Metal carbides—The metal carbides or mixed metal carbides which are known in the art are also used to store energy in the present electrical storage device by replacing part or all of the metal oxides or mixed metal oxides which are described herein. Metal carbides include any of the metals of the Periodic Table.

The metal carbides are prepared by adaption of the process described above for metal nitrides. For example, $Mo_2C$—When carbon mono-oxide, CO, is substituted for $NH_3$, the carbide of molybdenum is produced.

Considering now the electrodes 111A and 111B in greater detail, the methods of manufacturing them will be described later. One difference between the electrodes 111A and 111B is that the electrode 111A optionally includes a tab 160A, for connection to a power source (not shown).

A further, but optional distinction between the electrodes 111A and 111B, is that the electrode 111A includes one porous electrically conductive coating layer 119, which is deposited on a support material or structure 116, while the bipolar electrode 111B includes two porous coating layers 120 and 131, which are deposited on either or both sides of the support material or structure 118. As such, the electrode 111B is a true bipolar electrode. It should be understood that both sides of the electrode 111A are preferably coated with porous electrically conductive layers.

Yet another optional distinction between the electrodes 111A and 111B lies in the rigidity of the support structures 116 and 118. The electrode 111A, acting as an external end plate, should preferably have a more rigid construction, so that it imparts sufficient rigidity to the overall structure of the energy storage device 10A. The electrode 111B and other similar internal electrodes do not necessarily need to be as rigid as the external electrode 111A. Nonetheless, when the device 10A is large, additional support structure is required, and the internal electrodes, i.e. 111B, are used as additional support structure. In this case, it is desirable to rigidify the internal electrodes, i.e. 111B.

As a result, the support material 116 is generally thicker than the support material 118. In the preferred embodiment, the support material 116 has a thickness of about 10 mils (0.0254 cm), while the support material 118 has a thickness of about 1 mil (0.00254 cm). Other values could alternatively be selected.

The electrodes 111A, 111B and the remaining electrodes of the storage device 10A, are sized and dimensioned according to the desired application, without departing from the scope of the invention. For instance, in one application, the device 10A is miniaturized, e.g. for a cardiac defibrillator. While in another application, the overall volume of the device is one cubic meter or even greater, e.g. for an electric vehicle. The dimensions of the electrodes determine the overall capacitance of the storage device 10A.

In a preferred embodiment, the electrodes, i.e. 111A and 111B, are rectangularly shaped. However, these electrodes and consequently the preunit 10 could assume various other shapes, such as circular, square, etc. An important feature of the preunit 10 is the flexibility of its design, which enables it to be used in various applications.

Considering now the coating layers 119 and 120 in greater detail, the methods of forming them will be described later. In the preferred embodiment, the coating layer 119 includes a plurality of microprotrusions, while the coating layer 120 does not include such microprotrusions. It should be understood, however, that the coating layer 120 could alternatively be designed similarly to the coating layer 119, without departing from the scope of the invention.

FIG. 5 is a top plan view of the coating layer 119, which includes an array of microprotrusions, and which is deposited on the inner face or flat side of the support material 116. The coating layer 119 is porous with high surface area, electrically conductive, and relatively thin. The array includes two sets of microprotrusions. The first set includes a plurality of peripheral microprotrusions 125, and the second set includes a plurality of centrally located microprotrusions 127.

In the preferred embodiment, the peripheral and the central protrusions 125 and 127 are similarly designed, and are generally semi-spherically shaped. However, other shapes, for example a rectangular shape (as depicted in FIG. 5 for protrusions 125), are contemplated within the scope of the present invention. The diameter of each protrusion 125 or 127 is about 6 mil (0.01524 cm). Different applications of the device 10 might require that the microprotrusions 125 and 127 be differently designed. The center-to-center separation of the peripheral microprotrusions 125 is about 20 mil (0.0508 cm), while the center-to-center separation of the central microprotrusions 127 is about 40 mil (0.1016 cm).

One reason for the higher density of the peripheral microprotrusions 125, is to prevent edge shorting. One reason for the lower density of the central microprotrusions 127, is to provide separation between the electrodes 111A and 111B, with minimal masking of the electrode surfaces. For this purpose, the gasket 121 is allowed to cover at least part of the microprotrusions 125, but preferably not the microprotrusions 127.

The peripheral microprotrusions 125 are adjacently disposed along an outer periphery of the coating layer 119. It should be understood to those skilled in the art, that additional rows may added, depending on the size and application of the device 10. The central microprotrusions 127 are similarly adjacently disposed, in an arrayed arrangement, within a central section 132 of the coating layer 119. As illustrated in FIG. 5, the central microprotrusions 127 are surrounded by the peripheral microprotrusions 125.

The microprotrusions 125 and 127 are formed on the coating layer 119 to provide added structural support to the first and second electrodes 111A and 111B, in order to prevent electrical contact due to bowing or sagging of the electrodes.

FIG. 5 further shows that the coating layer 119 further includes a plurality of spacings, i.e. 133A through 133G, where the cord, i.e., 117A, are placed, in order to ultimately form the fill port, i.e. 122. As illustrated for large electrode sizes the cord only extends partway into the central section 132. For smaller electrode sizes the cord extends across the electrode surface with the two ends protruding out opposite sides, thus forming simultaneously fill ports 113C and 133D. In this case the width of the cord is smaller than the space between the central microprotrusions 127. However, the cord is larger than the center-to-center separation between the peripheral microprotrusions 125. Therefore to prevent the perimeter microprotrusions from pinching the cord, and preventing it from being removed, the perimeter microprotrusions spacings are increased wherein the cord is to be placed. Alternatively, the cord may be similar in width to the peripheral microprotrusions separation and no accommodation in the microprotrusion pattern needs to be done.

Considering now the coating layer 120, it serves a similar function as the coating layer 119, and is deposited on the side of the electrode 111B, which faces the inner side of the first electrode 111A. In the preferred embodiment, the coating layer 120 does not include microprotrusions. In an alternative embodiment of the preunit 10, the coating layers 119 and 120 are similarly constructed, and include microprotrusion layers.

Considering now the gaskets 121 and 123, the methods of producing them will be described later. The gaskets 121 and 123 are generally identical, and are arranged in registration (adjacent and superposable) with each other. For brevity, only the gasket 121 will be described in greater detail. The gasket 121 includes a solid peripheral section and a hollow central section.

In the preferred embodiment, the cord 117A, or a part thereof, is placed between the gaskets 121 and 123, and extends across the hollow section, of the gaskets, and protrudes outside the peripheral section. In another embodiment, the cord does not extend across the central section of the gaskets, and only a part of the cord is sandwiched between the gaskets and extends beyond both edges of one side of the gasket.

Turning now to FIGS. 1, 2, 2A and 3, the next adjacent cell 112 is now briefly described. The cell 112 is generally similar in design and construction to the cell 114. The cell 112 includes the bipolar electrode 111B, as its first electrode, and a second bipolar electrode 111C. The electrodes 111B and 111C. are generally identical, and are spaced-apart, in registration with each other.

A porous coating layer 131, which is identical to the coating layer 119, is deposited on the surface of the support material 118, facing the electrode 111C. A coating layer 133, which is similar to the coating layer 120, is deposited on a support material or structure 140, which forms a part of the electrode 111C.

The cell 112 further includes two gaskets 135 and 137 that are identical to each other and to the gaskets 121 and 123 of the cell 114. A cord 117B forms a fill port 142 between the gaskets 135 and 137.

The cell 110 is substantially similar to the cell 114, and includes a first bipolar electrode 111Y, a second electrode 111Z, two gaskets 157 and 159, a cord 117C, a tab 160, and a fill port 162. It should be noted that in FIG. 3, which is a 3-cell device, the inner electrode 111Y is equivalent to electrode 111C.

Turning now to FIG. 6, there is illustrated a diagrammatic view of a capacitive circuit 200 which is representative of, and generally has an equivalent function to, device 10A. The circuit 200 illustrates the cell 114 as two capacitors C1 and C2; the cell 112 as two capacitors C3 and C4; and the cell 110 as two capacitors C5 and C6. As a result, the device 10 is generally equivalent to a plurality of capacitors connected in series with two capacitors for each cell.

The porous electrically conducting coating 119 in conjunction with an tonically conducting medium (not shown) within the cell 114, form the capacitor C1. The ionically conducting medium and the coating 120 form the capacitor C2. The coating 131 and the ionically conducting medium within the cell 112 form the capacitor C3. The ionically conducting medium within the cell 112 and the coating 133 form the capacitor C4. Similarly, the cell 110 is represented by the capacitors C5 and C6.

An important aspect of the present invention, is the bipolar configuration of the energy storage device. The use of a single electrode, such as the electrode 111B to form two back-to-back capacitors, such as the capacitors C2 and C3, result in a bipolar electrode B. This design significantly reduces the overall size of the device 10A.

While not wanting to be bound by theory, an explanation of the operation of the capacitive energy storage device, at the molecular level is helpful to understand the enormous value of the electric double layer. For simplicity, to describe FIG. 14, FIG. 3 can be used for reference where the same reference numbers are used (and the porous material is a mixed metal oxide).

FIG. 14 is a schematic cross-sectional representation of the magnified edge of the support 118 & 140 and electrically conducting coating layers (120, 131, 133, 133B).

The center support 188 is depicted as a metal but can be any material which is electrically conducting and provides the support for the coating. The porous coating which has high surface area provides the structure and geometry for the energy storage. As can be seen in FIG. 14, layer 120, etc. has a discontinuous surface with many fissures, micropores and mesopores which create the high surface area.

Thus, the porous coatings 120 and 131 are coated onto support 118 to form bipolar electrode 111B and coatings 133 and 133B are coated onto support 140 to form bipolar electrode 111C. After the preunit 10 is assembled, the pull tabs are removed creating the fill ports and the preunit 10 is charged with electrolyte 190, the fill ports, e.g. 117D, are sealed creating device 10A.

The device 10A is then charged electrically producing the following results at the same time:

Coating 120 becomes negatively charged. Electrically conducting support 118 conducts electrons accordingly. Thus, porous coating 131 becomes positively charged. The ionically conducting electrolyte ions align accordingly to balance the charge in the coating. An electric double layer is formed at the electrode-electrolyte interface forming the individual capacities in circuit 200. Thus, the surface of coating 133 becomes negatively charged, and the surface of coating 133B becomes positively charged. Because the porous high surface area oxide allows the effective surface area of the electrode to become very high, the corresponding electrical storage capacity of the device increases dramatically.

The capacitors of the present invention are assembled from multiple electrodes which are each a thin (metal) substrate which is thinly coated with generally fragile conductive oxide coatings. The oxide coating comprises porous grains having large inter granular cracks. The present thermoplastic materials and the method of their use in some units does not completely seal the cracks in the coating along the perimeter of the electrodes edges. As a result, the liquid electrolyte in each thermoplastic sealed device envelope seeps to the edges of the electrodes over time or under test conditions causing an electrical short between the adjacent cells. This leakage severely affects the performance, reliability and the life of the electrical storage, i.e. (capacitor) device.

Another object of this invention is to eliminate this chemical and electrical leakage problem to improve the reliability and life of the energy storage device.

Another embodiment describes an important improvement in electrically insulating and sealing cells by the use of KRATON® as an electrode edge sealing and gasket material. Other embodiments contemplated include, but are not limited to:

1. modified versions of KRATON® with other solvents or polymeric soluble additions thereof;
2. other plastic materials in solvent, dispersion or suspension form;
3. liquid photoresist materials which are dissolved in solvents, e.g. ethylene glycol, butyl acetate or butyl cellosolve acetate or combinations thereof;
4. epoxy or resin which are dissolved to make solutions of desired viscosity;
5. polymeric materials available in dispersion form which is depositable by electrolytical means, such as electrophoresis;
6. electrically insulating oxide coatings with or without the addition of polymers for the purpose of filling the cracks and insulating the edges;
7. thermally reducing the cracks and pores in the coating by heating the oxide layer with a laser with or without the use of additional materials.

Other applications of KRATON® or material solutions are:

1. To improve the integrity and the adhesion of the oxide coating on the electrodes. This improvement is accomplished by coating the entire surface of the electrode by a thin layer of KRATON® in an organic solvent, preferably as a dilute solution;
2. Sealing of the fill ports of the capacitor devices with liquid KRATON® solutions after filling with the electrolyte; or
3. Applying the solution of KRATON® having an appropriate viscosity by dispensing the solution into a pattern that serves as insulating separators between the electrodes or gaskets allowing air assembly if necessary.

Wet assembly is also contemplated wherein no fill ports are necessary. The elastomeric polymer acts as a sealing O-ring under pressure. After drying the exterior surfaces, the entire finished unit is then sealed along the perimeter, i.e. injection molded using epoxy or KRATON® solution.

Methods of Manufacturing the Energy Storage Device

Referring to FIGS. 1 to 5, a general description for the preferred method to produce the dry pre-unit 10 of the energy storage device 10A, is as follows:

(A) Support Material Preparation

The support material is optionally etched or cleaned by a variety of conventional pickling and cleaning procedures. The support material is any electrically conducting material, e.g. carbon, ceramic, metal, alloy, having a thickness of between about 0.01 and 100 mil. Preferably, metal or alloys are used, preferably having a thickness of between about 0.1 and 50 mil, more preferably about 1 to 10 mils.

In some experiments, if the metal surface is not etched it is too smooth. This smooth surface sometimes causes inadequate adhesion of the porous coating. The etch creates a suitable rough surface.

1. Wet Etching—A preferred procedure is to contact the metal support with an aqueous inorganic strong acid, e.g. sulfuric acid, hydrochloric acid, hydrofluoric acid, nitric acid, perchloric acid or combinations thereof. The etching is usually performed at elevated temperatures of 50 to 95° C. (preferably 75° C.) for about 0.1 to 5 hr (preferably 0.5 hr) followed by a water rinse. Room temperature acid etching is possible. An alkaline or an organic (e.g. oxalic) etch may also used.

2. Dry Etching—The roughened support surface is obtained by sputtering, plasma treatment, and/or ion milling. A preferred procedure is Ar RF sputter etching at between around 0.001 and 1 torr with about 1 KeV energy at 13.5 Mhz. Commonly, 0.1–10 watts/cm$^2$ power densities for about 1–60 min. are used to clean and roughen the surface. Another procedure is to plasma etch the support with a reactive gas such as oxygen, tetrafluoromethane, and/or sulfurhexafluoride at around 0.1–30 torr for about 1–60 min.

3. Electrochemical Etching—The roughened surface is obtained by electrochemical oxidation treatment in a chloride or fluoride solution.

(B) Coating of Support Material

The coating (e.g. oxide) is porous and composed of mostly micropores (diameter<17 Å). Large 0.1–1 μm wide cracks are present on the surface protruding to depths as thick as the coating. However, greater than 99% of the surface area arises from these micropores. The average diameter of these micropores are around 6–12 Å.

After various post-treatments the pore structure can be altered to increase the average pore size. For example, the steam post-treatment creates a bimodal pore distribution. In addition to the micropores, a narrow distribution of mesopores (diameter<17–1000 Å) having a diameter of about 35 Åis created. These treated electrode coatings have 85–95% of the surface area arising from the micropore structure.

With alternate electrode construction methods this pore size distribution can be varied. The effective high surface area of the coating is 1,000 to 10,000 to 100,000 times larger than the projected surface area of the electrode as a monolith. The pore size, distribution, and surface area controlled with the temperature of pyrolysis and/or high temperature water treatment. In addition, the use of surfactants to create micelles or other organized structures in the coating solution increases the average pore size up to values about 100–200 Å with only 5–10% of the surface area coming from micropores.

As illustrated in FIG. 13, the electrode 111A includes a porous and conductive coating layer 119, which is formed on at least one surface of the support material 116. The support material 116 is electrically conductive, and sufficiently rigid to support the coating layer 119 and to impart sufficient structural rigidity to the device 10.

The unique characteristics of the present invention is primarily due to the novel construction as described herein. The ultracapacitor formed is unique among all electrical storage devices in the following ways.

It has:
One hundred times greater power density than any known battery;
Fifty times greater energy density than a conventional capacitor;
Charge and discharge rates of less than one second as compared with hours for conventional batteries;
Very long lifetime of the order 300,000 charge/discharge cycles as opposed to less than 1000 for a conventional battery;
Any voltage from 1.0 to hundreds of volts as compared to less than 2 volts for conventional batteries; e.g. 12 volts for the conventional lead acid, and the present novel device can be constructed in practically any configuration, size and shape.

The unique combination has enhanced performance specifically, by the sum of the construction methodologies, selected features as described herein which are needed in combination to achieve this performance.

One goal of the present invention, is to optimize the energy density and power density of the device 10. This object is achieved by reducing the thickness of the support material 116, and maximizing the surface area of the coating layer 119. The power density of the device 10 is further optimized, by maintaining a low resistance.

The surface area of the coating layer 119 is determined by the BET methodology, which is well known in the art. The surface enhancement, which is an indication of the optimization of the surface area of the coating layer 119, is determined according to the following equation:

$$\text{Surface enhancement} = (\text{BET Surface Area/Projected Surface Area})$$

In the present invention, the surface enhancement values are as large as 10,000 to 100,000, and are usually greater than 50.

The coating layer 119 is porous, and its porosity could range between about five percent (5%) and ninety-five percent (95%). Exemplary porosity range for efficient energy storage is between about twenty percent (20%) and twenty-five percent (25%). The porous coating thickness is between about 1 and 200 micron, preferably between about 5 and 50 micron.

In conventional double-layer capacitors, the main device resistance is due to the carbon coating layer. In the present invention, most of the device resistance is due to the electrolyte, which has a higher resistance than that of the porous conductive coating layer.

When the preunit device 10 is filled with an electrolyte, it becomes ready to be charged to become device 10A. The main criterion for the electrolyte is to be ionically conductive and have bipolar characteristics. The boundary or interface region between the electrode and the electrolyte is referred to in the field, as the "double layer", and is used to describe the arrangement of charges in this region. A more detailed description of the double layer theory is found in "Modern Electrochemistry", by Bockris et al, volume 2, sixth print, chapter 7 (1977).

The surface area of the coating layer affects the capacitance of the device 10A. If for instance, the surface enhancement factor is between 1,000 to 20,000, and the double layer capacitance density is between about 10 to 500 microfarad per cm$^2$ of the interfacial surface area (i.e. the BET surface area), then surface enhancement capacitance densities of about 0.1 to 10 farads/cm$^2$ for the projected surface area of the electrode are obtained. Although coating with any surface enhancement value are used within the scope of the present invention, larger surface area coatings are more preferred because of the increased capacitance density. Coatings with surface areas between about 10 and 1000 m$^2$/cc are preferred, and preferred values between about 20 and 200 m$^2$/cc, more preferably about 100 m$^2$/cc.

While the double layer theory is described herein, it should be understood that other theories or models, such as the proton injection model, could alternatively be used without departing from the scope of the present invention. Further, the exact surface area porosity and coating thickness can be adjusted and modified by one of skill in the art having this application to meet and achieve the objectives of this invention.

The high surface area (porous) electrically conducting coating material is applied onto the support material.

1. Solution Methods—The porous coating material may originate from various reactive precursors in a solution or a sol-gel composition. Numerous methods of application of these precursor compositions are feasible; but not limited to the following. A curing, hydrolysis and/or pyrolysis process usually is performed to form the coating on the support. Pyrolysis of the metal salts is usually done in a controlled atmosphere (nitrogen, oxygen, water, and/or other inert and oxidative gasses) by means of a furnace and/or an infrared source.

(a) Dip Coating—The electrode or support, is dipped into a solution or sol-gel, coating the support with a precursor coating, and subsequently cured by pyrolytic and other methods. Optionally, this process may be repeated to increase layer thickness. A preferred procedure is to dip the support material in a metal chloride/alcohol solution followed by pyrolysis at between about 250 and 500° C. for 5–20 min in a 5–100% oxygen atmosphere.

This process is repeated until the desired weight of coating is obtained. A final pyrolysis treatment at 250–450° C. is done for 1–10 hr. Typically about 1–30 mg/cm$^2$ of coating is deposited onto a support for a capacitance density of around 1–10 F per square centimeter electrode cross-sectional area. Another procedure is to create a sol-gel solution with ruthenium, silicon, titanium and/or other metal oxides and coat the support as above. By adjusting the pH, water concentration, solvent, and/or the presence of additives like oxalic acid, formamide, and/or surfactants the discharge frequency characteristics of the coating may be adjusted.

High relative humidity during the pyrolysis step can be used to complete the conversion of starting material to oxide at lower temperatures. A procedure is to pyrolyze at about 300° C. without control of humidity. However, an additional procedure is to maintain the relative humidity above about 50% during this pyrolysis at temperatures of about 350° C. or below.

A preferred method for dip coating thin (e.g. 1 mil) support structures is to use a wire frame structure 300 to keep the support material 118 under tension (FIGS. 15 and 15A).

The wire frame structure 300 includes at least two (2) wires 301 and 301A of lengths larger than the width of the support material 118. Each wire 301 and 301A includes a single length of wire which is tightly coiled at each end about 360° to form two coils 302 and 303. The coils are wrapped so the ends of the coil are around 1 cm above the plane of the wire. The coils 302 and 303 are placed through holes 304 and 305, respectively, in the support materials. The holes 304 and 305 are located at two corners on an adjacent side of the support material.

Two additional wires 301B and 301C. are similarly used on the remaining two sides of the support material to provide additional support.

(b) Spray Coating—The coating solution is applied to the support by a spray method, cured, and optionally repeated to increase the thickness. A preferred procedure is to apply the coating solution to the substrate at a temperature of 0–150° C. by means of an ultrasonic or other spray nozzle with a flow rate of around 0.1–5 ml/min in a carrier gas composed of nitrogen, oxygen and/or other reactive and inert gases. The coating characteristics are controlled by the partial pressure of oxygen and other reactive gasses.

(c) Roll Coating—The precursor coating is applied by a roll coating methodology, cured, and optionally repeated to increase the thickness. The coatings described above for dip coating are usable here.

(d) Spin Coating—A spin coating methodology in the conventional art is used to apply the precursor coating, and optionally repeated to obtain the desired thickness.

(e) Doctor Blading—A doctor Blading methodology is used to apply the precursor coating, and optionally repeated to obtain the desired thickness.

2. Electrophoretic Deposition—The porous coating or precursor coating is applied to the support by electrophoretic deposition techniques, and optionally repeated to obtain the desired thickness.

3. Chemical Vapor Deposition—The porous coating or precursor coating may be applied by chemical vapor deposition techniques known in the art.

(C) Electrode Pretreatment

It has been found that a number of pretreatments (conditioning) or combinations thereof are useful to improve the electrical characteristics of the coating (e.g. electrochemical inertness, conductivity, performance characteristics, etc.). These treatments include for example:

1. Steam—High temperature water or steam treatment controlled in atmospheres can be used to decrease the leakage current. A method procedure is to contact the coated electrode with water saturated steam in a closed vessel at between 150 and 325° C. for between 1 to 6 hr. under autogenic pressure.

2. Reactive Gas—The coated electrode is contacted one or more times with a reactive gas such as oxygen, ozone, hydrogen, peroxides, carbon monoxide, nitrous oxide, nitrogen dioxide, or nitric oxide at between about ambient temperature and 300° C. at a reduced pressure or under pressure. A preferred procedure is to contact the coated electrode with flowing ozone at between about 5–20 weight percent in air at between about ambient and 100° C. and 0.1–2000 torr pressure for 0.1–3 hr.

3. Supercritical Fluid—The coated electrode is contacted with a supercritical fluid such as carbon dioxide, organic solvent, and/or water. A preferred procedure is treatment with supercritical water or carbon dioxide for 0.1–5 hrs by first raising the pressure then the temperature to supercritical conditions.

4. Electrochemical—The coated electrode is placed in a sulfuric acid electrolyte and contacted with an anodic current sufficient to evolve oxygen gas and subsequently with a cathodic current. In one embodiment the electrode is contacted with 10 mA/cm$^2$ in 0.5M sulfuric acid for about 5 min, to evolve oxygen gas. The electrode is then switched to a cathodic current and the open circuit potential is driven back to a potential of between about 0.5 V–0.75 V, preferably between 0.5 and 0.6 and more preferably about 0.5 V (vs. NHE) with out hydrogen gas evolution.

5. Reactive Liquid—The coated electrode is contacted with an oxidizing liquid such as aqueous solutions of hydrogen peroxide, ozone, sulfoxide, potassium permanganate, sodium perchlorate, chromium (VI) species and/or combinations thereof at temperatures between about ambient to 100° C. for 0.1–6 hr. A preferred procedure uses a 10–100 mg/l aqueous solution of ozone at 20–50° C. for between a about 0.5–2 hr. followed by an aqueous wash. An additional procedure is to treat the coated electrode in a chromate or dichromate solution.

(D) Spacing between Electrodes

A number of methods are available to obtain electrical insulation and properly defined spacing between the electrodes. The electrode spacing is usually between 0.1 and 10 mil, preferably 1 to 10 mil. These spacings are used so that an optional electrically insulating separator of a smaller thickness can placed between the electrodes. The separators is for example, air, multiple protrusions, a thin sheet, a permeable membrane, etc. These methods include, for example:

1. Microprotrusions—The separator 125 and 127 between the coatings 119 and 120, includes a matrix of small (in area and height) protrusions, i.e. 125 and 127, on the surface of at least one side of the electrode. These microprotrusions may be composed of thermosets, thermoplastics, elastomers, ceramics, or other electrically insulating materials.

Several methods of applying these microprotrusions are included, but not limited to:

(a) Screen Printing—The microprotrusions are placed on the electrode surface by conventional screen printing, as described below, in greater detail, under the heading "SCREEN PRINTING". Various elastomers, thermosets, photo curable plastics, and thermoplastics are applied in this way. A preferred procedure is to use an acid resistant epoxy or VITON® solution.

(b) Chemical Vapor Deposition—Microprotrusions are also placed on the electrode surface by depositing silica, titania and/or other insulating oxides or materials through a mask.

(c) Photolithography—Microprotrusions are also produced by means of a photolithographic method, as is described later, in greater detail, under the heading "PHOTOLITHOGRAPHIC PRODUCTION OF MICROPROTRUSIONS".

2. Physically thin separator sheet—The separator between the electrodes is a thin, substantially open structure material such as glass. A preferred material is 0.001–0.005 in (0.00254 to 0.01270 cm) in thickness porous glass sheet available from Whatman Paper, Ltd. located in Clifton, N.J.

3. Casting a separator—The separator between the porous material is also obtained by casting a thin, substantially open structure film such as for example NAFION®, polysulfones, or various aero- and sol-gels.

4. Air space—The separator between the electrodes is also an air space which is subsequently occupied by the non-aqueous or aqueous electrolyte.

(E) Gasketing

The materials used for the gaskets, such as the gaskets 121, 123, 135, 137, 157 and 159, at the edge of the active electrode surface include any organic polymer which is stable in the electrical/chemical environment, and to the processing conditions. Suitable polymers include, for example polyimide, TEFZEL®, polyethylene (high and low density), polypropylene, other polyolefins, polysulfone, KRATON® other fluorinated or partly fluorinated polymers or combinations thereof. The gasket may be applied as a preformed material, screen printed, perimeter edge dipping in a polymer solution or by other methods.

The capacitors of the present invention are assembled from multiple electrodes which are each a thin (metal) substrate which is thinly coated with generally fragile conductive oxide coatings. The oxide coating comprises porous grains having large inter granular cracks. The present thermoplastic materials and the method of their use in some units does not completely seal the cracks in the coating along the perimeter of the electrodes edges. As a result, the liquid electrolyte in each thermoplastic sealed device envelope seeps to the edges of the electrodes over time or under test conditions causing an electrical short between the adjacent cells. This leakage severely affects the performance, reliability and the life of the electrical storage, i.e. (capacitor) device. Typical gasket thickness valves are between about 0.1 and 20 mil, preferably between about 1 and 10 mil. The gasket perimeter edge width is between about 0.001 and 1 inch, preferably between about 0.01 and 0.5 inch, depending upon the ultimate electrode area, size and shape. The pull cord (tab) is thinner than the electrode separation generally having a thickness (or diameter) of between about 0.05 and 10 mil (depending on the spacing between the electrodes), and if not circular, have a width of between about 1 and 50 mil.

(F) Cord for Fill Port

The cord (117A, 117B and 117C) for the creation of the fill ports, such as the fill ports 122 and 142, is of any suitable material having some specific properties, e.g., it is different from the gasket materials, has a higher melting temperature ($T_m$), i.e. about 5 to 200° C. greater, preferably about 10 to 100° C. greater, than the gasket material, and does not melt, flow or adhere to the gasket material under the heating conditions described herein. Generally, glass, metal, ceramic, and organic polymers or combinations thereof are used.

(G) Stacking

A stack is created by starting with an endplate and alternating gasket material, cord, electrode, gasket, cord electrode until the desired number of cells are created finishing with a second endplate, and optionally with a gasket material on the top outside of the stack.

(H) Assembling (heating and cooling)

The stack is heated under pressure to cause reflow of the gasket material, adhering and sealing the perimeter of the electrode materials to the adjacent electrode in the stack; thereby, creating isolated cells and an assembled stack unit. This is done in an inert atmosphere.

(a) Radio Frequency Induction Heating (RFIH) is used to heat the stack to cause reflow of the gasket material.

(b) Radiant Heating (RH) is used to uniformly heat the stack to cause reflow of the gasket material. A preferred method is to use 1–100 $\mu$m radiation at 0.5–10 watts/cm$^2$ for 1–20 min.

(c) Conductive and/or convective heating in a furnace, optionally in an inert atmosphere, is used to heat the stack to cause reflow of the gasket material.

(I) Creating the fill port

The cords are pulled to mechanically remove them from the assembled unit to create a dry preunit having at least one fill port per cell. The fill port created has the dimensions of the cord, usually between about 0.05 and 10 mil in height (or diameter) and 1 to 50 mil in width.

(J) Post-Conditioning

1. A number of post-conditioning reactive gas treatments of the stack or assembled stack or combinations thereof are useful to improve the overall and long term electrical characteristics of the electrode and resulting device. These include either before step (H) and/or after step (I) treatment with hydrogen, nitric oxide, carbon monoxide, ammonia, and other reducing gasses or combinations thereof at between ambient temperature and the $T_m$ of the gasket material at a reduced pressure or under pressure.

2. A second post conditioning commonly done in the art is to adjust the open circuit potential of the electrode after step (F) and stack the electrode in an inert atmosphere (e.g. Ar, $N_2$). This is done by using a cathodic current without hydrogen evolution.

(K) Filling of the Dry Preunit

The dry preunit is filled with an tonically conducting aqueous or non-aqueous electrolyte.

A preferred electrolyte is approximately 30% sulfuric acid in water due to the high conductivity. Non-aqueous electrolytes based on propylene carbonate and ethylene carbonate are also used to obtain larger than 1.2 V/cell potentials.

A preferred procedure for filling the dry preunit with liquid electrolyte is to place the preunit in a chamber, evacuate the chamber between about 1 torr to 1 microtorr, preferably about 250 mtorr to less than 1 torr, and introduce the electrolyte; thereby, filling the cell gaps with electrolyte through the fill ports. Alternatively, the preunit may be placed in the electrolyte and a vacuum pulled;

thereby causing the gas in the cell gaps to be removed and replaced by the electrolyte.

In addition, non liquid based electrolytes (e.g. solid and polymer) may be used. In those cases the electrode is coated with the electrolyte before reflow and a fill port is not required.

(L) Sealing of Fill Ports

The fill ports are sealed by reflowing an additional film of polymer the same or different over the openings to create a sealed device. This is commonly done with an induction heater, which locally heats the film over the fill port opening.

(M) Burn-In

The device is brought to full charge usually by charging the device in 0.1 V/cell steps at a charging current of about 4 $mA/cm^2$.

(N) Testing

Termination Methods—Several methods are used to make electrical connections to the ultracapacitor endplates, and are described below.

1. Endplate Tabs (160 and 160A)—The endplates (111A and 111Z) themselves have been cut to extend out beyond the normal gasket perimeter. These extensions allow attachment of a wire or ribbon. Typically, the extension is a stub from which all coating material (e.g. oxide) is removed down to the bare support material; 5 mil (0.0127 cm) thick nickel ribbon is spot welded to the stub.

2. Silver Epoxy—The coating is removed from the exposed faces of the endplates or the endplates may be coated only on one side. Clean nickel foil leads or copper plates make electrical connection to the exposed faces by bonding them together with a conductive silver epoxy. Optionally, the coating (e.g. oxide) is present.

3. Lugs—Threaded metal nuts are welded to the thick metal endplates before coating. Electrical connection to the titanium nuts is achieved by screw attachment.

4. Press Contacts—The coating (e.g. oxide) is removed or the endplates may be coated only on one side from the exposed side of the endplates before assembly into the device stack. The bare support material e.g. titanium, is reverse sputtered to clean the surface, being careful not to overheat the substrate. The clean surface is then sputtered with titanium to lay down a clean adhesion layer, followed by gold. The gold acts as a low contact resistance surface to which electrical contact can be made by pressing or by wire bonding.

5. Deposition of a compatible medium such for example aluminum, gold, silver, etc. outside by CVD or other means.

The device resistance is measured at 1 kHz. The device capacitance is determined by measuring the coulombs needed to bring the device to full charge at a charging rate of around 4 $mA/cm^2$ of electrode area. Leakage current is measured as the current needed to maintain a full charge after 30 min. of charging.

These devices may be made in various configurations depending on the desired application. By adjusting the device voltage, cell voltage, electrode area, and/or coating thickness in a rational manner, devices made to fit defined and predetermined specifications are constructed.

The electrode capacitance density (C' in units of $F/cm^2$) is roughly 1 $F/cm^2$ for every 10 $\mu$m of coating. Therefore, for large capacitance values a thicker coat is used. The device capacitance (C) is equal to the electrode capacitance density times the electrode area (A in units of $cm^2$) divided by two times the number of cells (n) (equation 1).

The leakage current (i") is proportional to the electrode area, A' while the equivalent series resistance (ESR) is inversely proportional to the electrode area (eqn. 2). Typical values for i" are less than 20 $\mu A/cm^2$.

The total number of cells in a device (n) is equal to the cell voltage (V') divided by the total device voltage (V) (eqn. 3). Cell voltages up to about 1.2 V can be used with aqueous based electrolytes.

The device height (h), based on a cell gap (h') and a support thickness (h"), is determined from the number of cells and the electrode capacitance density in units of cm by equation 4.

The device ESR is a function of the number of cells (n) times the cell gap (h') times the resistivity of the electrolyte (r) times a factor of about 2 divided by the area A' (equation 5).

$$C = C'A'/2n \qquad \text{eqn.1}$$

$$i'' \alpha\ A' \alpha\ 1/ESR \qquad \text{eqn.2}$$

$$n = V/V' \qquad \text{eqn.3}$$

$$h/cm = n(0.002C' + h' + h'') \qquad \text{eqn4}$$

$$ESR \approx 2nh'r/A' \qquad \text{eqn.5}$$

Devices are constructed to meet the requirements of various applications by considering the voltage, energy, and resistance requirements. The following examples are not meant to be limiting in any way:

For electric vehicle applications about a 100 KJ to 3 MJ device is used. A large voltage (about 100 to 1000 V) large energy (1–5 $F/cm^2$) storage device is used with an electrode area of about 100 to 10,000 $cm^2$.

For electrically heated catalyst applications for the reduction of automobile cold start emissions about a 10 to 80 KJ device is used. This device is about 12 to 50 V constructed with around 100 to 1000 $cm^2$ area electrodes of 1–5 $F/cm^2$. Optionally, a device consisting of several devices in parallel can be constructed to meet the electrical requirements.

For defibrillator applications about a 200–400 V device with 0.5 to 10 $cm^2$ area electrodes of 1–3 $F/cm^2$ are used.

For uninterruptable power source applications various series/parallel device configurations are used.

Screen Printing

Considering now a screenprinting method 250, with respect to FIGS. 7 and 8, the focus of the method 250, is to produce a series of microprotrusions 125 and 127 on the surface of the coating layers, to act as a space separator in electrical storage devices, such as a capacitor or a battery, in general, and in the dry preunit energy storage device 10, in particular.

The substrate is preferably a thin electrode material consisting of a support material such as titanium, zirconium, or alloys thereof with a coating on one or both sides. The substrate is usually in the shape of a thin metal plate as is conventional in the capacitor art. This step is accomplished by methods described herein or conventional in the art.

The coating serves as the charge storage area for the device and may be porous.

Besides electrodes for double-layer capacitors, battery electrodes (e.g., lead for lead acid) or electrolytic capacitor electrodes (e.g., alumina and tantalum) are used.

It is important that the flat surfaces of adjacent coated substrates or electrodes do not contact each other and further be of a uniform separation. The epoxy microprotrusions accomplish the desired uniform separation.

Sample Holding—The coated thin flat substrate needs to be secured (or held), so that the formation of the microprotrusions is precise and accurate on the flat surface of the substrate. For thin electrode sheets (0.1 to 5 mil (0.000254 to 0.0127 cm), especially about 1 mil (0.00254 cm)) an electrode holder 275 is particularly important. If a strong vacuum is pulled on a thin sheet, often reverse dimples are formed in the thin sheet which cause significant undesirable changes in the physical and electrical properties of the final device.

The electrode holder 275 includes a porous ceramic holder 276, which is useful because the pore size is small enough that the dimples do not appear when a mild or stronger vacuum is pulled. The flat ceramic surface of the ceramic holder 276 must be in intimate contact with the surface of the electrode 111B, under conditions which do not deform the metal or disrupt the coating present. The vacuum used with the porous ceramic is at least 25 inches of mercury. Preferably the vacuum is between about 25 and 30 in., especially 26 and 29 in.

Further, the ceramic substrate needs to be flush with the surface of any mechanical holder to assure that uniform extrusion of the epoxy through the screen openings occurs. Flush in this context means that the flat surface of the holder and the surface of the coating for electrical storage differ from each other by between about ±5 mil (0.0127 cm) deviation or less from level per 6 linear in.

The electrode holder 275 further includes a metal frame 277, which should also be as flush (flat) as possible so that uniformly sized protrusions are formed from one end of the electrode to the other.

The electrode holder 275 can be purchased from a number of commercial sources for example from Ceramicon Designs, Golden, Colo. Alternatively, the sample holder 276 can be manufactured using commercially available metals, alloys or ceramics. Usually, a 5 in (12.7 cm) by 7 in (17.78 cm) coated sheet electrode is formed.

The metal holder 277 has a plurality of strategically located pins, such as the three pins 278, 279 and 280, which are used to align and position the electrode 111 B, using a plurality of corresponding holes 281, 282 and 283, respectively. The holes 281, 282 and 283 are usually as close to the peripheral edges of the electrode 111B, as possible to conserve useful electrode surface. Alternatively, no alignment holes are used, and the pins are used to align the electrode edges.

A stencil (not shown) having a predetermined open pattern, is stretched and secured in a conventional screen printing frame (not shown). The screen mesh is removed.

The epoxy components are mixed and the fluid epoxy is placed on the surface of the stencil, then spread to obtain an even applied coat. This can be accomplished using a pressure bar, doctor bar or a squeegee.

Usually, constant temperature and humidity are important to obtain an even coat.

The stencil is then carefully removed leaving the fluid epoxy protrusions on the surface of the oxide. The epoxide protrusions are then cured using ambient, accelerated heat at from between 100 to 150° C. or light.

The electrode having microprotrusions is then combined with other electrodes, and assembled in a wet process or a dry process. If a dry process is used, the dry unit 10 is then back filled with electrolyte, when it is to be charged.

It is important that the cured epoxy does not react with the liquid electrolyte eventually used in the fabrication of the capacitor having multiple layers of electrodes.

The cured microprotrusions then perform their function by keeping the spacing between the electrodes uniform.

It is apparent that from these teachings the following are possible:

Increasing or decreasing the substrate electrode thickness will allow an increase or decrease in the microprotrusion spacing due to changes in support rigidity.

Other thermosets, thermoelastomers, or photo curable epoxies or epoxy derivatives conventional in the art can be used.

Other microprotrusion pattern elements can be used such as squares, lines, crosses, etc. Specifically, bars on the perimeter can add mechanical support.

Optionally the screen may be heated, if necessary to bring the resin flowable epoxy to a temperature when its viscosity becomes suitable for printing for a short time.

This heating step followed by screen printing of the flowable epoxy resin must be performed quickly because the working time for the epoxy is significantly reduced.

The electrical storage devices produced having the microprotusions 125 and 127 are useful as batteries, capacitors and the like.

Photolithographic Production of Microprotrusions

The focus of the present method is to produce a series of microprotrusions on the surface, or alloys of the electrode substrate, using photolithography, with respect to FIGS. 10, 11 and 12. The substrate is usually in the shape of a thin electrode plate as is conventional in the capacitor art.

A photo resist film 381 is applied to the surface of the electrode 111A, either by vacuum lamination using the commercially available Dynachem ConforMASK film applicator, and Dynachem vacuum applicator Model 724/730, or by passing the photo resist film 381 and electrode 111A through a pair of heated rollers 384 and 385.

Exposure is done using a standard 1–7 kW UV exposure source, such as mercury vapor lamps 389.

The ConforMask film applicator is developed using standard conditions such as 0.5–1.0% sodium or potassium carbonate monohydrate in either a developing tank or a conveyorized aqueous developer. Optionally, the electrode with microprotrusions may be neutralized in a dilute 10% sulfuric acid solution after developing. This removes all the unwanted unreacted film to leave the reacted microprotrusions adhered to the electrode surface.

To obtain optimum physical and electrical performance properties the resulting material is put through a final curing process involving both UV irradiation and thermal treatment utilizing conventional UV curing units and convection air ovens.

The multiple electrodes are assembled to produce for instance a capacitor, as described above. The microprotrusions accomplish the desired uniform separation.

Nitrides—In the general procedure to prepare these metal nitrides, the metal halide is dissolved or slurried in a volatile organic liquid, or mixture of liquids as is described herein. Alcohols are preferred.

The metal sheet of a size and thickness is dipped into the liquid to coat both flat surfaces of the sheet. The coated sheet is then placed in an oven in the presence of oxygen or air at 150–400° C. (preferably about 200° C.) for between about 5 to 60 minutes (preferably between about 5 and 20 minutes) to produce the metal oxide and to remove the organic liquid.

This cycle is repeated 10 to 100 times to obtain the desired thickness of the oxide on the sheet (5–20 micron). The coated sheet is then annealed at 150 to 400° C. for 1 to 3 hours to convert 95% or greater of the chloride to the oxide. The coated sheet is then heated slowly at 40° C./minute or less in a nitrogen atmosphere to between about 500–800° C. Once the coated sheet is heated to 500 to 800° C. it is contacted with ammonia gas (or a mixture of hydrogen and nitrogen) at between 500 and 800° C. for between about 1 to 6 hours (preferably about 2–4 hours) which produces the metal nitride film (5–20 micron).

Generally, the maximum temperature for the $Mo_2N$ production is about 700° C., the temperature for the TiN production is about 800° C., and the temperature for $Fe_xN$ production (where x=2, 3 or 4) is about 500–550° C.

Titanium Nitride—1M Titanium chloride (TiC/4) in isopropanol solution is used for dip coating the film on a titanium (foil) substrate. The remainder of the process described herein for the molybdenum nitride is repeated except that the temperature of nitriding is at 800° C. The titanium nitride has a 1.2 voltage window; 0.23 $F/cm^2$; 23 F/g, about 30 $m^2/g$ (BET) in surface area.

Iron Nitride—1M iron chloride $FeCl_3$, optionally with $FeCl_2$ in isopropanol solution is used for dip coating the film on,a titanium (foil) substrate. The remainder of the process described herein for molybdenum nitride is repeated, except that the temperature of the nitriding occurs at 500–550° C., Iron nitride has a CV voltage window of 1.2 volts, 0.20 $F/cm^2$; 75 F/g, and 30 $m^2/g$ (BET) in surface area.

The x-ray diffraction (XRD) pattern result of molybdenum nitride film after about four to six hours reaction with ammonia gas is shown in FIG. 16. It matches to the Joint Committee on Powder Diffraction Standards (JCPDS) computer data base of fcc γ-$Mo_2N$ structure.

Typical cyclic voltammetry (CV) test results of $Mo_2N$ in 3.5M $H_2SO_4$ and 1M KOH solutions at a scan rate of 10 mV/sec are shown in FIG. 17. The capacitance and specific capacitance data from CV testing are 1.0 $F/cm^2$, 125 F/g respectively, both in acid and alkaline solutions. The molybdenum nitride electrodes are stable through 6000 cycles. Comparing the continuous cycles of same materials in both acid and alkaline solution, Molybdenum ion dissolution measurement, leakage current test and package cell test demonstrate $Mo_2N$ is more stable in alkaline solution than in acid solution, but has a 0.7 V voltage window in alkaline solution, while it has a 0.8 V voltage window in acid solution. Brunaner-Emmett-Teller (BET) data yields a surface area of 16 $m^2/g$ for the $Mo_2N$ film.

Molybdenum nitride is a candidate as an alternative material for ultracapacitor charge storage material. The advantages are low-cost high-surface area, and conductive material.

The disadvantages are that it has a smaller voltage window compared to the mixed ruthenium and tantalum oxide, it has moderate mechanical adhesion which may cause some difficulty when packaging the cell, and it is marginally stable as an ultracapacitor charge storage material in aqueous solutions.

Titanium Oxynitride Formation and Performance

Titanium oxide formation condition is judged by BET surface area, SEM pictures, XRD results and CV performance of the titanium oxynitride. The optimized sample is pyrolyzed at 200° C. for 2 hours annealing after dip coated in 1M $TiCl_4$ IPA solution. There is no titanium dioxide peak in the XRD patterns and the biggest crack in SEM picture. Although pyrolysis of the oxide at 150° C. shows the highest BET surface area, these samples create a rutile structure of titanium dioxide which can not be nitrided further at 700° C. Annealing at 300° C. gives relatively lower capacitance, and annealing at 400° C. gives very poor mechanical adhesion and low capacitance.

After six hours of reaction in $NH_3$ flowing (22.5 L/min) and $H_2$, (4.5 L/min flowing) gas atmosphere at 700° C. at ambient pressure, the TiNO is produced. TiNO shows the BET specific surface area of 56 $m^2/g$ and the highest capacitance up to 1.51 $F/cm^2$, 79 F/g in 3.5M $H_2SO_4$ and 1.45 $F/cm^2$, 75 F/g in 1.0M KOH with a 1.2 voltage window from CV curves (see FIG. 18). The active ultracapacitor material cost is estimated to be reduced to about sixty-two cents per kilo-Joule.

XPS (ESCA) Material Composition Analysis

ESCA results of samples of TiNO after nitriding are listed in Table A. Carbon is the contamination on the surface. Argon is used for etching. The nitriding conversion is 38% based on the calculation from oxide to nitride conversion in this table. The products after nitriding at the conditions described above are named as titanium oxynitride (TiNO).

TABLE A

| | ESCA analysis of TiNO | | | | |
|---|---|---|---|---|---|
| Element | Ti | O | N | C | Ar |
| Atomic Percent | 30 | 35 | 21 | 13 | 1 |

Rutherford Backscatering Spectroscopy (RBS) Analysis and SEM Micrographs

The RBS result (Table B) is consistent with the ESCA result for TiNO samples. The ratios of Ti:O:N are about 1:1:1. These data support the hypothesis of titanium oxynitride.

RBS analysis of the samples of different capacitance show the same atomic percentages of Ti, O and N. This implies that the capacitance is not related to the atomic percentages of the sample. It also shows no relation of sample composition with dip coating methods. FIGS. 19A to 19F show the SEM pictures of these three different capacitance samples, which reveal the different surface morphology.

TABLE B

RBS result of TiNO samples in atomic percent

| Capacitance ($F/cm^2$) | S.C. (F/g) | Surface Area ($m^2/g$) | Ti (%) | O (%) | N (%) |
|---|---|---|---|---|---|
| 0.3 | 20 | 30 | 0.37 | 0.33 | 0.30 |
| 0.5 | 38 | 37 | 0.41 | 0.29 | 0.30 |
| 0.9 | 65 | 41 | 0.38 | 0.32 | 0.30 |

TABLE B-continued

RBS result of TiNO samples in atomic percent

| Capacitance (F/cm$^2$) | S.C. (F/g) | Surface Area (m$^2$/g) | Ti (%) | O (%) | N (%) |
|---|---|---|---|---|---|
| 1.5 | 75 | 56 | 0.40 | 0.30 | 0.30 |

Capacitance Effect by Surface Area

Although the capacitance is not related to the composition of the material, it is clear that the capacitance is related to the BET specific surface area from Table B. FIG. 20 reveals this fact that the capacitance is proportional to the material specific surface area by plot the data under different nitride reaction conditions. The titanium oxynitride shows the double layer capacitor phenomena.

Comparison CV Cycles in Different Electrolytes—TiNO

The CV test starting material capacitance is 1.02 F/cm$^2$ in 1M KOH, after 120 continuous CV cycles (16 hrs) the capacitance decreased to 0.80 F/cm$^2$ in 1M KOH, while the decrease was to 0.16 F/cm$^2$ in 3.5M H$_2$SO$_4$. The TiNO film seems to be stable only in alkaline solution.

XRD result shown in FIG. 21A is a titanium oxynitride fresh sample (a) and after 120 CV cycles in both acid solution (FIG. 21B) and alkaline solution (FIG. 21C). The peaks of fresh sample and the sample after 120 CV cycles in KOH solution show the peak position in between TiO and TiN. The sample after 120 CV cycles in 3.5M H$_2$SO$_4$ shows two types of titanium dioxide (rutile and anatase), as well as titanium metal.

The SEM picture of a fresh sample titanium oxynitride (FIG. 22A) and after 120 CV cycles (16 hours) in alkaline solution (FIG. 22B) and acid solution (FIG. 22C). The morphologies are the same of the fresh sample and the sample after 120 CV cycles in KOH. The sample after 120 CV cycles in 3.5M H$_2$SO$_4$ shows a totally different structure which is consistent with XRD results.

(a) Fresh sample (b) After CV cycles in KOH (c) After CV cycles in H$_2$SO$_4$.

After six charge/discharge cycles, the electrolytes are analyzed by inductively coupled plasma (ICP) spectrometry. The Ti ion concentration in 6M KOH is 3 ppm, but in 3.5M H$_2$SO$_4$ it is 853 ppm. This huge difference in concentration indicates that TiNO film is much more stable in alkaline solution than in acid solution.

Titanium Oxynitride Adhesion and Cohesion Test (Qualitative)

Figure 23B:
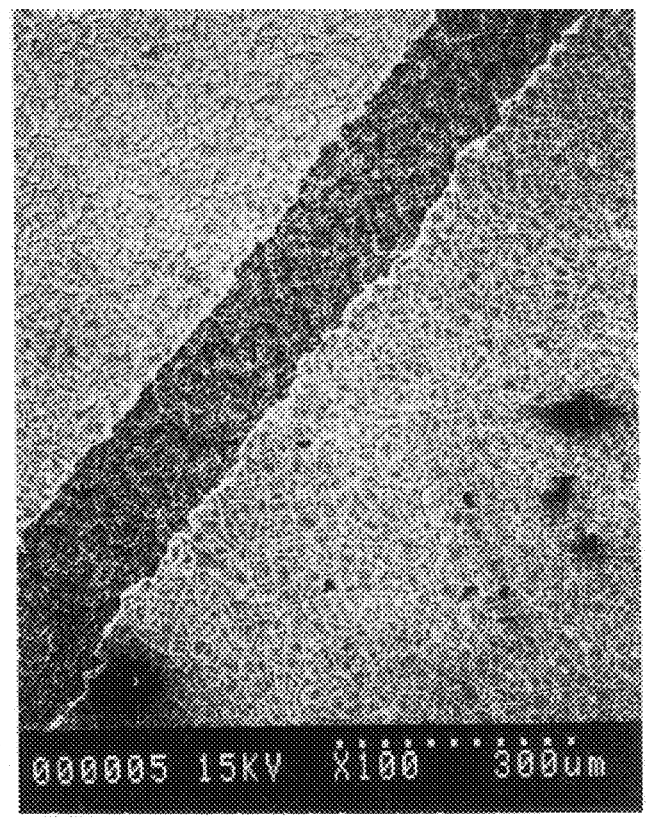

There are no standards to test the film adhesion and cohesion yet. The bend test is: simply hold the film, and bend the corner 180 degrees, then bend it back. The SEM is used to take magnified pictures (see FIGS. 23A and 23B). The width of cracks, and the straightness of the crack line can approximately represent the cohesion and the adhesion of the films. It is found that TiNO has cracks about five times wider than RuTaO$_x$.

Zirconium and Manganese as Cementation Materials

The samples of 15% to 65% Zr mixed TiNO are pyrolyzed at 200° C. in 2 hrs. All samples show good adhesion. Specific surface area and the capacitance decrease as the Zr amount increases, which is interpreted that Zr is not an active material.

Using a 1.5M TiCl$_4$ solution, mixing with either 0.5, or 10% Mn are dip coated on Ti substrates. After pyrolysis and nitriding, the more Mn added, the poorer the cohesion is since the Mn changes the original morphology from SEM photographs (FIG. 24). The BET specific surface area decreases from 55 to 16 m$^2$/g when Mn amount increases rom 0 to 10%.

Reliability of Nitriding Reaction Test

Eleven samples are nitrided under the same conditions. These samples were divided into two groups: TiNO and TiNO+1% Mn. Except for two runs which failed, all the tests have a similar capacitance as listed in Table C, and all of them are completely nitrided in the reaction as shown by XRD patterns. Ignoring the two failed runs, the average capacitance of TiNO is 0.56±0.05 F/cm$^2$, which yields a specific capacitance of 46±4 F/g. The average capacitance of TiNO+1% Mn is 0.63±0.05 F/cm$^2$, which yields the specific capacitance of 47±4 F/g.

Both materials have relative errors of 8%, or deviation of 7%. These errors consist of three parts: manually dip coating of oxide sheets; different runs of nitride reaction; capacitance calculations from CV graphs. The capacitance from different oxide sheets varies comparing sheet A and B or A' and B' are found in Table C.

TABLE C

Capacitance of TiNO and TiNO + 1% Mn

| No | Sheet | Sample | Capacitance (F/cm$^2$) | Surface Area (m$^2$/g) | |
|---|---|---|---|---|---|
| 60819 | A | TiNO | 0.60 | 41 | |
| 60819 | B' | TiNO + 1% Mn | 0.65 | 36 | |
| 60820 | B | TiNO | 0.46 | 35 | |
| 60821 | B' | TiNO + 1% Mn | 0.27 | 35 | Fault |
| 60822 | B | TiNO | 0.55 | 38 | |
| 60823 | A' | TiNO + 1% Mn | n/a | 37 | Fault |
| 60825 | B' | TiNO + 1% Mn | 0.64 | 36 | |
| 60826 | A | TiNO | 0.55 | 37 | |
| 60827 | A | TiNO | 0.63 | 37 | |
| 60828 | A' | TiNO + 1% Mn | 0.53 | 35 | |
| 60829 | B' | TiNO + 1% Mn | 0.69 | 39 | |

Addition of Metal Oxides to Enhance Adhesion of Titanium Oxide

In the standard RuTaOx system, the addition of tantalum oxide acts as a dispersing agent which increases surface area, improving specific capacitance and smoothing out the surface of the coated sheets. But because of cost, TaCl$_5$ is not economical in the TiNO system and replacement materials such as MnCl$_2$ and ZrCl$_4$ were investigated.

Incorporation of MnCl$_2$ and ZrCl$_4$ into the precursor solution improved the adhesion of the coating material and smoothed out the surface of the electrodes. A parametric study was performed on both additives to see which metal oxide improves adhesion more as well as retains or increases the specific surface area of TiO$_2$. The experiments entailed coating the electrodes using the standard coating process at 200° C. for 2 hrs in air. With the addition of either metal oxide to the precursor solution at the optimum condition, the structure of the material remained amorphous.

The addition of 1 to 10% MnCl$_2$ to the 1 M TiCl$_4$/IPA solution improved the adhesion of the coating but lowered the surface area. (Se FIGS. 24A, 24B and 24C). The more MnCl$_2$ was added to the solution, the lower the surface area became. Therefore only a limited amount (<5%) of MnCl$_2$ was added to the system. The advantage of using MnCl$_2$ over ZrCl$_4$ is that all phases of MnO$_2$ are conductive unlike ZrO$_2$ where its presence can lower the capacitance of TiNO.

Different amounts of ZrCl$_4$ were added to the precursor solution of (1 M TiCl$_4$/IPA) to further improve adhesion. The amount of the additive varied from 15 to 65%. The adhesion was very good for up to 35%, but flaking was observed in the electrodes with the higher $ZrCl_4$ content. The surface of the electrodes was very smooth while the specific surface area increased with increasing $ZrCl_4$ content until a maximum was reached and then started to continuously decrease. After nitriding these electrodes, the resulting material was not very conductive therefore the amount of $ZrCl_4$ that should be added into the precursor solution should not be beyond 5%.

Addition of Steam During Removal of IPA

In the standard coating process described herein, there is no control over the environmental conditions. In a controlled pyrolysis reacor, more control over the conditions such as temperature, humidity and air flow rate is used.

When using the controlled pyrolysis reactor, several halide coated sheets are dried and annealed at the same time. Pre-heated dry air flows through the reactor allowing temperature uniformity and control. Humidity, oxygen content, airflow rate and temperature at the inlet and outlet of the reactor as well as in different locations in the reactor zone, are tracked. By controlling these variables, there is obtained better adhesion of the coating material to the substrate, and the surface of the electrodes is much smoother. When applying the standard coating process in high humidity environments, the surface of the coated sheets becomes uneven due to particle build-up. this build-up usually flakes off on contact, and the uneven surface causes problems for packaging.

The reactor was used to synthesize a $TiO_2$ film using the 1 M $TiCl_4$/IPA solution on a Ti substrate with 15 coats annealed at 200° C. for 2 hours. In the reactor, the coating process is different than the standard process. The electrodes remain inside the reactor during both steps as compared to the standard process where the electrodes are removed from the drying oven to the annealing oven thus being exposed to the surrounding conditions. The coating process in the reactor consists of drying at 75° C. for 10 min. ramping (increasing) the temperature up to 200° C., holding for 10 min. and then cooling to about 75° C.

The adhesion of the coating material is much better in the reactor than the standard coating process. But the specific surface area was lower (25 $m^2/g$ vs. 36 $m^2/g$) due to the control over the processing conditions (i.e., coating process, temperature, humidity and air flow rate).

The addition of steam into the process improves the specific surface area of $TiO_2$. Using the 1 M $TiCl_4$/IPA on 5 mil Ti with 15 coats at 200° C. for 2 hours, the reactor processing conditions were as follows: dip in the precursor halide solution, dry at 75° C. for 10 minutes then ramp up to 200° C. and add steam 45 cubic feet per minute (CFM), 1 to 30% relative humidity for 10 minutes (in between each coat only). After adding 15 coats of halide, the product is annealed at 200° C. for 2 hours.

At 200° C., the maximum relative humidity attainable in the reactor was in the range of 1 to 1.6%. although this may not be considered a humid environment, these conditions have shown a distinct difference in the specific surface area of the electrode. The specific surface areas of the $TiO_2$ electrode process in three different methods at the same conditions (1 M $TiCl_4$/IPA; 5 mil Ti; 15 coats; 200° C.; 2 hour anneal) are:

| | |
|---|---|
| standard coating process | 36 $m^2/g$ |
| reactor w/out steam | 25 $m^2/g$ |
| reactor w/steam | 90 $m^2/g$ |

With the addition of steam, the specific surface area is almost three times higher than without steam although the loading is the same for all three conditions (about 8 $mg/cm^2$). All results have been reproducible at different conditions.

Nitriding Ramping Rate and Reaction Temperature.

Temperature programmed reaction is a slow increasing (ramping) rate in order to produce the maximum surface area. Different ramping rates are studied to optimize nitriding conditions. Capacitance data is listed in Table D. When the temperature is increasing at less than the 3.5 hour from 25° C. to 700° C., the slower rate gives better result. More than 3.5 hrs of ramping rate shows no extra advantage.

The nitriding reaction at 700° C. yields an oxygen to nitrogen ratio of 1:1 in the TiNO sample. At 800° C., the nitriding reaction is more complete, with a N:O ratio of 4:1. The sample color is close to gold. The capacitance is 23 $F/cm^2$ (BET surface area 26 $m^2/g$), about half the capacitance and half the surface area compared to nitriding at 700° C. (0.54 $F/cm^2$, 59 $m^2/g$).

TABLE D

The relation of ramping rate and capacitance

| Ramp Rate (hr) | 0 | 1.9 | 3.5 | 7.0 | 14.0 |
|---|---|---|---|---|---|
| Reaction Time (hrs) | 4 | 4 | 4 | 4 | 4 |
| Capacitance ($F/cm^2$) | 0.32 | 0.42 | 0.54 | 0.50 | 0.55 |

Impedance Measurement and Leakage Current Test in a Single Test Tube Cell

The AC impedance measurement is carried out in a glass test tube. Two pieces of the same material are cut the same size (2 $cm^2$). These two pieces are separated by a glass-paper separator which is dipped in the electrolyte. The AC impedance equivalent series resistance (ESR) is shown in FIG. 25. At high frequency the TiNO film in alkaline medium has the same ESR as $RuTaO_x$ film in acid. Both of them are about 0.4 Ω in single test tubes.

The leakage current test is carried out that two pieces of TiNO which are cut to about 4 $cm^2$ and set separately in a test tube. This material is safe to charge up to 1.2 V. After the charge to 1 V in 1M KOH, the leakage current data are shown in FIG. 26. At least 4 hours is needed to achieve the so called "leakage current". The ESR is the same value (1.3 Ω) before and after test. The leakage current in sulfuric acid is three times higher than in potassium hydroxide. The leakage current tet of different charge voltages are listed in Table E.

TABLE E

Leakage current test in 1M KOH

| Voltage (V) | Electrode Capacitance ($F/cm^2$) | Leakage Current at 30 min. ($\mu A/cm^2$) |
|---|---|---|
| 0.5 | 0.36 | 25 |
| 0.7 | 0.45 | 39 |
| 0.9 | 0.53 | 69 |
| 1.0 | 0.64 | 89 |
| 1.1 | 0.73 | 115 |
| 1.2 | 0.84 | 134 |

Packaged Titanium Nitride Ultracapacitor and Postmortem Analysis

The first five-cell stack of titanium oxynitride ultracapacitors were packaged in 12.9 $cm^2$ size with 1M KOH electrolyte. After charging to 5 V using 99 mA charge/discharge current, the output energy and power are 0.8 J and 0.2 W respectively.

This TiNO material for packaging purposes has a CV capacitance of 0.5 F/cm². After EDM cut the material it is washed in 1M KOH and DI water, and has a capacitance of only 0.3 F/cm². SEM pictures show some "holes" and "dusts" on the surface (FIGS. 27A, 27B and 27C). The charge capacitance of ultracapacitor to 1 V is 0.2 F/cm² per electrode.

The first TiNO five-cell ultracapacitors last several hundred cycles. The ESR starts at 200 MΩ, then increases to several kΩ.

The XRD shows oxide patterns on some sides of electrode sheets. The BET specific surface area of electrodes are: original 43 m²/g, both sides TiNO 46 m²/g, and one side $TiO_2$ one side, TiNO 31 m²/g. The SEM pictures clearly show that when $TiO_2$ ball cluster involved, the TiNO structure disappeared? (FIG. 28). The hypothesis is that there must be a electrochemical reaction happening during charge and discharge of the device. What causes this to happen appears to be a short in between some sheets. Then, there is an over charge in between the sheets.

$TiNO + 2H_2O + e \rightarrow TiO_2 + NH_3 + OH$ (4)

The second packaging material for 12.9 cm² has a 1.0 F/cm² capacitance from the CV test. After over 3000 cycles with charge and discharge current at 99 mA, the charge efficiency is kept over 90%.

Ragone plots of single cell device is shown in FIG. 29. The charge current is vary from 99 mA to 800 mA which corresponds to the discharge time vary from 35 to 0.3 seconds. The energy density and power density are calculated using active material weight only.

Titanium Oxynitride Material Stability Test

Two TiNO materials have been used for packing ultracapacitor devices. One has capacitance of 0.8 F/cm² while the other has 0.2 F/cm². From FIG. 30, it is clear that all device capacitance from charge/discharge test and material capacitance from CV test decayed during the cycles. Device tests showed decay faster than material CV tests because they are the closed system. Even small amount of gas evolution may damage the whole device. The data listed on the FIG. 30 is the capacitance at 3000 cycles versus to the first few cycles.

TiNO material decays much faster than $RuTaO_x$ material. One possible explanation is that TiNO not only has small layered cracks, but also has large deep cracks through down to the substrate (FIG. 31). Thus, the substrate corrosion become a serious problem.

The titanium oxynitride produced has a surface area of abouat 10 to 60 m²/g, preferably about 20 to 56 m²/g.

Molybdenum nitride with tantalum oxide—Under certain circumstances, the combination of a transition metal nitride and tantalum oxide produces a high surface area layer having 30 to 50% better adhesion to the metal substrate characteristics than does the nitride alone. Preferably, a metal halide and the tantalum halide and mixed in about a 1:1 atomic ratio in isopropanol as is described herein coated multiple times, as a film on a substrate, dried, annealed and pyrolyzed. The resulting high surface area metal nitride-tantalum oxide has stronger adhesive to the substrate of 30 to 50 or 100% greater properties.

Summary—Titanium oxynitride (TiNO) is an ultracapacitor energy storage material. The active material cost is about 62 cents per kilo-Joule. The performance of TiNO as an ultracapacitor material data is described. The more coats of oxide-oxynitride, the thicker the film the higher surface area and the higher the capacitance. Unfortunately, the more coats, the poorer the cohesion.

The adhesion and cohesion are improved when Zr is mixed in TiNO. But Zr is not an active material.

Commercial Applications

The energy storage device 10A has a multitude of applications, as a primary or back up power supply, and/or as a capacitor. The size is from 0.1 volt to 100,000 volts or 0.1 cm³ to 10⁶ cm³. Typical voltage ranges may include combinations of uses in automotive and other applications.

Among these applications are the following:

|  | TYPICAL Volt RANGE | TYPICAL SIZE (cm³) |
|---|---|---|
| Automobile Applications |  |  |
| Airbags & Seat Restraints | 1–100 | 1–1000 |
| Seat Warmers | 1–100 | 1–100 |
| Electronically Heated Catalyst | 1–1000 | 1–1,000,000 |
| Electric Vehicle Propulsion | 100–1000 | 100–1,000,000 |
| Hybrid Electric Vehicle Propulsion | 1–1000 | 10–100,000 |
| Internal Combustion/Ultra Capacitor Propulsion | 1–1000 | 100–100,000 |
| Power Steering | 1–1000 | 1–100 |
| Regenerative Braking/Shock Absorption | 1–1000 | 5–100 |
| Starting Lighting and Ignition with battery | 1–1000 | 2–100 |
| Starting Lighting and Ignition stand alone | 1–100 | 1–100 |
| Medical Applications |  |  |
| Cardiac Defibrillators | 10–500 | 0.1–100 |
| Pacemakers | 1–300 | 0.1–300 |
| Neuro stimulators and like | 0.1–300 | 0.1–300 |
| Implantable and external devices | 0.1–300 | 0.1–300 |
| Surgical Power Tools | 10–700 | 1–10 |
| Ambulatory Monitoring Equipment | 1–100 | 1–100 |
| Automatic Liquic Chromatography | 1–100 | 1–20 |
| Automated Clinical Lab Analysis | 1–100 | 1–20 |
| Computerized Tomography (CT) Scanners | 1–1000 | 1–100 |
| Dental Equipment | 1–200 | 1–10 |
| Digital Radiography Equipment | 1 . 500 | 1–1000 |
| Electrosurgical Instruments | 1–200 | 1–10 |
| Fiberoptics | 1–100 | 1–100 |
| Examination Scopes | 1–100 | 1–10 |
| Hearing Aids | 1–10 | 0.1–1.0 |
| Infusion Devices | 1–100 | 0.1–10 |
| Magnetic Resonance Imaging (MRI) | 1–1000 | 1–1000 |
| Nuclear Medical Diagnostic Equipment | 1–1000 | 1–100 |
| Electric Patient Monitoring Systems | 1–200 | 1–100 |
| Respiratory Therapy Equipment | 1–500 | 1–100 |
| Surgical Lasers | 1–1000 | 1–1000 |
| Elctric Surgical Support Systems | 1–100 | 1–1000 |
| Ultrasonic Diagnostic Equipment | 1–100 | 1–100 |
| Mobile Propulsion Systems |  |  |
| Fork Lifts | 1–1000 | 100–10,000 |
| Golf Carts | 1–1000 | 100–10,000 |
| Farm Implements/Train or Subway Cars | 1–1000 | 100–100,000 |
| Regenerative Braking | 1–1000 | 1–100 |
| Business/Commercial Electronics Applications |  |  |
| Calculators | 1–120 | 0.5–10 |
| Cellular Telecommunications | 1–120 | 1–100 |
| Commercial Audio Amplifiers | 1–1000 | 1–10 |
| Commercial Flash/Strobe Lights | 1–1000 | 1–10 |
| Commercial Power Tools | 1–1000 | 1–100 |
| Commercial Video Cameras | 1–120 | 1–10 |
| Computers | 1–120 | 1–10 |
| Copiers | 1–120 | 1–10 |
| Dictation Equipment | 1–100 | 1–1000 |
| Electric Motors | 1–1000 | 1–1000 |
| Electronic Locks | 1–120 | 1–10 |
| Electronic Organizers/PDAs | 1–100 | 1–5 |
| Emergency Lighting Systems | 1–440 | 1–1000 |
| Facsimile Equipment | 1–120 | 1–10 |
| Microphones | 1–120 | 1–3 |
| Pagers | 1–120 | 1–2 |
| Printers | 1–120 | 1–10 |

| | TYPICAL Volt RANGE | TYPICAL SIZE (cm³) |
|---|---|---|
| Security Systems | 1–120 | 1–100 |
| Slide Projectors | 1–120 | 1–100 |
| Uninterruptible Power Supplies | 1–1000 | 1–100,000 |
| Surge Protectors | 1–1000 | 1–100,000 |
| Wireless Networks | 1–1000 | 1–1000 |
| Consumer Electronics Applications | | |
| Audio Systems: | | |
| Compact/Home | 1–120 | 1–10 |
| Portable Tape/CD | 1–120 | 1–5 |
| Walkman/Personal Stereo | 1–120 | 1–5 |
| CB Radios | 1–120 | 1–10 |
| HAM Radios | 1–120 | 1–100 |
| Camcorders | 1–120 | 1–10 |
| Home Satellite Dishes | 1–120 | 1–10 |
| Microphones | 1–120 | 1–3 |
| Monitors and Cathode Ray Tubes | 1–1000 | 1–100 |
| Photo Flash | 1–1000 | 1–3 |
| Receivers, Transceivers | 1–1000 | 1–10 |
| Telephone answering devices | 1–120 | 1–5 |
| Cellular, cordless phones | 1–120 | 1–3 |
| Toys & Games | 1–120 | 1–10 |
| Television sets | 1–1000 | 1–10 |
| Home | 1–1000 | 1–10 |
| Portable | 1–1000 | 1–10 |
| VCRs | 1–120 | 1–10 |
| Video Disk Players | 1–120 | 1–10 |
| Video Games | 1–120 | 1–10 |
| Watches/Clocks | 1–120 | 1–100 |
| Consumer Electric Housewares Applications | | |
| Air Purifiers | 1–120 | 1–100 |
| Bag Sealers | 1–500 | 1–100 |
| Blenders | 1–120 | 1–10 |
| Clocks-Total | 1–120 | 1–100 |
| Alarm & Desk | 1–120 | 1–10 |
| Coffee Grinders | 1–120 | 1–10 |
| Coffee Makers | 1–120 | 1–10 |
| Convection Ovens | 1–1000 | 1–1000 |
| Corn Poppers | 1–120 | 1–10 |
| Curling Irons/Brushes | 1–120 | 1–5 |
| Deep Fryers | 1–230 | 1–100 |
| Electric Blankets | 1–120 | 1–10 |
| Flashlights | 1–100 | 1–10 |
| Floor Polishers | 1–220 | 1–100 |
| Food Processors | 1–120 | 1–10 |
| Hair Dryers | 1–120 | 1–5 |
| Heating Pads | 1–120 | 1–5 |
| Home Security Systems | 1–120 | 1–100 |
| Irons | 1–120 | 1–5 |
| Knives | 1–120 | 1–3 |
| Massagers | 1–120 | 1–5 |
| Mixers | 1–120 | 1–5 |
| Microwave Ovens | 1–230 | 1–10 |
| Power Tools | 1–230 | 1–100 |
| Security Systems | 1–230 | 1–100 |
| Shavers | 1–120 | 1–3 |
| Smoke Detectors | 1–120 | 1–5 |
| Timers | 1–120 | 1–3 |
| Toasters/Toaster Ovens | 1–120 | 1–5 |
| Toothbrushes (Electric) | 1–120 | 1–3 |
| Vaporizers | 1–120 | 1–10 |
| Water Pulsators | 1–120 | 1–10 |
| Whirlpools (Portable) | 1–120 | 1–100 |
| Consumer Major Appliances | | |
| Compactors | 1–120 | 1–10 |
| Dishwashers | 1–220 | 1–100 |
| Dryers | 1–120 | 1–100 |
| Freezers | 1–220 | 1–100 |
| Ranges | 1–220 | 1–1000 |
| Refrigerators | 1–120 | 1–100 |
| Washers | 1–220 | 1–100 |
| Water Heaters | 1–220 | 1–100 |

| | TYPICAL Volt RANGE | TYPICAL SIZE (cm³) |
|---|---|---|
| Outdoor Applicances | | |
| Bug Killers | 1–120 | 1–10 |
| Outdoor Grills | 1–120 | 1–100 |
| Power Mowers | 1–220 | 1–100 |
| Riding Mowers | 1–1000 | 1–1000 |
| Riding Tractors | 1–1000 | 1–10,000 |
| Rotary Tillers | 1–1000 | 1–10,000 |
| Snow Plows/Blowers | 1–220 | 1–1000 |
| Weed Trimmers | 1–200 | 1–100 |
| Other Applications | | |
| Electro-expulsive Deicing | 1–1000 | 1–100 |
| Electronic Fuses | 1–1000 | 1–10 |
| Lasers | 1–1000 | 1–100 |
| Phased-Array radar | 1–1000 | 1–1000 |
| Rail Gun | 1–1000 | 1–10,000 |

Multiple devices are placed is series and/or parallel for specific applications to achieve desired performance.

Fabrication of Dry Preunit

The following examples are presented to be descriptive and explanatory only. They are not to be construed to be limiting in any manner.

General:

Molybdenum chloride is obtained from Alfa Aesar and is used without further purification.

Titanium chloride is also obtained from Alfa Aesar and is used without further purification.

Iron chloride ($FeCl_3$) or ($FeCl_2$) are also obtained from Alfa Aesar and are essentially free of water.

EXAMPLE 1

Fabrication of A Dry Preunit (A) Coating Method

The support structure is prepared by etching a 1 mil (0.00254 cm) titanium sheet with 35% $HNO_3$/1.5% HF at 60° C. for 5 min. The end plates are 5 mil (0.0127 cm) titanium.

The oxide coating solution is 0.2 M ruthenium trichloride trihydrate and 0.2 M niobium pentachloride in tert-butanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 10 min and removed to cool to ambient temperature all in ambient atmosphere.

The dip-coating steps are repeated for 10 coats (or any desired number) rotating the Ti sheet so as to dip with alternate sides down. A thickness of about ten microns is achieved.

The fully coated sheet is final annealed at 350° C. for 3 hrs in ambient atmosphere.

(B) Electrode Pretreatment

The coated electrode is contacted with saturated steam in a closed vessel at 280° C. for 3 hrs under autogenic pressure.

(C) Spacing

Microprotrusions are screen printed on one side of the electrode, as described below, in greater detail, under the heading "SCREEN PRINTING". The epoxy compound is EP21AR from Masterbond, of Hackensack, N.J.

The epoxy protrusions are cured at 150° C. for 4 hr. in air. The coated electrodes are next die-stamped to the desired shape.

(D) Gasket

A modified high density polyethylene (HDPE, improved puncture resistance and adhesion) 1.5 mil (0.00381 cm) thick by 30 mil (0.0762 cm) wide with outside perimeter the same as that of the electrode is placed on the electrodes on the same side as the microprotrusions and impulse heat laminated. The HDPE is grade PJX 2242 from Phillips-Joanna of Ladd, Ill.

(E) Cord

One cord (Dupont $T^2$ TEFZEL® film 90ZM slit in machine direction) 0.9 mil (0.00229 cm) thick by 10 mil (0.0254 cm) wide is placed across the narrow dimension of the gasket and electrode surface and aligned between microprotrusions. The location of the cord is one of three positions centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked in a non-metallic (ceramic) alignment fixture beginning with a 5 mil (0.0127 cm) end plate unit to the desired number of cells and ending with a plain 5 mil (0.0127 cm) end plate with the cords arranged such that the location is staggered-left, center, right in a three unit repeating cycle (end perspective). Light pressure is applied to the top of the stack through a ceramic piston block to maintain uniform alignment and contact throughout the stack.

(G) Reflow

A radio frequency induction heater (2.5 kW) is used to heat the stack. The stack was placed centrally in the three turn, 3 in (7.62 cm) diameter coil and heated for 90 seconds at a power setting of 32%. The fused unit is allowed to cool to ambient temperature.

(H) Cord Removal

The cords are mechanically removed by carefully pulling the exposed ends of the cord to leave the open fill ports.

EXAMPLE 2

Alternative Fabrication of Dry Preunit (A) Coating Method

The support structure is prepared by etching a 1 mil (0.00254 cm) titanium sheet with 50% HCl at 75° C. for 30 min. The end plates are 2 mil (0.00508 cm) titanium.

The oxide coating solution is 0.3 M ruthenium trichloride trihydrate and 0.2 M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min. in ambient atmosphere, pyrolyzed at 330° C. for 15 min in a 3 cubic feet per hrs. flow of 50 vol. % oxygen and 50% nitrogen, and removed to cool to ambient temperature in ambient atmosphere.

The dip-coating steps are repeated for 30 coats (or any desired number) rotating the Ti sheet so as to dip with alternate sides down.

The fully coated sheet is final annealed at the above conditions for 3 hr.

(C) Spacing

VITON® microprotrusions are screen printed on one side of the electrode, as described below, in greater detail, under the heading "VII. SCREEN PRINTING".

The VITON® protrusions are cured at 150° C. for 30 min. in air. The coated electrodes are next die-stamped to the desired shape.

(D) Gasket

A modified high density polyethylene (HDPE, improved puncture resistance and adhesion) 1.0 mil (0.00254 cm) thick by 20 mil (0.0508 cm) wide with outside perimeter the same as that of the electrode is impulse heat laminated to both sides of the electrode. The HDPE is grade PJX 2242 from Phillips-Joanna of Ladd, Ill.

(E) Cord

One cord, 1 mil (0.00254 cm) diameter TEFLON® coated tungsten wire is placed across the narrow dimension of the gasket and electrode surface and aligned between microprotrusions. The location of the cord is one of three positions centered, left of center, or right of center.

(F) Stacking

Electrode/microprotrusion/gasket/cord/gasket units are stacked beginning with a 2 mil (0.00508 cm) end plate unit to the desired number of cells and ending with a plain 2 mil (0.00508 cm) end plate with the cords arranged such that the location is staggered-left, center, right in a three unit repeating cycle (end perspective).

(G) Reflow

The HDPE gasket is reflowed in nitrogen at 125° C. for 120 min to reflow the thermoplastic. The unit is cooled in nitrogen to ambient temperature.

(H) Cord Removal

The cords are removed by pulling the exposed ends to leave the open fill ports.

EXAMPLE 3

Alternative Fabrication of Dry Preunit (A) Coating Method

The support structure is prepared by etching a 1 mil (0.00254 cm) titanium sheet with 50% HCl at 75° C. for 30 min. The end plates are 10 mil (0.0254 cm) titanium.

The oxide coating solution is 0.2 M ruthenium trichloride trihydrate and 0.2 M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 300° C. for 5 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 300° C. for 3 hrs in ambient atmosphere.

(B) Electrode Pretreatment

The coated electrode is contacted with saturated steam in a closed vessel at 260° C. for 2 hrs under autogenic pressure.

(C) Spacing

Microprotrusions are screen printed on one side of the electrode, as described below, in greater detail, under the heading "SCREEN PRINTING". The epoxy compound is grade EP21AR from Masterbond, Hackensack, N.J.

The epoxy protrusions are cured at 150° C. for 4 hr. in air. The coated electrodes are next die-stamped to the desired shape.

(D) Gasket

A modified high density polyethylene (HDPE, improved puncture resistance and adhesion) 1.5 mil (0.00381 cm) thick by 30 mil (0.0762 cm) wide with an outside perimeter the same as that of the electrode is placed on the electrodes on same side as the microprotrusions and impulse heat laminated. The HDPE® is grade PJX 2242 from Phillips-Joanna of Ladd, Ill.

(E) Cord

One cord (TEFZEL®) 1 mil (0.00254 cm) thick by 10 mil (0.0254 cm) wide is placed across the narrow dimension of the gasket and electrode surface and aligned between microprotrusions. The location of the cord is one of three positions centered, left of center, or right of center.

A second HDPE® gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 10 mil (0.0254 cm) end plate unit to the desired number of cells and ending with a plain 10 mil (0.0254 cm) end plate with the cords arranged such that the location is staggered-left, center, right in a three unit repeating cycle (end perspective).

(G) Reflow

The gasket is reflowed in nitrogen at 160° C. for 45 min to reflow the thermoplastic. The unit is cooled in nitrogen to ambient temperature.

(H) Cord Removal

The cords are removed by carefully pulling the exposed ends to leave the open fill ports.

EXAMPLE 4

Alternative Fabrication of Dry Preunit (A) Coating Method

The support structure is prepared by etching a 1 mil (0.00254 cm) titanium sheet with 50% HCl at 75° C. for 30 min. The end plates are 5 mil (0.0127 cm) titanium.

The oxide coating solution is 0.2 M ruthenium trichloride trihydrate and 0.2 M Ti(di-isopropoxide)bis 2,4-pentanedionate in ethanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 5 min in oxygen and removed to cool to ambient temperature all in ambient atmosphere.

The dip-coating steps are repeated for 30 coats (or any desired number) rotating the Ti sheet so as to dip with alternate sides down.

The fully coated sheet is final annealed at 350° C. for 3 hrs in an oxygen atmosphere.

(C) Spacing

Microprotrusions are produced by spraying through a mask on one side of the electrode, a thermally cured organohalogen polymer, such as TEFLON® from E.I. DuPont de Nemours & Co., Wilmington, Del.

The TEFLON® protrusions are cured at 300° C. for 0.5 hr. in air. The coated electrodes are next die-stamped to the desired shape.

(D) Gasket

A modified high density polyethylene (HDPE, improved puncture resistance and adhesion) 1.5 mil (0.00381 cm) thick by 30 mil (0.0762 cm) wide with outside perimeter the same as that of the electrode is placed on the electrodes on same side as the microprotrusions and impulse heat laminated. The HDPE is grade PJX 2242 from Phillips-Joanna of Ladd, Ill.

(E) Cord

One cord (TEFZEL®) 1 mil (0.00254 cm) thick by 10 mil (0.0254 cm) wide is placed across the narrow dimension of the gasket and electrode surface and aligned between microprotrusions. The location of the cord is one of three positions centered, left of center, or right of center.

A second HDPE® gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 5 mil (0.0127 cm) end plate unit to the desired number of cells and ending with a plain 5 mil (0.0127 cm) end plate with the cords arranged such that the location is staggered-left, center, right in a three unit repeating cycle (end perspective).

(G) Reflow

The gasket is reflowed in nitrogen at 190° C. for 30 min. to reflow the thermoplastic. The unit is cooled in nitrogen to ambient temperature.

(H) Cord Removal

The cords are removed by carefully pulling the exposed ends to leave the open fill ports.

EXAMPLE 5

Alternative Fabrication of Dry Preunit (A) Coating Method

The support structure is prepared by etching a 0.8 mil (0.002032 cm) zirconium sheet with 1% HF/20% HNO$_3$ at 20° C. for 1 min. The end plates are 2 mil (0.00508 cm) zirconium.

The oxide coating solution is 0.2 M ruthenium trichloride trihydrate and 0.1 M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 85° C. for 10 min, pyrolyzed at 310° C. for 7 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 310° C. for 2 hrs in ambient atmosphere.

(C) Spacing

Microprotrusions are produced by spraying through a mask on one side of the electrode, a thermally cured organo halogen polymer, such as TEFLON® from E.I. DuPont de Nemours & Co., Wilmington, Del.

The TEFLON® protrusions are cured at 310° C. for 1.0 hr. in air. The coated electrodes are next die-stamped to the desired shape.

(D) Gasket

A polypropylene gasket 1.5 mil (0.00381 cm) thick by 30 mil (0.0762 cm) wide with outside perimeter the same as that of the electrode is placed on the electrodes on same side as the microprotrusions and impulse heat laminated.

(E) Cord

One cord, 1 mil (0.00254 cm) diameter TEFLON® coated tungsten wire, is placed across the narrow dimension of the gasket and electrode surface and aligned between microprotrusions. The location of the cord is one of three positions centered, left of center, or right of center.

A second polypropylene gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 2 mil (0.00508 cm) end plate unit to the desired number of cells and ending with a plain 2 mil (0.00508 cm) end plate with the cords arranged such that the location is staggered-left, center, right in a three unit repeating cycle (end perspective).

(G) Reflow

The gasket is reflowed in nitrogen at 195° C. for 60 min. to reflow the thermoplastic. The unit is cooled in nitrogen to ambient temperature.

(H) Cord Removal

The cords are removed by pulling the exposed ends to leave the open fill ports.

EXAMPLE 6

Filling of the Cell Gap Space

A dry preunit 10 may be filled with an electrolyte with the following procedure. Any of many possible dry preunit configurations may be used.

(H) Back Fill

The cords are removed manually to open the fill port. The stacked unit is placed into an evacuation chamber and evacuated to <35 mtorr for 5 to 60 min. The liquid electrolyte 3.8 M $H_2SO_4$ de-aerated with nitrogen is introduced into the chamber and fills the evacuated space between the electrodes.

(I) Seal Fill Port Openings

The electrolyte filled preunit is removed from the chamber. It is rinsed with deionized water to remove excess electrolyte and dried. HDPE film (1.5 mil (0.00381 cm) thick) is placed over the fill port openings and impulse heat sealed over the ports.

(J) Conditioning

The device is charged up to full charge beginning at 0.1 V/cell increasing by 0.1 V/cell until 1 V/cell is obtained.

(K) Testing

The device is tested in the conventional manner, having 1 V/cell with leakage current of less than 25 $\mu A/cm^2$, and a capacitance density per a cell of greater than about 0.1 $F/cm^2$. A 10 V device has a height of no more than 0.05", a 40 V device has a height of no more than 0.13", and a 100 V device has a height of no more than 0.27".

Performance characteristics for various device geometries and configurations based on a sulfuric acid electrolyte are presented in Table 1.

TABLE 1

| Ultracapacitor Device Performance Characteristics | | | | | | |
|---|---|---|---|---|---|---|
| Area/cm² | 2 | 2 | 2 | 2 | 25 | 25 |
| volt | 10 | 40 | 100 | 100 | 100 | 100 |
| C/mF | 26 | 6.7 | 2.6 | 10 | 150 | 753 |
| ESR/mohm | 100 | 330 | 780 | 780 | 62 | 70 |
| vol/cc | 0.29 | 0.73 | 1.6 | 1.6 | 11 | 32 |
| J/cc | 4.5 | 7.4 | 8.1 | 31 | 69 | 111 |
| watt/cc | 860 | 1660 | 2000 | 2000 | 3670 | 1100 |

EXAMPLE 7

Alternative Backfill of Dry Preunit

A dry preunit 10 may be filled with an electrolyte with the following procedure. Any of many possible dry preunit configurations may be used.

(H) Back Fill

The cords are removed to open the fill port. The stacked unit is placed into an evacuation chamber and evacuated to <35 mtorr for 5 to 60 min. The liquid non-aqueous electrolyte 0.5 M $KPF_6$ in propylene carbonate de-aerated with nitrogen is introduced into the chamber and fills the evacuated space between the electrodes.

(I) Seal Fill Port Openings

The electrolyte filled preunit is removed from the chamber and excess electrolyte is removed. HDPE film (1.5 mil (0.00381 cm) thick) is placed over the fill port openings and impulse heat sealed over the ports.

(J) Conditioning

The device is charged up to full charge beginning at 0.1 V/cell increasing by 0.1 V/cell until 1.5 V/cell is obtained.

(K) Testing The device is tested in the conventional manner, having 1.5 V/cell with leakage current of around 100 $\mu A/cm^2$, and a capacitance density of around 4 $mF/cm^2$ for a 10 cell device.

EXAMPLE 8

DEVICE POST-TREATMENT CONDITIONS

The following is a list of the electrical properties (Table 3) of devices using various gas postconditioning techniques to adjust the electrode rest potential so that charging to at least 1 V/cell on multicell devices filled with 4.6 M sulfuric acid electrolyte is possible and reduced leakage currents are observed. This treatment is done before, during, and/or after reflow of the gasket material. For gas treatment at temperatures below that used for gasket reflow the atmosphere was exchanged with an inert gas such as nitrogen or argon during reflow. For treatment after reflow of the gasket material the tabs were removed before treatment. During treatment the atmosphere is evacuated and filled with the reactive gas periodically.

TABLE 3

Device characteristics for various postconditioning.

| gas | T/° C. | t/min. | i"/$\mu A/cm^2$ | V/cell |
|---|---|---|---|---|
| $H_2$ | 50 | 20 | 8 | 1.0 |
| CO | 100 | 170 | 40 | 1.0 |
| CO | 90 | 103 | 12 | 1.0 |
| CO | 90 | 165 | 20 | 1.0 |
| CO | 80 | 120 | 25 | 1.1 |
| NO | 75 | 20 | 27 | 1.0 |
| NO | 95 | 140 | 21 | 1.1 |
| $NH_3$ | 85 | 30 | 26 | 1.0 |

FORMATION OF MICROPROTRUSIONS BY SCREEN PRINTING

EXAMPLE 9

Application of Epoxy Microprotrusions by Screen Printing onto a Porous Coating on a Thin Substrate (A) Screen Preparation—A 325 mesh stainless steel screen is stretched on a standard screen printing frame. To this screen is edge glued (Dexter Epoxy 608 clear) to a smaller 1–1.5 mil (0.00254 to 0.00381 cm) thick brass sheet which has holes (6.3 mil (0.016 cm) diameter) drilled or etched to the desired pattern. The screen mesh is removed from the area covered by the brass sheet leaving the brass sheet edge glued to the screen mesh attached to the frame.

(B) Sample Holding—A vacuum is pulled on a porous alumina holding plate of 10 $\mu$m average pore diameter is used to hold the 1 mil (0.00254 cm) thick porous oxide coated material during the printing.

(C) Epoxy—A two component epoxy Master Bond EP21 AR is modified to the desired viscosity (thixotropic, 300,000 to 400,000 cps) by the addition of a silica filler. The filled epoxy having the desired viscosity is available by purchase order from Master Bond, Inc. of Hackensack, N.J. The epoxy is prepared as per instructions. The useful lifetime as a flowable fluid is about 30 min.

(D) Screen printer parameters squeegee speed: 1–2 in/s snap off: 20–30 mil (0.0508 to 0.0762 cm)

Constant temperature and humidity of the epoxy are important to assure an even applied coat. Typical conditions are about 40–70% relative humidity and a temperature of about 20–25° C.

(E) Printed epoxy pattern—An array of epoxy bumps essentially 1 mil (0.00254 cm) in height and about 7.5 mil (0.019 cm) in diameter are produced. A typical pattern on an electrode consists of an array of microprotrusions deposited on 40 mil (0.1016 cm) center-to-center spacing. In addition, the density of microprotrusions at the perimeter of the electrode is increased by decreasing their center-to-center spacing to 20 mil (0.508 cm). The screen printed epoxy configuration is cured at 150° C. for a minimum of 4 hr.

EXAMPLE 10

Screen Print Formation of Epoxy Microprotrusions (A) Screen Preparation—A 230 or 325 mesh screen (8×10 in stainless steel) without an emulsion on the surface, mounted on a standard printing frame, is used as the base piece. An etched, drilled or punched stencil (6.0×8.5 molybdenum) is edge glued using Dexter Epoxy 608 Clear from Dexter located to the back side of the screen. MYLAR® is placed over the stencil-screen unit and pressure applied to smooth the epoxy into a uniform layer.

The screen is then flipped, epoxy applied to the top side of the screen, a MYLAR® sheet placed over the area and the epoxy smoothed. The MYLAR® sheet on the top side of the screen is then removed. The screen-stencil assembly is then placed into a 120° C. oven with ambient atmosphere for 5 min to cure the epoxy. Alternatively, the epoxy can be cured by maintaining it at ambient temperature for 30–60 min.

After removal of the screen-stencil from the oven, the MYLAR® on the back side is carefully peeled away immediately. The mesh screen on the top side is then cut away using a sharp edge, with care being taken to prevent cutting of the stencil.

Upon removal of the mesh over the stencil pattern, any heat stable thermoset adhesive (e.g. an epoxy resin) is applied to the cut mesh-stencil perimeter, covered with MYLAR®, and the epoxy smoothed to ensure edge attachment of the screen to the stencil. The epoxy is cured in the oven for 5 min. The resulting item is a stencil stretched taut by the screen, ready for printing.

(B) Sample Holding—A porous ceramic holding (e.g. FIG. 8) plate (Ceramicon Designs, Golden, Colo., P-6-C material) of 4.5–6μ pore diameter with a porosity of 36.5% (30–60% porosity is acceptable) is used to hold the 1 mil (0.00254 cm) thick porous oxide coated material during the printing by pulling a vacuum through the porous ceramic plate. The ceramic plate is cut to the appropriate dimensions (the size and shape of the substrate to be printed). This ceramic plate then is inserted into an aluminum (steel, etc) frame 277 and epoxy or other adhesive) that can be mounted to a screen printer. The ceramic plate is then carefully ground flush to the metal frame as flat as possible. Locating pins 278, 279 and 280 are then added to hold the substrate 111A in appropriate location using holes 281, 282 and 283.

(C) Epoxy—The Master Bond EP 21 ART® (a two component epoxy (of polyamine hardener, 33 weight percent and a liquid epoxy resin, 67 weight percent) about with a viscosity of 150,000 to 600,000 cps). The epoxy is prepared as per the product instructions. The useful lifetime as a flowable fluid is about 30 min.

(D) Screen Printing Parameters

| | |
|---|---|
| Squeegee Speed | 1–2 in/s (depends upon epoxy viscosity) |
| Snap Off | 20–30 mil (0.0050 to 0.0076 cm) |
| | (Related to screen tension; and adjusted accordingly) |

(E) Printed epoxy pattern—An array of epoxy bumps essentially about 1 to 1.25 mil (0.00254 to 0.00316 cm) in height and about 7.5 mil (0.019 cm) in diameter are produced. A typical pattern on an electrode consists of an array of microprotrusions deposited on 40 mil (0.1 cm) center-to-center spacing. In addition, the density of microprotrusions around the perimeter of the electrode is increased by decreasing their center-to-center spacing to 20 mil (0.0508 cm). The screen printed epoxy configuration is cured at 150° C. for 4 to 12 hrs. in an ambient atmosphere.

EXAMPLE 11

ALTERNATIVE SCREEN PRINTING PARAMETERS (A) Separator Bumps—Separator bumps (protrusions) range in height from 0.001 to 0.004 in. (0.00254 to 0.01016 cm) and widths of 0.006 to 0.012 in. (0.01524 to 0.03038 cm). Separator bumps may take the form of dots, squares, rectangles or a composite of these shapes. The widths of the bumps increase as the bump height is increased.

(B) Separator Pattern—Two patterns are utilized on an electrode substrate, the Active Field Area (AFA) and the Bounding Border Area (BBA). The AFA has the separator bumps located on 0.040 by 0.040 in. (0.1016 by 0.1016 cm) center to center spacing and are normally dots. The BBA has an increased bump density with a 0.020 by 0.020 in. (0.0508 by 0.0508 cm) center to center spacing. Rows of rectangles alternate between arrays of dots in the BBA only.

(C) Screen Preparation—Design of the separator configuration is performed on a CAD (Computer Aided Drafting) system. The CAD electronic data is converted to a Gerber plot file. This plot data is used by the screen manufacture to create the artwork to produce the desired thickness stencil for the screen printer. The screen is sent ready to use by SMT (Screen Manufacturing Technologies of Santa Clara, Calif.).

(D) Electrode Vacuum Plate (Workholder)—A porous ceramic plate (Ceramicon Designs, Golden, Colo., P-6-C material) trimmed 0.050 smaller than the electrode perimeter is fitted and epoxied into an aluminum plate designed to fit the screen printer. The top and bottom surfaces are ground flush and parallel. Multiple pins are inserted around the centered electrode edge creating a corner stop for placement of the electrode substrate.

(E) Epoxy—A two component epoxy Master Bond EP21AR is modified to the desired viscosity (thixotropic, 300,000 to 400,000 cps) by the addition of a silica filler. The filled epoxy having the desired viscosity is available by purchase order from Master Bond, Inc. of Hackensack, N.J. The epoxy is prepared as per instructions. The useful lifetime as a flowable fluid is about 30 min.

(F) Screen Printing Parameters

| Thick Film Screen Printer | |
|---|---|
| Squeegee Durometer | 45 to 100 Type A |
| Squeegee Speed | 1–2 in/s |
| Squeegee Pressure | 10 to 15 lbs. |
| Squeegee Down Stop | .010 to max. in. |
| Snap Off | .010 to .030 in. (.0254 to .0762 cm.) |

FORMATION OF MICROPROTRUSIONS BY PHOTOLITHOGRAPHY

EXAMPLE 12

Hot Roller Photolithographic Production of Microprotrusions (A) The ConforMASK® 2000 high conformance solder mask of 1.5 mil (0.0038 cm) in thickness is cut to the same size as the electrode.

(B) The photo resist film 381 is applied by placing the ConforMASK® film on the electrode material surface 111A, after removing a release sheet 382 between the photo resist film 381 and the electrode 111A, and passing the laminate through heated rollers (384 and 385), at 150° F., to adhere the photoresist film 381 to the electrode surface 111A. A polyester cover sheet 382A on the outside of the photo resist film 381 is then removed.

(C) A dark field mask 387 containing rows of transparent holes (openings 388) is placed on the photo resist 381. A typical pattern consists of an array of holes 6 mil (0.0212 cm) in diameter 40 mil (0.1 cm) center-to-center spacing with a higher density (20 mil (0.0508 cm) center-to-center) for three rows on the perimeter of the electrode.

(D) The film 381 is exposed through the holes 388 and the mask 387, for about 20 seconds, to a conventional UV light source, i.e. mercury vapor lamps 389. The mask is then removed.

(E) The unexposed area of the photo resist is developed or stripped by placing it in a tank with 1% potassium carbonate for 1.5 min.

(F) The electrode surface with the microprotrusions (standoffs) are then washed with de-ionized water, placed in a tank with 10% sulfuric acid, for 1.5 min and a final de-ionized water rinse.

(G) First, the microprotrusions 13 are exposed to UV light. A final cure of the microprotrusions (standoffs) is done in a convection air oven at 300° F. for 1 hr.

The finished electrode 111A is used directly, or is treated, as described above.

EXAMPLE 13

Vacuum Lamination of Photo Resist (A) The ConforMASK® 2000 high conformance solder mask of 2.3 mil (0.0058 cm) in thickness is cut slightly larger than the electrode.

(B) The photo resist film is 381 vacuum laminated to the electrode 111A, and onto a supporting backing plate using standard operating conditions (160° C., 0.3 mbars) using a Dynachem vacuum applicator model 724 or 730. The polyester cover sheet 382A is removed.

(C) The dark field mask 387 containing rows of transparent holes 388 is placed on the photo resist film 381. A typical pattern includes an array of holes 6 mil (0.0015 cm) in diameter 40 mil (0.102 cm) center-to-center spacing with a higher density (20 mil (0.0054 cm) center-to-center) for three rows on the perimeter of the electrode.

(D) The film is exposed for 20 to 40 seconds to a non-collimated UV light source of 3–7 KW power.

(E) The unexposed area of the photo resist film is developed or stripped by using 0.5% potassium carbonate in a conveyorized spray developing unit, followed by a de-ionized water rinsing and turbine drying.

(F) A final cure of the microprotrusion standoffs is done in a two step process. First, the microprotrusions are exposed to UV light in a Dynachem UVCS 933 unit and then placed in a forced air oven at 300–310° F. for 75 min.

The finished electrode is used directly or further treated as described above.

EXAMPLE 14

Surfactants for Porosity Control

32 Grams of cetyltrimethyl ammonium bromide was added to 1 l of isopropanol with stirring and slight heat. After approximately one hour 73 g of $TaCl_5$ and 47 g of $RuCl_3.H_2O$ was added to the clear solution. The standard coating procedure was performed with interim pyrolysis at 300° C. or 5 min. and a final pyrolysis at 300° C. for 3 hours. The average pore diameter of the coating increased to around 45 Å. After post-treatment in steam at 260° C. at 680 psi for 2 hr. the average pore diameter increased to 120 Å.

A 25 wt % cetyltrimethyl ammonium chloride in water solution may also be used to modify the pore diameter of the resulting coating.

EXAMPLE 15

Thermal Elastomeric Gasket

An alternative construction methodology is to sandwich a thermal elastomer gasket (e.g. KRATON®) between the two HDPE gaskets. Device characteristics are similar to those previously described.

EXAMPLE 16

Inclusion of Second Material to Accommodate Electrolyte Volume Increases

A porous hydrophobic material is added to each cell to accommodate any volume increase of the electrolyte due to an increase in temperature.

This material is placed in the cell as either a gasket material inside the perimeter HDPE gasket, or as a disk replacing part of the separator material.

A common material used is a PTFE material from W.L. Gore & Associates, Inc. 1–3 mil thick. Preferably, the PTFE material has water entry pressures from between about 20 to 100 psi.

EXAMPLE 17

Alternate Electrode Pretreatment

After the electrodes have microprotrusions, gaskets, and pull cords or tabs (after step E), the electrodes are placed in 1M sulfuric acid and the open circuit potential is adjusted to about 0.5 V (vs NHE) using a cathodic current with no hydrogen evolution. The electrodes are transferred submerged in deionized water to an inert atmosphere (e.g. Ar) where they are dried and assembled.

EXAMPLE 18

THERMOELASTOMER GASKETS I a. Preparing the Electrodes—1.3 Mil substrates are coated with 15 coats of ruthenium trichloride hydrate (0.4M) and tantalum pentachloride (0.4M) in isopropanol solution by the "standard method" described herein of dip coating and pyrolysis. These substrates are then cut into electrodes of size 5.0 in.×3.2 in. Steam post treatment is performed, as described above at 300° C. for 3 hr on these electrodes.

b. Edge Sealing—The electrode edges are dip coated along the perimeter to a depth of 5 mm with 5.0 wt. % solution of KRATON® (FG 1901 Shell, Houston, Tex.) as a mixture of 90.0 wt. % toluene and 10 wt. % of isopropanol. After standing at ambient temperature and pressure for 3 hr, the electrodes are heated at 100° C. for 2 hr to remove the solvent.

c. Stacking—Window frame shape gaskets of 3.0 mm width and the outside dimensions corresponding to the electrode size are cut from a 6 mil thick high density polyethylene (HDPE) material. An 8 cell unit is stacked by placing, attached with eight 1.0 mil thick cords TEFZEL®, followed by the HDPE gasket. A 1.0 mil glass separator is placed within the inside of the frame of the HDPE gasket, followed by the next electrode. This procedure is repeated until an 8 cell device is stacked which requires 9 electrodes. This assembly is placed within two flat parallel plates fixture. The device is thermally reflowed at 190° C. for 30 min to melt the HDPE and form an edge seal when cooled to ambient conditions. On cooling to ambient, the pull tabs creating the fill port are pulled creating the fill ports. The device is filled with electrolyte as described above.

d. Test Results—The device is tested in the conventional manner with 1 volt per cell applied. This device has an ESR value of 14.0 mOhms, a capacitance value of 4.975 F and leakage current of 2.9 mA are obtained. The device is further subjected to cycle testing and a satisfactory performance of over 100,000 cycles is obtained.

EXAMPLE 19

THERMOELASTOMER GASKETS II (a) (b) Steps (a) and (b) of Example 18 are performed.

c. Stacking—A 4 cell unit is produced by stacking electrodes, attached to 1.0 mil thick cords, followed by applying a thick line of KRATON® solution with a syringe along the perimeter of the flat surface of the electrode about 3.0 mm from the edge of the electrode. A 1.0 mil glass separator is placed within the inside of this KRATON® line frame followed by the next electrode. This procedure is repeated until a 4 cell device is stacked which requires 5 electrodes. This assembly is placed within two flat parallel plate fixture. The device is allowed to stand under ambient conditions for 12 hr. The device is then convective heated at 100° C. for 2–3 hr to remove the solvent. On cooling, the pull tabs are mechanically removed and the fill ports are created. The device is filled with electrolyte described herein above. The fill ports are sealed using KRATON® solution at ambient conditions.

d. Test Results—The device is tested in the conventional manner with 1 volt per cell applied. The ultra capacitor device test results are comparable to the results obtained in Example 18.

EXAMPLE 20

THERMOELASTOMER GASKETS III a. Preparing the Electrodes—1.1 Mil Ti substrates coated with 15 coats of 0.8M mixed metal oxide of Example 18 solution by the "standard method" described above of dip coating are obtained. These are then cut into electrodes of size 5.0 in.×3.2 in. Steam post treatment is performed, as described herein. Insulating separators of epoxy are applied by the method of screen printing as described in copending U.S. Ser. No. 07/947,414, filed Sep. 18, 1992, which is incorporated herein by reference.

b. Edge Sealing—The electrode edges are dip coated along the perimeter to a depth of 5 mm with 5.0 wt. % solution of KRATON® made in a mixture of 90.0 wt. % toluene and 10 wt. % of isopropanol dipped 3 times. Additional coats of thicker 20% KRATON® solution are applied multiple times to develop a gasket of 5 mil on each side of the electrode perimeter to a depth of about 5.0 mm. After standing at ambient temperature and pressure for 12 hr, the electrodes are heated at 100° C. for 3 hr to remove the solvent.

c. Stacking and Reflow—A 6 cell unit is stacked by putting electrodes, attached with 1.0 mil thick cords, followed by the next electrode. This procedure is repeated until a 6 cell device is stacked which requires 7 electrodes. The assembly is placed within two flat parallel plates fixture. The device is thermally reflowed to melt KRATON® and form a seal at 170° C. and 10–50 psi. On cooling, the pull tabs are pulled and the device is filled with electrolyte as described above. The electrolyte fill ports are sealed by using the KRATON® solution described in Example 19.

d. Test Results—The device is tested in the conventional manner with 1 volt per cell applied. This device has an ESR value of 10.0 mOhms, and a capacitance value of 5.133 F and a leakage current of 2.4 mA obtained after one hour test. Continuing testing produces a leakage current of milliamps 0.24 (mA) after 48 hr.

EXAMPLE 21

THERMO ELASTOMER GASKETS IV a. Preparing the Electrodes—2 Mil Ti substrates are coated with 10 coats of 0.8M mixed metal oxide of solution of Example 18 by the "standard method" of dip coating. These are then cut into electrodes of size 5.0 in.×7.0 in. Insulating protrusions (separators) of photoresist are applied by the method of photo processing as described herein and in U.S. patent application Ser. No. 07/958,506, filed October 1992.

b. Edge Sealing—The electrode edges are dip coated along the perimeter to a depth of 5 mm with 5.0 wt. % solution of KRATON® made in a mixture of 90.0 wt. % toluene and 10 wt. % of isopropanol (dipped 3 times). After standing at ambient temperature and pressure for 3 hr, the electrodes are heated at 100° C. for 1.0 hr to remove the solvent. Electrochemical post treatment is performed, as described above, on these electrodes.

c. Stacking and Reflow—Window frame shaped gaskets of 3.0 mm width and the outside dimensions corresponding to the electrode size are cut from a 6 mil thick high density polyethylene (HDPE) material. An 15 cell unit is stacked by placing electrodes, attached with 1.0 mil thick cords, followed by the HDPE gasket followed by the next electrode. This procedure is repeated till an 15 cell device is stacked which requires 16 electrodes. This assembly is placed within a two flat parallel plates fixture. The device is thermally reflowed melt HDPE and to form an edge seal in the controlled atmosphere. On cooling, the pull tabs are removed to create the fill port, and the device is filled with electrolyte as described herein.

d. Test Results—The device is tested in the conventional manner with 1 volt per cell applied. This device has an ESR value of 13.0 mOhms, a capacitance value of 7.1 F and a leakage current of 5.4 mA, which properties are obtained after a one hour test.

EXAMPLE 22

PAINTING EDGES AND SEALING a. Preparing the electrodes

Two mil Ti substrates coated with 15 coats of 0.8M mixed ruthenium oxide and tantalum oxide solution by the standard method of coating of Example 4 are obtained. These articles are cut into electrodes of size of about 5.0×3.2 in. Steam post treatment is performed, as described in Example 3, on the electrodes. Insulating separators of epoxy resin are applied by the method of screen printing as described in U.S. Pat. No. 5,055,169.

b. Edge sealing

The electrode edges are dip coated along the perimeter to a depth of about 5 mm with a 5.0 wt % solution of KRATON® in a mixture of 90.0 wt % toluene and 10 wt % of isopropanol 3 times. Additional coats of thicker 20% KRATON® solution are applied multiple times to develop a gasket of 5 mil thickness on each side of the electrode perimeter to a depth of about 5.0 mm. After allowing the object to stand at ambient temperature and pressure for 12 hr, the electrodes are heated at 100° C. for 3 hr to remove the solvent.

c. Stacking

A 32 cell unit is stacked by putting electrodes, attached with 1.0 mil thick cords, followed by the next electrode. The is repeated e.g. of Example 5 till a 32 cell device is stacked which requires 33 electrodes. This assembly is put within two flat parallel plates fixture and the device is thermally reflowed at about 20° C. to 200° C. to melt KRATON® and to form a seal in the inert atmosphere. On cooling, the pull tabs are pulled and the device is filled with electrolyte as described herein. The electrolyte fill ports are sealed by using the KRATON® solution described above.

d. Test results

The device is tested in the conventional manner e.g. of Example 6 with 1 volt per cell applied. This device has an ESR value 10.0 mOhms, a capacitance value of 5.133 F and a leakage current of 2.4 mA, results which are obtained after a one hour test.

EXAMPLE 23

METAL NITRIDE (a) A solution (or slurry) of $MoCl_5$ about 10% by weight in isopropanol is prepared. A thin sheet of titanium is dip coated, first dried in air then at 70° C. for about 10 min. The electrode is then heated in air or oxygen at about 300° C. for about 5 hr, and $MoO_3$ and $MoO_2$ are formed. The sheet is coated, dried and heated several times to obtain the desired thickness of $MoO_3$ and $MoO_2$. Optionally, the electrode is then annealed at 300° C. for 3 hr. The pyrolyzed electrode is cooled to ambient temperature then heated in a flowing ammonia atmosphere at 1 atm at 350° C. for about 5 hr. The $Mo_2N$ coated electrode is obtained. When a capacitor is formed by wet construction, dry construction, or fill port construction as described herein, e.g. Examples 1–22 and filled with suitable electrolyte, a useful high energy long-life energy storage device is obtained.

(b) When Example 23(a) is repeated except that the ammonia is replaced with a mixture of $N_2$ and $H_2$, the corresponding useful $Mo_2N$ electrode and energy storage device is obtained.

EXAMPLE 24

METAL CARBIDE (a) A solution (or slurry) of $MoCl_5$ about 10% by weight in isopropanol is prepared. A thin sheet of titanium is dip coated, first dried in air then at 70° C. for about 10 min. The electrode is then heated in air or oxygen at about 300° C. for about 5 hr, and $MoO_3$ and $MoO_2$ are formed. The sheet is coated, dried and heated several times to obtain the desired thickness of $MoO_3$ and $MoO_2$. Optionally, the electrode is then annealed at 300° C. for 3 hr. The pyrolyzed electrode is cooled to ambient temperature then heated in a flowing carbon monoxide atmosphere at 1 atm at 350° C. for about 5 hr. The $Mo_2C$ coated electrode is obtained. When a capacitor is formed by wet construction, dry construction, or fill port construction as described herein, e.g. Examples 1–22 and filled with suitable electrolyte, a useful high energy long-life energy storage device is obtained.

EXAMPLE 25

Molybdenum Nitride $Mo_2N$—Molybdenum chloride is dip coated onto a Ti sheet, which was pre-etched in hot HCl as described in U.S. Pat. No. 5,464,453. The 1M molybdenum chloride in isopropanol film is first converted to molybdenum oxide in an oven by pyrolysis at temperatures between about 150–400° C. for between about 5 and 60 minutes. The dip coating and oxidation and removal of isopropanol is repeated for 15 times. The oxide is then heated for 3 hours at 200° C. to convert the 95% or greater of the chloride to the oxide. The oxide is then converted to nitride via flowing $NH_3$ gas (13 l/min) over the oxide sheets at a temperature of about 700° C. This molybdenum nitride material is characterized by XRD, SEM, EDAX and AES. The ultracapacitor performance of $Mo_2N$ material is evaluated by cyclic voltammetry (CV), package cell charge-discharge cycles and leakage current measurement using KOH and $H_2SO_4$.

EXAMPLE 26

Molybdenum Nitride (with Tantalum Oxide)

Molybdenum chloride and Tantalum chloride $TaC_5$ (1:1 atomic ratio) are combined in isopropanol. The procedure of Example 1 is then repeated. The $Mo_2N/TaO_x$ layer formed has better adhesion properties (at least 30% or greater) than without tantalum. This high surface area layer also has improved electrical storage properties, the voltage window expands to 1.1 volt, for example.

EXAMPLE 27

Titanium Nitride (a) Titanium chloride (1M) in isopropanol is prepared. A titanium foil (flat sheet) substrate is dipped into the titanium chloride solution and coated. This coated foil is placed in an oven in air at 200° C. for 10 min to convert the chloride to the oxide. The titanium chloride coated foil is removed from the oven and cooled to 20° C. This coating and heating is repeated 15 times until the desired level of coating on the foil. The film is then post heated for 2 hr at 200° C. to convert 95% or greater of the chloride to the oxide. The titanium oxide is then contacted with flowing ammonia (10–20 l/min) at 800° C. for 4 hr. The titanium nitride film adheres well to the titanium sheet. The article is ready to be tested with electrolyte and/or used as an electrode in a double layer capacitor as described in U.S. Pat. No. 5,464,453.

(b) Example 27(a) is repeated except that hydrogen gas (1–5 l/min) is combined with the ammonia at >800° C. for 4 hrs. The resulting metal nitride has similar properties.

EXAMPLE 28

Iron Nitride

A titanium substrate foil was coated with 0.7M ferrous chloride-ferric chloride ($FeCl_2+FeCl_3$) solution of isopropanol. The sheets were dip coated 15 times and dried in a reactor at 75° C. for 10 min then pyrolysis at 200° C. for 10 min.

The coated substrate is then heated up to 500° C. The substrate is contacted with ammonia gas (flowing) (10–20 L/min) at 500° C. for 4 hr. The $Fe_xN$ where x is 2,3,4 films produced is determined by XRD. The $Fe_xN$ coating has good adherence to the substrate. In an electrode configuration with 1M KOH, it has a specific capacitance of 30 F/g.

EXAMPLE 29

Molybdenum Oxynitride (a) $Mo_2NO$—Molybdenum chloride is dip coated onto a Ti sheet, which was pre-etched in hot HCl as described in U.S. Pat. No. 5,464,453. The 1M molybdenum (penta) chloride in isopropanol film is first converted to molybdenum oxide in an oven by pyrolysis at temperatures between about 150–400° C. for between about 5 and 60 minutes. The dip coating and oxidation and removal of isopropanol is repeated for 15 times. The oxide is then heated for 3 hours at 200° C. to convert the 95% or greater of the chloride to the oxide. The oxide is then converted to the oxynitride via flowing $NH_3$ gas (13 l/min) over the oxide sheets at a temperature of about 700° C. This molybdenum oxynitride material is characterized by XRD, SEM, EDAX and AES. The ultracapacitor performance of $Mo_2NO$ material is evaluated by cyclic voltammetry (CV), package cell charge-discharge cycles and leakage current measurement using KOH and $H_2SO_4$.

(b) Similarly, when Example 29 is repeated except that the molybdenum chloride is replaced with a stoichiometrically equivalent amount of niobium chloride a corresponding amount of niobium oxynitride is obtained.

(c) Similarly, when Example 29 is repeated except that the molybdenum chloride is replaced with a stoichiometrically equivalent amount of vanadium chloride a corresponding amount of vanadium oxynitride is obtained.

(d) Similarly, when Example 29 is repeated except that the molybdenum chloride is replaced with a stoichiometrically equivalent amount of tantalum chloride a corresponding amount of tantalum oxynitride is obtained.

(e) Similarly, when Example 29 is repeated except that the molybdenum chloride is replaced with a stoichiometrically equivalent amount of titanium chloride a corresponding amount of titanium oxynitride is obtained.

(f) Similarly, when Example 29 is repeated except that the molybdenum chloride is replaced with a stoichiometrically equivalent amount of zirconium chloride a corresponding amount of zirconium oxynitride is obtained.

EXAMPLE 30

Titanium Oxynitride (a) Titanium chloride (1M) in isopropanol is prepared. A titanium foil (flat sheet) substrate is dipped into the titanium chloride solution and coated. This coated foil is placed in an oven in air at 200° C. for 10 min to convert the chloride to the oxide. The titanium chloride coated foil is removed from the oven and cooled to 20° C. This coating and heating is repeated 15 times until the desired level of coating is on the foil. The film is then post heated for 2 hr at 200° C. to convert 95% or greater of the chloride to the oxide. The titanium oxide is then contacted with flowing ammonia (10–20 l/min) at 700° C. for 4 hr. The titanium oxynitride film adheres well to the titanium sheet. The article is ready to be tested with electrolyte and/or used as an electrode in a double layer capacitor as described in U.S. Pat. No. 5,464,453.

(b) Similarly, when Example 30 is repeated except that the titanium tetrachloride is replaced with a stoichiometrically equivalent amount of niobium chloride a corresponding amount of niobium oxynitride is obtained.

(c) Similarly, when Example 30 is repeated except that the titanium tetrachloride is replaced with a stoichiometrically equivalent amount of molybdenum chloride a corresponding amount of molybdenum oxynitride is obtained.

(d) Similarly, when Example 30 is repeated except that the titanium tetrachloride is replaced with a stoichiometrically equivalent amount of vanadium chloride a corresponding amount of vanadium oxynitride is obtained.

(e) Similarly, when Example 30 is repeated except that the titanium tetrachioride is replaced with a stoichiometrically equivalent amount of tantalum chloride a corresponding amount of tantalum oxynitride is obtained.

(f) Similarly, when Example 30 is repeated except that the titanium tetrachloride is replaced with a stoichiometrically equivalent amount of zirconium chloride a corresponding amount of zirconium oxynitride is obtained.

(g) Example 30(a) is repeated except that hydrogen gas (1–5 l/min) is combined with the ammonia at 700° C. for 4 hrs. The resulting metal oxynitride has similar properties.

AA. In one embodiment AA, the present invention relates to a dry preunit for an energy storage device comprising:
  at least a first cell for storing energy, said first cell comprising, in combination:
   a. a first electrically conductive electrode;
   b. a second electrically conductive electrode, said first and second electrodes being spaced apart by a first predetermined distance; and
   c. first dielectric gasket means interposed between said first and second electrodes, for separating and electrically insulating said first and second electrodes;
   whereby, when said first electrode, said second electrode and said first gasket means having a centrally located opening are bonded together to form said first cell, an air filled fill gap is formed therebetween.

BB. In one embodiment, the present invention relates to a dry preunit according to AA, wherein said first cell further includes:
  a. a first high surface area electrically conducting coating layer formed on one surface of said first electrode, such that said first coating layer is interposed between said first electrode and said gasket means; and b. a second electrically conducting high surface area coating layer formed on one surface of said second electrode, such that said second coating layer is interposed between said second electrode and said first gasket means;

c. a layer which includes a plurality of protrusions on the first coating layer, the second coating layer, or combination thereof; and wherein said protrusions impart structural support to said first cell, and provide additional electrical insulation between said first and second electrodes.

CC. In one embodiment, the present invention relates to a dry preunit according to BB, wherein said first cell further includes a first fill port formed by said gasket means, in order to allow an electrolyte to flow into said fill gap.

DD. In one embodiment, the present invention relates to a dry preunit according to CC, wherein said first cell further includes a first cord which is inserted within said first fill port; and wherein when said first cord is removed, said first fill port is opened and said fill gap becomes accessible.

EE. In one embodiment, the present invention relates to a dry preunit according to AA, further including at least a second cell, and wherein said first cell and said second cell are stacked and connected, in order to impart an integral unitary structure to the dry preunit.

FF. In one embodiment, the present invention relates to a dry preunit according to EE, wherein said second electrically conductive electrode is a bipolar electrode, which is shared by said first and second cell; and wherein said second cell further includes a third electrically conductive electrode which is oppositely disposed relative to said second electrically conductive electrode; and wherein said first and second electrically conductive electrodes are spaced apart, by a second predetermined distance.

GG. In one embodiment, the present invention relates to a dry preunit according to FF, wherein a third coating layer is formed on the second flat surface of said second electrode, such that said second coating layer is interposed between said second electrode and said second gasket means; and wherein said second cell includes a plurality of discrete protrusions located on either electrode surface.

HH. In one embodiment, the present invention relates to a dry preunit according to GG, wherein said second cell further includes a high surface area and electrically conductive coating which is formed on one surface of said third electrode; and wherein said fourth coating layer is interposed between said third electrode and said second gasket means.

II. In one embodiment, the present invention relates to a dry preunit according to HH, wherein said second cell further includes a second fill port that is formed within said second gasket means.

JJ. In one embodiment, the present invention relates to a dry preunit according to II, further including exterior tab means for connection to a power source.

KK. In one embodiment, the present invention relates to a dry preunit according to HH, wherein each of said first and third coating layers includes an additional layer having a set of peripheral protrusions, and a set of central discrete protrusions that are disposed in an arrayed arrangement.

LL. In one embodiment, the present invention relates to a dry preunit according to KK, wherein the diameter of each protrusion is about 6 mil (0.015 cm);

wherein the center-to-center separation of said peripheral protrusions is about 20 mil (0.0508 cm);

wherein the center-to-center separation of said central protrusions is about 40 mil (0.102 cm); and wherein said peripheral and central protrusions have a dielectric composition.

MM. In one embodiment, the present invention relates to a dry preunit according to FF, wherein said first and second predetermined distances are equal.

NN. In one embodiment, the present invention relates to a dry preunit according to AA, wherein each of said first and second gasket means includes two dielectric gaskets, which are disposed in registration with each other; and wherein said first cord is disposed between said gaskets to form said first fill port.

OO. In one embodiment, the present invention relates to a dry preunit according to FF, wherein said first, second and third electrodes are similarly and rectangularly shaped.

PP. In one embodiment, the present invention relates to a capacitor preunit including at least a first cell, the capacitor comprising:

a. a first electrically conductive electrode;

b. a second electrically conductive electrode, said first and second electrodes being spaced apart by a first predetermined distance; and c. first dielectric peripheral gasket means interposed between said first and second electrodes, for separating and electrically insulating said first and second electrodes;

whereby, when said first electrode, said second electrode and said first gasket means are bonded together to form the first cell, a fill gap is formed therebetween.

QQ. In one embodiment, the present invention relates to a capacitor preunit according to PP, wherein the first cell further includes:

a. a first high surface area coating layer formed on one surface of said first electrode, such that said first coating layer is interposed between said first electrode and said gasket means; and b. a second high surface area coating layer formed on one surface of said second electrode, with the proviso that said second coating layer is interposed between said second electrode and said first gasket means;

c. a layer having a plurality of discrete protrusions; and wherein said protrusions impart structural support to the first cell, and provide additional insulation between said first and second electrodes.

RR. In one embodiment, the present invention relates to a capacitor preunit according to QQ, further including at least a second cell;

wherein the first and second cell are stacked and bonded, in order to impart an integral unitary structure to the capacitor;

wherein said second electrically conductive electrode is a bipolar electrode, which is shared by said first and second cell;

wherein said second cell further includes a third electrically conductive electrode which is oppositely disposed relative to said second electrically conductive electrode; and wherein said first and second electrically conductive electrodes are spaced apart, by a second predetermined distance.

SS. In one embodiment, the present invention relates to an electrically conductive high surface area porous coating layer for use in a dry preunit for an energy storage device, such as a capacitor or like devices.

TT. In one embodiment, the present invention relates to a coating layer according to SS, wherein the porous layer comprises a metal oxide or a mixed metal oxide, having a large effective surface area consisting essentially of micro and meso pores, is coated on a support.

UU. In one embodiment, the present invention relates to a method for storing energy using the dry preunit according to any one of AA through TT, wherein said preunit is charged with an tonically conducting electrolyte, sealed, and electrically charged.

VV. In one embodiment, the present invention relates to a method for making a dry preunit comprising the steps of forming the device according to AA.

WW. In one embodiment, the present invention relates to a method for making a dry preunit comprising the steps of forming at least a first cell by:
  a. spacing apart a first electrically conductive electrode and a second electrically conductive electrode, by a first predetermined distance; and
  b. placing a first dielectric gasket means between said first and second electrodes, for separating and electrically insulating said first and second electrodes;
  whereby, when said first electrode, said second electrode and said first gasket means are bonded together to form said first cell, a fill gap is formed therebetween.

XX. In one embodiment, the present invention relates to a method for making a capacitor preunit comprising the steps of forming at least a first cell by:
  a. spacing apart a first electrically conductive electrode and a second electrically conductive electrode, by a first predetermined distance; and
  b. placing a first dielectric gasket means between said first and second electrodes, for separating and electrically insulating said first and second electrodes;
  whereby, when said first electrode, said second electrode and said first gasket means are bonded together to form said first cell, a fill gap is formed therebetween.

YY. In one embodiment, the present invention relates to a method for making a capacitor preunit comprising the steps of forming at least a first cell by:
  a. spacing apart a first electrically conductive layer means and a second electrically conductive layer means, by a first predetermined distance; and
  b. placing a first dielectric gasket means between said first and second conductive layer means, for separating and electrically insulating said first and second conductive layer means;
  whereby, when said first electrically conductive layer for storing electrical charge, said second conductive layer means for storing electrical charge, and said first gasket means for separating the electrode surfaces are bonded together to form said first cell, a fill gap is formed therebetween.

ZZ. In one embodiment, the present invention relates to a method for making an dry preunit according to WW, further including the steps of:
  a. forming a first porous, high surface area, and conductive coating layer on one surface of said first electrode, such that said first coating layer is interposed between said first electrode and said gasket means;
  b. forming a second porous, high surface area, and conductive coating layer on one surface of said second electrode, such that said second coating layer is interposed between said second electrode and said first gasket means; and
  c. forming a plurality of discrete microprotrusions on said first coating layer, wherein said microprotrusions impart structural support to said first cell, and provide additional insulation between said first and second electrodes.

AB. In one embodiment, the present invention relates to a method of producing an array of substantially uniform microprotrusions on a surface as a separator useful in the construction of single or multiple layer electrical charge storage devices, which method comprises:
  (a) obtaining an electrically insulating material which is essentially inert to electrolyte conditions to produce a thixotropic composition at between ambient temperature to about 75° C. and ambient pressure;
  (b) obtaining a thin electrode material comprising a thin flat electrically conducting metal sheet center coated on one or both sides with electrically conducting carbon, porous metal oxide, porous mixed metal oxide or other porous coating and securing the flat electrode in a suitable holder;
  (c) placing a thin flat screen or stencil having small openings over the flat thin electrode;
  (d) contacting the top exterior thin screen surface with the flowable composition of step(a) so that small portions of the composition extrude through the pattern and contact the exterior surface of the thin electrode and optionally penetrate the exterior surface of the porous electrode coating, when a squeegee is brought across the screen surface to cause contact of the screen with the electrode surface;
  (e) removing the sample from the screen printer; and
  (f) curing the applied material whereby the discrete microprotrusions essentially retain their shape and dimensions.

AC. In one embodiment, the present invention relates to a method of AB, wherein the device is selected from a capacitor or a battery.

AD. An improved method to produce a dry preunit of an electrical storage device for storage of electrical charge in a condition to have the electrode surfaces contacted with a non-aqueous or aqueous electrolyte, which method comprises:
  (a) preparing a thin in thickness substantially flat sheet of electrically conducting support material coated on each flat side with the same or different thin layer of a second electrically conducting material having a high surface area, optionally with the provision that both flat sides of the electrically conducting support is a sheet having the perimeter edge surfaces either:
    (i) having a thin layer of second electrically conducting material,
    (ii) are partly devoid of second electrically conducting material, or
    (iii) are devoid of second electrically conducting material;
  (b) creating an ion permeable or semipermeable space separator stable to the aqueous or non-aqueous electrolyte obtained by:
    (i) depositing substantially uniform in height groups of electrically insulating microprotrusions, on the surface of at least one side of the thin layer of second electrically conducting material,
    (ii) placing a thin precut ion permeable or semipermeable separator on one surface of the second electrically conducting material, or (iii) casting an ion permeable or semipermeable thin layer on the surface of at least one side of the electrically conducting material, or (iv) creating a thin air space as separator;

(c) contacting the perimeter edge surface of one or both sides of the thin sheet of step (b) with one or more thin layers of synthetic organic polymer as a gasket material selected from the group consisting of a thermoplastic, thermoelastomer, and a thermoset polymer;

(d) placing on or within the gasket material and optionally across the thin sheet at least one thin cord of a different material which cord has a higher melting point ($T_m$) greater than the gasket polymer material and does not melt, flow, or permanently adhere to the gasket under the processing conditions;

(e) producing a repeating layered stack of the thin flat articles of sheet coated with high surface area coating and separator produced in step (d) optionally having the end sheets consisting of a thicker support;

(f) heating the stack produced in step (e) at a temperature and applied pressure effective to cause the synthetic gasket material to flow, to adhere to, and to seal the edges of the stack creating a solid integral stack of layers of alternating electrically conductive sheet coated with second electrically conducting material and the ion permeable separator, optionally such that the gasket material creates a continuous integral polymer enclosure;

(g) cooling the solid integral stack of step (f) optionally in an inert gas under slight pressure; and (h) removing the at least one thin cord of different material between each layer creating at least one small opening between the layers of electrically conducting sheet coated with second electrically conducting material.

AE. In one embodiment, the present invention relates to a method of AD, wherein said microprotrusions comprise ceramics, organic elastomers, thermoplastics, or thermosets, or combinations thereof.

AF. In one embodiment, the present invention relates to a method of AE, wherein either after step (e) and before step (f) or after step (h), the integral stack is treated by:

(j) evacuating the dry preunit to substantially remove residual gases;

(k) contacting the dry unit with one or more reducing gases at near ambient pressure;

(l) heating the unit and reducing gas to between about 20 to 150° C. for between about 0.1 and 5 hr;

(m) evacuating the dry preunit;

(n) replacing the reducing atmosphere with inert gas; and (o) optionally repeating steps (j), (k), (l), (m), and (n) at least once.

AG. In one embodiment, the present invention relates to a method of AD, wherein either after step (e) and before step (f) or after step (h), the integral stack is treated by:

(j) evacuating the dry preunit to substantially remove residual gases;

(k) contacting the dry unit with one or more reducing gases at near ambient pressure;

(l) heating the unit and reducing gas to between about 20 to 150° C. for between about 0.1 and 5 hr;

(m) evacuating the dry preunit;

(n) replacing the reducing atmosphere with inert gas; and (o) optionally repeating steps (j), (k), (l), (m), and (n) at least once.

AH. In one embodiment, the present invention relates to a method according to AF, wherein the vacuum in steps (j), (m) and (o) is between about 1 torr to 1 $\mu$torr.

A'A'. In one embodiment, the present invention relates to a method according to AF, wherein the reducing gas is selected from hydrogen, carbon monoxide, nitric oxide, ammonia or combinations thereof; and the inert gas is selected from helium, neon, nitrogen, argon or combinations thereof;

and the one or more reducing gases and one or more inert gases are contacted with the unit in a sequential manner.

AI. In one embodiment, the present invention relates to a method according to AD, wherein:

in step (b) gasket material is placed on the top of the device and the gasket material between the electrodes is of sufficient excess in volume so that upon heating in step (f) excess gasket material extrudes about the perimeter edges of the support to create a seamless sealed integral surface at the edge of the stack unit.

AJ. In one embodiment, the present invention relates to a method according to AD, wherein in step (a) the support has second electrically conducting material on the perimeter edge surfaces, in step (b) the microprotrusions are on the surface of the second electrically conducting material, in step (c) the gasket material is a thermoplastic, in step (e) the end sheets are a thicker support material, in step (f) the gasket material is in excess to create a continuous integral sealed enclosure, in step (g) the stack is cooled to ambient temperature, and in step (h) the cord comprises a metal, ceramic, organic polymer or combinations thereof.

AK. An improved method to produce an electrical storage device for storage of electrical charge, which method comprises:

evacuating the dry preunit of AD, contacting the evacuated dry preunit with an electrolyte selected from either an aqueous inorganic acid or a non-aqueous organic ionically conducting medium for a time sufficient to backfill the space between the support sheets using the fill port, removing any exterior surface electrolyte, and closing and sealing the fill port openings.

AL. An improved method to produce a dry preunit of an electrical storage device for storage of electrical charge in a condition to have the electrode surfaces contacted with a non-aqueous or aqueous electrolyte, which method comprises:

(a) obtaining a thin in thickness flat metal sheet support wherein the metal is selected from titanium, tantalum, niobium, zirconium, iron, copper, lead, tin, nickel, zinc or combinations thereof, having a thickness of between about 0.1 and 10 mil coated on each flat surface with a thin porous layer of at least one metal oxide, metal nitride or metal carbide having a high surface area independently selected from metal oxide, nitride, or carbide of the group consisting of tin, lead, vanadium, titanium, ruthenium, tantalum, rhodium, osmium, iridium, iron, cobalt, nickel, copper, molybdenum, niobium, chromium, manganese, lanthanum or lanthanum series metals or alloys and combinations thereof, possibly containing small percentage of additives to enhance electrical conductivity, wherein the thin metal oxide layer has a thickness of between about 0.1 and 200 microns, optionally with the provision that both flat surfaces of the electrically conducting sheet have the perimeter edge surfaces devoid of metal oxide;

(b) creating an ion permeable space separator which is stable to the aqueous or non-aqueous electrolyte selected from:
  (i) depositing a substantially uniform in height array of electrically insulating discrete microprotrusions which are stable to an aqueous or non-aqueous electrolyte having a height of between about 0.1 and 10 mil on the surface of one or both sides of the thin layer of porous metal oxide,
  (ii) placing a thin precut ion permeable electrically insulating separator having a thickness of between about 0.1 and 10 mil on one flat surface of the metal oxide layer;
  (iii) casting an ion permeable or semipermeable separator having a thickness of between about 0.1 and 10 mil on at least one surface of the second electrically conducting material; or
  (iv) creating a thin air space as a separator;

(c) contacting the perimeter edge surface of one or both sides of the thin electrically conducting sheet of step (b) with one or more thin layers of synthetic organic polymer as a gasket material wherein the polymer is selected from polyimides, TEFZEL®, KRATON®, polyethylenes, polypropylenes, other polyolefins, polysulfone, other fluorinated or partly fluorinated polymers or combinations thereof;

(d) placing on or within the gasket material and optionally across the thin flat sheet at least one thin cord of a different material which has a higher melting temperature ($T_m$) than the polymeric gasket material, which cord does not melt, flow or adhere to the gasket material under the processing conditions described herein;

(e) assembling a repeating layered stack of the thin flat articles of sheet coated with metal oxide and separator produced in step (d) optionally having end sheets having only one side coated and/or being made of thicker support material;

(f) heating the layered stack of step (e) at about 5 to 100° C. greater than $T_m$ of the gasket material causing the gasket material to flow, to adhere to, and to seal the edges of the layered stack creating a solid integral layered stack of sheet and separator optionally enclosing and sealing the stack in an integral polymer enclosure;

(g) cooling to ambient temperature the solid integral stack of step (f) in an inert environment; and (h) removing the at least one thin cord between each layer creating at least one small opening into the fill gap located between the porous electrode layers.

AM. In one embodiment, the present invention relates to a method according to AL, wherein:
  in step (b) gasket material is placed on the top of the device and the gasket material between electrodes is of sufficient excess in volume so that upon heating in step (f) excess gasket material extrudes about the perimeter edges of the support to create a seamless sealed integral surface at the edge of the stack unit.

AN. In one embodiment, the present invention relates to a method according to AL, wherein:
  in step (a) the support has second electrically conducting material on the perimeter edge surfaces,
  in step (b) the microprotrusions are on the surface of the second electrically conducting material,
  in step (c) the gasket material is a thermoplastic,
  in step (e) the end sheets are a thicker support material,
  in step (f) the gasket material is in excess to create a continuous integral enclosure,
  in step (g) the stack is cooled to ambient temperature,
  in step (h) the cord comprises a metal, ceramic, organic polymer or combinations thereof.

AO. In one embodiment, the present invention relates to a energy storage obtained by using the preunit device according to any AD and
  adding an electrolyte to fill the evacuated fill gap regions, sealing the fill port openings, and
  electrically charging the electrical storage device wherein said device has uses as an electrical source of power for applications independently selected from:
    providing peak power in applications of varying power demands and be recharged during low demand (i.e. serving as means for a power conditioner, placed between the electrical generator and the electrical grid of the users;
    providing power in applications where the electrical source may be discontinued and additional power is needed to power in the interim period or for a period to allow for a shutdown providing means for uninterruptable power source applications, comprising computer memory shutdown during electrical grey and brown outs, or power during periodic black outs as in orbiting satellites;
    providing pulse power in applications requiring high current and/or energy comprising means for a power source to resistively heat catalysts, to power a defibrillator or other cardiac rhythm control device, or to provide pulse power in electric vehicle where in a battery or internal combustion engine could recharge the device;
    providing power in applications that require rapid recharge with prolonged energy release comprising surgical instruments with out an electrical cord; or
    providing a portable power supply for appliance and communication applications.

AP. In one embodiment, the present invention relates to a photolithographic method to produce microprotrusions on a high surface area substrate to maintain space separation in an electrical storage device, which method comprises:

(a) obtaining an unexposed photo resist film which is essentially inert to subsequent electrolyte conditions and is electrically insulating when cured;

(b) obtaining a thin electrode material comprising a thin flat electrically conducting metal sheet center coated on one or both flat sides with electrically conducting porous metal oxide, mixed metal oxide or carbon;

(c) applying the photo resist film to one or to both flat sides of the electrode material;

(d) placing a mask having a plurality of small holes over the photo resist;

(e) exposing the photo resist to a light source of an intensity and for a time effective to substantially cure the light exposed photo resist material through the holes in the mask to create cured microprotrusions followed by removing the mask;

(f) developing the photo resist film to leave the cured multiple, discrete microprotrusions on the surface of the electrode material and remove unreacted film; and (g) further curing the remaining exposed material whereby the microprotrusions essentially retain their shape and dimensions.

AQ. In one embodiment, the present invention relates to a method according to AP, wherein:

in step (b) the metal oxide coats both sides of the electrode, in step (c) the film is applied to one flat side using a hot roller technique, in step (f) developing using dilute aqueous base and in step (g) using light, heat or a combination thereof to cure the microprotrusions.

AR. In one embodiment, the present invention relates to a method according to AQ, wherein in step (c) the photo resist is vacuum laminated.

AS. In one embodiment, the present invention relates to a dry preunit according to AA, wherein said first electrode includes a first electrically conductive, high surface area, porous coating layer, which is formed on one surface thereof, such that said first coating layer is interposed between said first electrode and said gasket means; and wherein said second electrode is a bipolar electrode.

AT. In one embodiment, the present invention relates to a dry preunit according to AS, wherein said second electrode includes a first electrically conductive, high surface area, porous coating layer formed on one surface thereof, such that said second coating layer is interposed between said second electrode and said first gasket means.

AU. In one embodiment, the present invention relates to a dry preunit according to AT, wherein said first electrode further includes spacer means formed on said first coating layer, for maintaining said first and second electrodes closely spaced apart.

AV. In one embodiment, the present invention relates to a dry preunit according to AU, wherein said second electrode further includes a second electrically conductive, high surface area, porous coating layer formed on another surface thereof.

AW. In one embodiment, the present invention relates to a dry preunit according to AU, wherein said first coating layer of said first electrode, and said first and second coating layers of said second electrode are selected from a group consisting of metal oxides, mixed metal oxides, metal nitrides, and polymers.

AX. In one embodiment, the present invention relates to a dry preunit according to AU, wherein said spacer means includes a plurality of protrusions; and wherein said protrusions impart structural support to said first cell, and provide additional insulation between said first and second electrodes.

AY. An energy storage device according to CC. further including an ionically conductive medium, within the cell gaps of the dry preunit, wherein the fill ports are sealed.

AZ. In one embodiment, the present invention relates to a further inclusion of porous hydrophobic polymeric material within the fill gap of each cell during construction of AA to mitigate the increase of hydrostatic pressure with an increase in temperature.

AAA. In one embodiment, the present invention relates to a porous hydrophobic polymeric material of AZ wherein the material comprise polytetrafluoroethylene and has water entrance pressures of between 760 and 7600 torr.

BBB. In one embodiment AA, the present invention relates to a method of AB wherein the screen printable material is a thermal- or photo-curable epoxy resin.

CCC. In one embodiment, the present invention relates to a method of AL wherein in step (a) the porous electrode formed is conditioned by contact with:

(a) steam at a temperature of between about 150 and 300° C. for between about 0.5 and 4 hr, (b) a reactive gas or a reactive liquid at a temperature of between about 80 to 140° C. for between about 0.2 and 2 hr, or (c) an anodic current sufficient to evolve oxygen for between about 1 to 60 min, then contacted with a cathodic current without hydrogen gas evolution until the open circuit potential is adjusted to between about 0.5 V to 0.75 V (vs. normal hydrogen electrode).

DDD. In one embodiment, the present invention relates to a method of AB after step (c) or claim 38 between steps (d) and (e) conditioning the porous coating by contact with a cathodic current until the open circuit potential is adjusted to between about 0.5 V to 0.75 V (vs. normal hydrogen electrode).

EEE. In one embodiment, the present invention relates to a dry preunit of CC, wherein the electrode substrate is a metal or metal alloy having a thickness of between about 1 and 10 mil;

the porous high surface area coating is a mixed metal oxide.

FFF. In one embodiment, the present invention relates to a method of AD wherein in step (a), titanium is the support, the mixed metal oxides are ruthenium and tantalum having a thickness of between about 5 and 25 microns, wherein the perimeter edges of the porous electrode are contacted with a dilute solution of KRATON® in a non-aqueous organic solvent, and dried to seal the edges to insure electrical isolation of the cell;

in step (b), the separator is multiple microprotrusions;

in step (c), the gasket material is selected from KRATON® and high density polyethylene; and in step (d), the pull cord is TEFZEL®.

GGG. In one embodiment, the present invention relates to an improved method of DDD an improved method to produce an electrical storage device for storage of electrical charge, which method comprises:

evacuating the dry preunit of AD, contacting the evacuated dry preunit with an electrolyte selected from either an aqueous inorganic acid or a non-aqueous organic ionically conducting medium for a time sufficient to backfill the space between the support sheets using the fill port, removing any exterior surface electrolyte, and closing and sealing the fill port openings.

BA A method to produce a sealable and electrically insulating band of organic polymer on the perimeter edges of an individual electrode for use in an energy storage device, which method comprises:

A. obtaining a thin flat electrode comprising a thin porous metal oxide, nitride or carbide coated on a thin electrode substrate with or without insulating separators applied to one or both of the flat porous metal oxide, nitride or carbide surfaces;

B. dissolving at least one organic polymer in at least one organic solvent to obtain a solution having a viscosity sufficiently low to permit the solution to penetrate the porous metal oxide, metal nitride, or metal carbide;

C. coating the edge perimeter of each of the flat electrode with the polymer solvent solution of step B wherein the total surface area of organic polymer on one side covers between about 5 and 25% of the total area of the flat surface of one side of the electrode from each perimeter edge to create a continuous substantially uniform edge coating of organic polymer and having a thickness effective to stop shunt (or leakage) current; and D. removing the at least one organic solvent from the organic polymer edge coating by maintaining the coated electrode at ambient temperature and pressure for between about 0.1 and 1000 min followed by heating at between about 20 and 150° C. for between about 0.1 and 10 hr, optionally under vacuum conditions, producing an edge seal effective to stop or to reduce up to about 99% of any leakage current present.

BB The method of BA wherein the organic polymer and solvent of step (B) comprises a solvent, thermoplastic elastomer and optionally one or more organic polymer additives to achieve the viscosity properties of between about 300 and 3000 centipoise.

BC. The method of BB wherein the thermoplastic elastomer comprises KRATON®, a styrene—butylene/ethylene polymer.

BD The method of BB wherein the at least one organic solvent has a boiling point of about 200° C. or less at ambient pressure.

BE The method of BD wherein at least one organic solvent is selected from an aliphatic hydrocarbon, alcohol, ester, ether, ketone, aromatic hydrocarbon or mixtures thereof.

BF The method of BD wherein at least one organic solvent is a mixture of an aromatic hydrocarbon selected from benzene, toluene, xylene or mixtures thereof and an alcohol selected from methanol, ethanol, n-propanol, isopropanol, butanol or mixtures thereof.

BG The method of BA wherein the perimeter edge of each thin electrode has the porous metal oxide, metal nitride, or metal carbide coating removed such that at least one organic polymer coating directly contacts and adheres to the electrode substrate.

BH The method of BA wherein in step B the organic polymer is a styrene-butadiene elastomer, the organic solvent is a mixture of toluene and isopropanol in a ratio of between about 1/4 to 4/1, and the styrene-butadiene elastomer is present in between about 5 and 20% by weight of elastomer and solvents.

BI The method of BA wherein
in step C, at least one organic polymer dissolved in at least one organic solvent, the electrode substrate is edge coated by:
multiple dipping of the electrode in the solution;
at least one coating using screen printing of the solution;
at least one coating using stencil printing of the solution;
mechanically placing the solution on the substrate using a syringe; or
mechanically placing the solution on the substrate using an applicator.

BJ The method of BH wherein
in step C: at least one organic polymer dissolved in at least one organic solvent, the electrode substrate is edge coated by:
multiple dipping of the electrode in the solution;
at least one coating using screen printing of the solution;
at least one coating using stencil printing of the solution;
mechanically placing the solution on the substrate using a syringe; or
mechanically placing the solution on the substrate using an applicator.

BK The method of produce an organic polymer sealed electrical storage device having improved electrical short resistant properties, which the method comprises:
A. obtaining the organic polymer edge coated electrode produced by the method of BA;
B. dissolving at least one organic polymer in at least one or more organic solvent producing a solution having a viscosity of between about 3,000 and 40,000 centipoise;
C. coating each electrode edge one or more times using the solution of step B to obtain a coating thickness of between about 1 and 10 mil creating a thin pregasket;
D. stacking multiple edge coated electrodes substantially matching the thin pregaskets produced in step C while the organic polymer coating is still solvent wet and tacky to the touch, to create a solvent wet capacitor preunit device having multiple electrical cells;
E. removing the organic solvent from the matched pregaskets formed in step D and from the capacitor preunit device of the stacked electrodes by maintaining the device for between about 1 and 20 hr at ambient pressure and temperature, followed by heating at between about 80–250° C. until at least one organic solvent is essentially removed; and
F. creating a dry preunit of an electrical storage device having an organic polymer sealed edge.

BL The method of BK wherein the organic polymer comprises a thermoplastic elastomer and optionally one or more organic polymer additives to achieve the viscosity properties.

BM The method of BL wherein the thermoplastic elastomer comprises KRATON®, a styrene—butylene/ethylene polymer.

BN The method of BL wherein the at least one organic solvent has a boiling point of about 200° C. or less at ambient pressure.

BO The method of BN wherein at least one organic solvent is selected from an aliphatic hydrocarbon, alcohol, ester, ether, ketone, aromatic hydrocarbon or mixtures thereof.

BP The method of BN wherein at least one organic solvent is a mixture of an aromatic hydrocarbon and an alcohol.

BQ The method of BK wherein the perimeter edge of each thin electrode has the porous oxide coating removed such that at least one organic polymer coating directly contacts and adheres to the electrode substrate.

BR The method of BK wherein in step B the organic polymer is a styrene-butadiene elastomer, the organic solvent is a mixture of toluene and isopropanol in a ratio of between about 1/4 to 4/1, and
the styrene-butadiene elastomer is present in between about 5 and 40% by weight of the total weight of elastomer and solvents present.

BS The method of BK wherein
in step C, at least one organic polymer dissolved in at least one organic solvent, the electrode substrate is edge coated by:
multiple dipping of the electrode in the solution;
at least one coating using screen printing of the solution;
at least one coating using stencil printing of the solution;
mechanically placing the solution on the substrate using a syringe; or mechanically placing the solution on the substrate using an applicator.

BT The method of BR wherein
in step C, at least one organic polymer dissolved in at least one organic solvent, the electrode substrate is edge coated by:
multiple dipping of the electrode in the solution;
at least one coating using screen printing of the solution;
at least one coating using stencil printing of the solution;
mechanically placing the solution on the substrate using a syringe; or
mechanically placing the solution on the substrate using an applicator.

BU The method of BK for use in electrode construction scheduled from wet cell construction, dry cell construction, fill port construction, or compression seal construction, adhesive construction.

BV The method of BK wherein in step (C) the uniform edge coating of organic polymer has a thickness of between about 0.01 and 1 mil.

BW The method of BV wherein the thickness is between about 0.1 and 0.5 mil.

BX An improved method to produce an electrode for an energy storage device, which method comprises coating a thin metal electrically conducting substrate with a porous metal nitride or metal carbide.

BY The improved method of BX wherein the thin metal substrate is independently selected from tin, lead, vanadium, titanium, ruthenium, tantalum, rhodium, osmium, iridium, iron, cobalt, nickel, copper, molybdenum, niobium, indium, chromium, manganese, lanthanum, lanthanum series metal, alloys or combination thereof, and
the porous metal nitride or metal carbide is independently selected from tin, lead, vanadium, titanium, ruthenium, tantalum, rhodium, osmium, iridium, iron, cobalt, nickel, copper, molybdenum, niobium, indium, chromium, manganese, lanthanum, lanthanum series metal, or combinations thereof.

CA A process to produce a high surface area iron nitride, titanium nitride or gamma-molybdenum nitride coated substrate for use as an electrical energy storage component in a capacitor or a battery configuration, which process comprises:
(a) coating one or both flat etched surfaces of a solid substrate, which substrate is in the form of a thin sheet, with a solution or a slurry of a metal halide selected from iron halide, titanium halide or molybdenum halide and a liquid volatile carrier to produce a thin surface film;
(b) contacting the metal halide surface film-carrier coated substrate of step (a) with oxygen, air, or combinations thereof at a temperature of between about 150 and 400° C. for between about 5 and 60 min to convert the iron halide, titanium halide or molybdenum halide to oxide, respectively, as a thin film and to remove the liquid volatile carrier;
(c) repeating steps (a) and (b) as needed to obtain an accumulated thickness of metal oxide coating on the substrate, which accumulated metal oxide coating has a high surface area and the liquid volatile carrier is removed;
(d) heating the metal oxide film coated substrate of step (c) in oxygen, air or combination thereof at between about 150 and 400° C. for between about 1 and 3 hr to convert at least about 95% of the metal chloride to metal oxide;
(e) slowly increasing the temperature of the metal oxide coated substrate at a rate of less than about 40° C. per minute in a nitrogen atmosphere to between about 500 to 800° C.;
(f) contacting the oxide coated substrate produced in step (e) with a nitrogen source selected from excess flowing gaseous ammonia or a mixture of hydrogen gas and nitrogen gas at between about 500 and 800° C. for between 1 and 6 hr which treatment converts about 95% or greater of the oxide coating to an iron nitride, titanium nitride or gamma-molybdenum nitride layer, respectively, on the substrate, which nitride layer has a high surface area and is electrically conductive; and
(g) cooling to ambient temperature and recovering the high surface area nitride coated substrate produced in step (e).

CB The process of CA wherein the metal halide is selected from chloride or bromide.

CC. The process of CB wherein in step (a) the metal halide is molybdenum chloride, and the gamma-molybdenum nitride film of step (f) has a surface area in excess of 16 $m^2/g$.

CD The process of CA wherein the substrate in step (a) is selected from iron, titanium, molybdenum, aluminum, copper, zirconium, nickel or combinations thereof.

CE The process of CA wherein in step (b) the contacting occurs by dip coating or by stray coating.

CF The process of CE wherein the liquid volatile carrier is selected from ethanol, propanol, butanol, pentanol, hexanol, cycohexanol, diethyl ether, dioxane, tetrahydrofuran, dimethylacetamide, diethylacetamide, acetone, methylethyl ketone, butanone, ethyl acetate, propyl acetate, methylene chloride, chloroform, carbon tetrachloride, benzene, toluene, xylene, or mixtures thereof.

CG The process of CF wherein the liquid volatile carrier is selected from ethanol, propanol, butanol, pentanol or hexanol.

CH The process of CA wherein:
in step (a) the metal halide is molybdenum chloride, and the substrate is selected from titanium, molybdenum, iron, aluminum, copper or combinations thereof and the liquid volatile carrier is isopropanol; and
in step (f) the nitrogen source is flowing ammonia, the temperature is between about 500 and 800° C. for between about 1 and 6 hrs, and gamma molybdenum nitride is produced.

CI The process of CH wherein the surface area is between about 10 and 60 $m^2/g$, and the temperature in steps (e) and (f) is about 700° C.

CJ The process of CF wherein the carrier is the $C_2$–$C_6$ alcohols, and water is present at less than 1% by weight.

CK The process of CA wherein:
in step (a) the metal halide is titanium chloride and in step (f) titanium nitride is formed.

CL The process of CK wherein:
in step (a) the liquid volatile carrier is isopropanol;
in step (b) the temperature is between about 150 and 300° C. and the time is between about 5 and 30 min.;
in step (c) the number of repeating steps is between 10 and 20;
in step (d) the temperature is between about 150 and 300° C. and the time is between about 2 and 3 hr.;
in step (e) the rate of heating is about 40° C. per minute to 800° C.; and
in step (f) flowing gaseous ammonia with hydrogen is used at about 800° C. for between about 3 and 5 hr.

CM The process of Cl wherein the substrate in step (a) is selected from iron, titanium, molybdenum, aluminum, copper, zirconium, nickel or combinations thereof.

CN The process of CK wherein the liquid volatile carrier is an alcohol or a mixture of alcohols.

CO The process of CA wherein:
in step (a) the metal halide is iron chloride and in step (f) iron nitride is formed.

CP The process of CK wherein:
in step (a) the liquid volatile carrier is isopropanol;
in step (b) the temperature is between about 150 and 300° C. and the time is between about 5 and 30 min.;
in step (c) the number of repeating steps is between 10 and 20;
in step (d) the temperature is between about 150 and 400° C. and the time is between about 2 and 3 hr.;
in step (e) the rate of heating is about 40° C. per minute to 500° C.; and
in step (f) flowing gaseous ammonia is used at about 500° C. for between about 3 and 5 hr.

CQ The process of CO wherein the substrate in step (a) is selected from iron, titanium, molybdenum, aluminum, copper or combinations thereof.

CR The electrically conducing molybdenum nitride coated electrode produced by the process of CH.

CS The electrically conducting titanium nitride coated electrode produced by the process of CK.

CT The electrically conducting iron nitride coated electrode produced by the process of CO.

CU An electrical storage device which has as spaced electrodes of a metal sheet coated with a thin layer of a metal nitride selected from molybdenum nitride, titanium nitride or iron nitride.

While only a few embodiments of the invention have been shown and described herein, it will become apparent to those skilled in the art that various modifications and changes can be made in the improved method to produce metal nitride coating for an electrode for use in an electrical storage device such as a battery or a capacitor having improved lifetime and charge/recharge characteristics and low leakage current, and the device thereof without departing from the spirit and scope of the present invention. All such modifications and changes coming within the scope of the appended claims are intended to be carried or thereby.

We claim:

1. A process to produce a high surface area niobium oxynitride, tantalum oxynitride, vanadium oxynitride, zirconium oxynitride, titanium oxynitride or molybdenum oxynitride coated substrate which oxynitride is electrically conducting, which process comprises:
   (a) coating one or both flat etched surfaces of a solid substrate, which substrate is in the form of a thin sheet, with a solution or a slurry of a metal halide selected from the group consisting of niobium halide, tantalum halide, vanadium halide, zirconium halide, titanium halide, molybdenum halide, and combinations thereof and a liquid volatile carrier to produce a thin surface film;
   (b) contacting the metal halide surface film-carrier coated substrate of step (a) with oxygen, air, or combinations thereof at a temperature of between about 150 and 250° C. for between about 5 and 60 minutes to convert the metal halide present to metal oxide, as a thin film and to remove the liquid volatile carrier;
   (c) repeating steps (a) and (b) to obtain an accumulated thickness of metal oxide coating on the substrate, which accumulated metal oxide coating has a high surface area and the liquid volatile carrier is then removed;
   (d) heating the metal oxide film coated substrate of step (c) in an environment selected from the group consisting of oxygen, air and combinations thereof at between about 160 and 240° C. for between about 1 and 3 hours to convert at least about 95% of any residual metal halide from steps (b), (c) and (d) to metal oxide;
   (e) increasing the temperature of the metal oxide coated substrate at a rate of less than about 40° C. per minute in a nitrogen atmosphere to between about 500 to 800° C.;
   (f) contacting the oxide coated substrate produced in step (e) with a nitrogen source selected from the group consisting of excess flowing gaseous ammonia, an excess flowing mixture of ammonia gas and hydrogen gas, and an excess flowing mixture of hydrogen gas and nitrogen gas at between about 500 and 800° C. for between 1 and 6 hours which treatment converts about 95% or greater of the metal oxide coating to an oxynitride coating of niobium oxynitride, tantalum oxynitride, vanadium oxynitride, zirconium oxynitride, titanium oxynitride, molybdenum oxynitride layer, and combinations thereof on the substrate, which metal oxynitride layer has a high surface area of between about 10 and 60 $m^2/g$ and is electrically conductive; and
   (g) cooling to ambient temperature and recovering the high surface area metal oxynitride coated substrate produced in step (f).

2. The process of claim 1 wherein the metal halide is selected from the group consisting of chloride and bromide.

3. The process of claim 2 wherein in step (a) the metal halide is titanium chloride, and in step (g) the metal oxynitiride produced is titanium oxynitride.

4. The process of claim 1 wherein the substrate in step (a) is selected from the group consisting of iron, titanium, molybdenum, aluminum, copper, zirconium, nickel and combinations thereof.

5. The process of claim 1 wherein in step (b) the contacting occurs by dip coating or by spray coating.

6. The process of claim 1 wherein the liquid volatile carrier is selected from the group consisting of ethanol, propanol, butanol, pentanol, hexanol, cycohexanol, diethyl ether, dioxane, tetrahydrofuran, dimethylacetamide, diethylacetamide, acetone, methylethyl ketone, butanone, ethyl acetate, propyl acetate, methylene chloride, chloroform, carbon tetrachloride, benzene, toluene, xylene, and mixtures thereof.

7. The process of claim 6 wherein the liquid volatile carrier is selected from the group consisting of ethanol, propanol, butanol, pentanol and hexanol.

8. The process of claim 6 wherein the liquid carrier is selected from alcohols having 2 to 6 carbon atoms, and water is present at less than 1% by weight.

9. The process of claim 1 wherein:
in step (a) the metal halide is titanium chloride, and the substrate is selected from the group consisting of titanium, molybdenum, iron, aluminum, copper and combinations thereof and the liquid volatile carrier is selected from the group consisting of ethanol, isopropanol and mixtures thereof; and
in step (f) the nitrogen source is flowing ammonia, the temperature is between about 500 and 800° C. for between about 1 and 6 hours and about 95% to 100% of the titanium oxide is converted to titanium oxynitride.

10. The process of claim 9 wherein the high surface area of titanium oxynitride produced is between about 10 and 60 $m^2/g$, and the temperature in steps (e) and (f) is about 700° C.

11. The process of claim 1 wherein:

in step (a) the metal halide is titanium chloride and in step (f) titanium oxynitride is formed having a high surface area of between about 20 and 56 $m^2/g$.

12. The process of claim 11 wherein:

in step (a) the liquid volatile carrier is isopropanol;

in step (b) the temperature is between about 150 and 300° C. and the time is between about 5 and 30 minutes;

in step (c) the number of repeating steps is between 10 and 40;

in step (d) the temperature is between about 150 and 300° C. and the time is between about 2 and 3 hours;

in step (e) the rate of heating is about 40° C. per minute to 700° C.; and in step (f) flowing gaseous ammonia with hydrogen is used at about 700° C. for between about 3 and 5 hours.

13. The process of claim 12 wherein the substrate in step (a) is selected from the group consisting of iron, titanium, molybdenum, aluminum, copper, zirconium, nickel, and combinations thereof.

14. The process of claim 11 wherein the liquid volatile carrier is selected from the group consisting of an alcohol and a mixture of alcohols.

15. The process of claim 1 wherein:

in step (f) titanium oxynitride is formed having a BET specific surface area of between about 50 and 100 $m^2/g$.

16. The process of claim 15 wherein the substrate in step (a) is selected from the group consisting of iron, titanium, molybdenum, aluminum, copper and combinations thereof.

17. The process of claim 1 wherein:

in step (a) the liquid volatile carrier is isopropanol and the metal halide is titanium chloride;

in step (b) the temperature is between about 150 and 300° C. and the time is between about 5 and 30 minutes:

in step (c) the number of repeating steps is between 10 and 40;

in step (d) the temperature is between about 150 and 400° C. and the time is between about 2 and 3 hours;

in step (e) the rate of heating is about 40° C. per minute to 800° C.; and in step (f) flowing gaseous ammonia is used at about 800° C. for between about 3 and 5 hours.

18. A process to improve the adhesion and cohesion of a high surface area titanium oxynitride, which process comprises:

adding tantalum chloride or tantalum oxide to the titanium oxynitride produced by the process of claim 1 prior to drying in step (b), annealing and pyrolysis at elevated temperatures resulting in tantalum oxide in the product titanium oxynitride, wherein the product has improved adhesion and cohesion.

\* \* \* \* \*

UNITED STATES PATENT AND TRADEMARK OFFICE
CERTIFICATE OF CORRECTION

PATENT NO. : 5,980,977  
DATED : November 9, 1999  
INVENTOR(S) : Keh Chi Tsai, Charles Z. Deng, Dania Ghantous Page 1 of 1

It is certified that error appears in the above-identified patent and that said Letters Patent is hereby corrected as shown below:

Title Page:
Delete all the following text under section [63]:

"RELATED U.S. APPLICATION DATA

Item [63] Continuation-in-part of application No. PCT/US95/03985, March 30, 1995, and application No. 08/727,821, Sep. 30, 1996, abandoned, which is a continuation-in-part of application No. 08/219,965, Mar. 30, 1994, Pat. No. 5,867,363, which is a continuation-in-part of application No. 07/947,414, Sep. 18, 1992, Pat. No. 5,384,685, application No. 07/947,294, Sep. 18, 1992, Pat. No. 5,464,453, and application No. 07/958,506, Oct. 7, 1992, abandoned."

Signed and Sealed this

Third Day of July, 2001

*Attest:*

NICHOLAS P. GODICI  
*Attesting Officer*    *Acting Director of the United States Patent and Trademark Office*

UNITED STATES PATENT AND TRADEMARK OFFICE
CERTIFICATE OF CORRECTION

PATENT NO.   : 5,980,977
DATED        : November 9, 1999
INVENTOR(S)  : Charles Z. Deng, Keh Chi Tsai and Dania Ghantous It is certified that error appears in the above-identified patent and that said Letters Patent is hereby corrected as shown below:

Certificate of Correction issued the Third Day of July, 2001, was issued in error and is vacated.

Signed and Sealed this

Sixteenth Day of July, 2002

*Attest:*

*Attesting Officer*

JAMES E. ROGAN
*Director of the United States Patent and Trademark Office*